United States Patent
Cohen et al.

(10) Patent No.: US 12,254,633 B2
(45) Date of Patent: *Mar. 18, 2025

(54) SEGMENTING OBJECTS USING SCALE-DIVERSE SEGMENTATION NEURAL NETWORKS

(71) Applicant: Adobe Inc., San Jose, CA (US)

(72) Inventors: Scott Cohen, Sunnyvale, CA (US); Long Mai, Portland, OR (US); Jun Hao Liew, Singapore (SG); Brian Price, San Jose, CA (US)

(73) Assignee: Adobe Inc., San Jose, CA (US)

( * ) Notice: Subject to any disclaimer, the term of this patent is extended or adjusted under 35 U.S.C. 154(b) by 385 days.

This patent is subject to a terminal disclaimer.

(21) Appl. No.: 17/655,493

(22) Filed: Mar. 18, 2022

(65) Prior Publication Data

US 2022/0207745 A1    Jun. 30, 2022

Related U.S. Application Data

(63) Continuation of application No. 16/231,746, filed on Dec. 24, 2018, now Pat. No. 11,282,208.

(51) Int. Cl.
*G06T 7/12* (2017.01)
*G06T 3/4046* (2024.01)
(Continued)

(52) U.S. Cl.
CPC .............. *G06T 7/12* (2017.01); *G06T 3/4046* (2013.01); *G06T 7/194* (2017.01); *G06V 10/255* (2022.01);
(Continued)

(58) Field of Classification Search
USPC ....................................................... 382/173
See application file for complete search history.

(56) References Cited

U.S. PATENT DOCUMENTS

| | | |
|---|---|---|
| 5,214,744 A | 5/1993 | Schweizer et al. |
| 7,295,700 B2 | 11/2007 | Schiller et al. |

(Continued)

FOREIGN PATENT DOCUMENTS

| | | |
|---|---|---|
| CN | 106022273 A | 10/2016 |
| CN | 106339591 A | 1/2017 |

(Continued)

OTHER PUBLICATIONS

Li et al., Interactive Image Segmentation with Latent Diversity, 2018, IEEE 2575-7075/18, DOI 10.11/09 CVPR.2018.00067, pp. 577-585 (Year: 2018).*

(Continued)

*Primary Examiner* — Ishrat I Sherali
(74) *Attorney, Agent, or Firm* — Keller Preece PLLC

(57) ABSTRACT

The present disclosure relates to systems, non-transitory computer-readable media, and methods for training and utilizing scale-diverse segmentation neural networks to analyze digital images at different scales and identify different target objects portrayed in the digital images. For example, in one or more embodiments, the disclosed systems analyze a digital image and corresponding user indicators (e.g., foreground indicators, background indicators, edge indicators, boundary region indicators, and/or voice indicators) at different scales utilizing a scale-diverse segmentation neural network. In particular, the disclosed systems can utilize the scale-diverse segmentation neural network to generate a plurality of semantically meaningful object segmentation outputs. Furthermore, the disclosed systems can provide the plurality of object segmentation outputs for display and selection to improve the efficiency and accuracy of identifying target objects and modifying the digital image.

20 Claims, 24 Drawing Sheets

(51) Int. Cl.
G06T 7/194 (2017.01)
G06V 10/20 (2022.01)
G06V 10/44 (2022.01)
G06V 10/82 (2022.01)
G06V 10/24 (2022.01)

(52) U.S. Cl.
CPC ............ *G06V 10/454* (2022.01); *G06V 10/82* (2022.01); *G06T 2207/20081* (2013.01); *G06V 10/248* (2022.01)

(56) References Cited

U.S. PATENT DOCUMENTS

| | | | |
|---|---|---|---|
| 7,606,417 | B2 | 10/2009 | Steinberg et al. |
| 7,916,917 | B2 | 3/2011 | Dewaele et al. |
| 8,600,143 | B1 | 12/2013 | Kulkarni et al. |
| 8,675,934 | B2 | 3/2014 | Wehnes et al. |
| 9,251,429 | B2 | 2/2016 | Pham et al. |
| 9,336,483 | B1 | 5/2016 | Abeysooriya et al. |
| 9,342,869 | B2 | 5/2016 | Wang et al. |
| 9,418,319 | B2 | 8/2016 | Shen et al. |
| 9,495,756 | B2 | 11/2016 | Rivet-Sabourin |
| 9,684,967 | B2 | 6/2017 | Abedini et al. |
| 10,192,129 | B2* | 1/2019 | Price .................... G06V 10/454 |
| 10,210,613 | B2 | 2/2019 | Xu et al. |
| 10,460,214 | B2 | 10/2019 | Lu et al. |
| 10,470,510 | B1 | 11/2019 | Koh et al. |
| 10,643,331 | B2 | 5/2020 | Ghesu et al. |
| 10,679,046 | B1 | 6/2020 | Black et al. |
| 10,846,566 | B2 | 11/2020 | Zhu et al. |
| 11,282,208 | B2* | 3/2022 | Cohen ..................... G06T 7/12 |
| 11,335,004 | B2 | 5/2022 | Liu et al. |
| 11,430,129 | B2* | 8/2022 | Barish ..................... G06T 7/73 |
| 11,568,627 | B2* | 1/2023 | Price ..................... G06V 10/26 |
| 11,676,279 | B2* | 6/2023 | Price ..................... G06N 3/088 382/156 |
| 11,875,254 | B2* | 1/2024 | Rhodes ................ G06N 5/046 |
| 2001/0051852 | A1 | 12/2001 | Sundaravel et al. |
| 2003/0081833 | A1 | 5/2003 | Tilton |
| 2004/0042662 | A1 | 3/2004 | Wilensky et al. |
| 2004/0190092 | A1 | 9/2004 | Silverbrook et al. |
| 2004/0202368 | A1 | 10/2004 | Lee et al. |
| 2006/0015373 | A1 | 1/2006 | Cuypers |
| 2006/0045336 | A1 | 3/2006 | Lim |
| 2006/0285743 | A1 | 12/2006 | Oh et al. |
| 2007/0165949 | A1 | 7/2007 | Sinop et al. |
| 2009/0252429 | A1* | 10/2009 | Prochazka .............. G06T 7/174 382/254 |
| 2010/0183225 | A1 | 7/2010 | Vantaram et al. |
| 2010/0226566 | A1 | 9/2010 | Luo et al. |
| 2010/0322488 | A1 | 12/2010 | Virtue et al. |
| 2011/0188720 | A1 | 8/2011 | Narayanan et al. |
| 2011/0216975 | A1 | 9/2011 | Rother et al. |
| 2011/0285874 | A1 | 11/2011 | Showering et al. |
| 2012/0201423 | A1 | 8/2012 | Onai et al. |
| 2014/0010449 | A1 | 1/2014 | Haaramo et al. |
| 2014/0056472 | A1 | 2/2014 | Gu |
| 2014/0334667 | A1 | 11/2014 | Eswara et al. |
| 2015/0117783 | A1 | 4/2015 | Lin et al. |
| 2015/0269427 | A1 | 9/2015 | Kim et al. |
| 2016/0232425 | A1 | 8/2016 | Huang et al. |
| 2017/0032551 | A1 | 2/2017 | Fried et al. |
| 2017/0039723 | A1 | 2/2017 | Price et al. |
| 2017/0068416 | A1 | 3/2017 | Li |
| 2017/0116497 | A1 | 4/2017 | Georgescu et al. |
| 2017/0140236 | A1 | 5/2017 | Price et al. |
| 2017/0169313 | A1 | 6/2017 | Choi et al. |
| 2017/0169567 | A1 | 6/2017 | Chefd'hotel et al. |
| 2017/0213112 | A1 | 7/2017 | Sachs et al. |
| 2017/0213349 | A1 | 7/2017 | Kuo et al. |
| 2017/0231550 | A1 | 8/2017 | Do et al. |
| 2017/0244908 | A1 | 8/2017 | Flack et al. |
| 2017/0249739 | A1 | 8/2017 | Kallenberg et al. |
| 2017/0287137 | A1 | 10/2017 | Lin et al. |
| 2018/0061046 | A1 | 3/2018 | Bozorgtabar et al. |
| 2018/0108137 | A1 | 4/2018 | Price et al. |
| 2018/0137335 | A1 | 5/2018 | Kim et al. |
| 2018/0182101 | A1 | 6/2018 | Petersen et al. |
| 2018/0240243 | A1 | 8/2018 | Kim et al. |
| 2019/0057507 | A1 | 2/2019 | El-Khamy et al. |
| 2019/0108414 | A1 | 4/2019 | Price et al. |
| 2019/0236394 | A1 | 4/2019 | Price et al. |
| 2019/0130229 | A1 | 5/2019 | Lu et al. |
| 2019/0236786 | A1 | 8/2019 | McNerney et al. |
| 2019/0340462 | A1 | 11/2019 | Pao et al. |
| 2019/0357615 | A1 | 11/2019 | Koh et al. |
| 2020/0020108 | A1 | 1/2020 | Pao et al. |
| 2020/0143194 | A1 | 5/2020 | Hou et al. |
| 2020/0167930 | A1* | 5/2020 | Wang ....................... G06N 3/08 |
| 2020/0218961 | A1 | 7/2020 | Kanazawa et al. |
| 2020/0388071 | A1 | 12/2020 | Grabner et al. |
| 2021/0027098 | A1 | 1/2021 | Ge et al. |
| 2021/0082118 | A1 | 3/2021 | Zhang et al. |
| 2021/0158043 | A1 | 5/2021 | Hou et al. |
| 2021/0217178 | A1 | 7/2021 | Terzopoulos et al. |
| 2021/0248748 | A1 | 8/2021 | Turgutlu et al. |
| 2021/0290096 | A1 | 9/2021 | Yang |
| 2021/0295507 | A1 | 9/2021 | Nie |
| 2022/0044366 | A1 | 2/2022 | Zhang et al. |
| 2022/0044407 | A1 | 2/2022 | Liu et al. |
| 2022/0108454 | A1 | 4/2022 | Tsai et al. |
| 2022/0237799 | A1 | 7/2022 | Price et al. |
| 2022/0262009 | A1 | 8/2022 | Yu et al. |
| 2022/0292684 | A1 | 9/2022 | Wang et al. |
| 2022/0375079 | A1 | 11/2022 | Finley et al. |
| 2023/0281763 | A1 | 9/2023 | Zhang et al. |

FOREIGN PATENT DOCUMENTS

| | | |
|---|---|---|
| CN | 107103315 A | 8/2017 |
| CN | 108345890 A | 7/2018 |
| CN | 110232689 A | 9/2019 |
| DE | 102015207047 A1 | 10/2015 |
| WO | WO 2015/177268 A1 | 11/2015 |
| WO | WO 2018/229490 A1 | 12/2018 |

OTHER PUBLICATIONS

Xu et al., Deep Interactive Object Selection, Mar. 13, 2016 arXiv: 1603.04042v1 [cs.CV], pp. 1-9. (Year: 2016).*
U.S. Appl. No. 16/376,704, Jun. 14, 2022, Office Action.
U.S. Appl. No. 17/126,986, Aug. 30, 2022, Office Action.
Ali Borji, Ming-Ming Cheng, Qibin Hou, Huaizu Jiang, and Jia Li. Salient object detection: A survey. Computational visual media, pp. 1-34, 2019.
Ali Borji and Laurent Itti. State-of-the-art in visual attention modeling. IEEE transactions on pattern analysis and machine intelligence, 35(1):185-207, 2012.
Liang-Chieh Chen, George Papandreou, Iasonas Kokkinos, Kevin Murphy, and Alan L Yuille. Semantic image segmentation with deep convolutional nets and fully connected crfs. arXiv preprint arXiv:1412. 7062, 2014.
Liang-Chieh Chen, Yukun Zhu, George Papandreou, Florian Schroff, and Hartwig Adam. Encoder-decoder with atrous separable convolution for semantic image segmentation. In Proceedings of the European conference on computer vision (ECCV), pp. 801-818, 2018.
Ho Kei Cheng, Jihoon Chung, Yu-Wing Tai, and Chi-Keung Tang. Cascadepsp: Toward class-agnostic and very high-resolution segmentation via global and local refinement. In Proceedings of the IEEE/CVF Conference on Computer Vision and Pattern Recognition, pp. 8890-8899, 2020.
Ming-Ming Cheng, Niloy J Mitra, Xiaolei Huang, Philip H S Torr, and Shi-Min Hu. Global contrast based salient region detection. IEEE transactions on pattern analysis and machine intelligence, 37(3):569-582, 2014.
Kaiming He, Xiangyu Zhang, Shaoqing Ren, and Jian Sun. Deep residual learning for image recognition. In Proceedings of the IEEE conference on computer vision and pattern recognition, pp. 770-778, 2016.

(56) References Cited

OTHER PUBLICATIONS

Andrew Howard, Mark Sandler, Grace Chu, Liang-Chieh Chen, Bo Chen, Mingxing Tan, Weijun Wang, Yukun Zhu, Ruoming Pang, Vijay Vasudevan, et al. Searching for mobilenetv3. In Proceedings of the IEEE International Conference on Computer Vision, pp. 1314-1324, 2019.
Gao Huang, Zhuang Liu, Laurens Van Der Maaten, and Kilian Q Weinberger. Densely connected convolutional networks. In Proceedings of the IEEE conference on computer vision and pattern recognition, pp. 4700-4708, 2017.
Laurent Itti, Christof Koch, and Ernst Niebur. A model of saliency-based visual attention for rapid scene analysis. IEEE Transactions on pattern analysis and machine intelligence, 20(11):1254-1259, 1998.
Alexander Kirillov, Yuxin Wu, Kaiming He, and Ross Girshick. Pointrend: Image segmentation as rendering. In Proceedings of the IEEE/CVF Conference on Computer Vision and Pattern Recognition, pp. 9799-9808, 2020.
Dominik A Klein and Simone Frintrop. Center-surround divergence of feature statistics for salient object detection. In 2011 International Conference on Computer Vision, pp. 2214-2219. IEEE, 2011.
Philipp Krahenbuhl and Vladlen Koltun. Efficient inference in fully connected crfs with gaussian edge potentials. In Advances in neural information processing systems, pp. 109-117, 2011.
Alex Krizhevsky, Ilya Sutskever, and Geoffrey E Hinton. Imagenet classification with deep convolutional neural networks. In Advances in neural information processing systems, pp. 1097-1105, 2012.
Guanbin Li and Yizhou Yu. Visual saliency based on multi-scale deep features. In Proceedings of the IEEE conference on computer vision and pattern recognition, pp. 5455-5463, 2015.
Xiang Li, Tianhan Wei, Yau Pun Chen, Yu-Wing Tai, and Chi-Keung Tang. Fss-1000: A 1000-class dataset for few-shot segmentation. In Proceedings of the IEEE/CVF Conference on Computer Vision and Pattern Recognition, pp. 2869-2878, 2020.
Guosheng Lin, Anton Milan, Chunhua Shen, and Ian Reid. Refinenet: Multi-path refinement networks for high-resolution semantic segmentation. In Proceedings of the IEEE conference on computer vision and pattern recognition, pp. 1925-1934, 2017.
Guosheng Lin, Chunhua Shen, Anton Van Den Hengel, and Ian Reid. Efficient piecewise training of deep structured models for semantic segmentation. In Proceedings of the IEEE conference on computer vision and pattern recognition, pp. 3194-3203, 2016.
Tsung-Yi Lin, Michael Maire, Serge Belongie, James Hays, Pietro Perona, Deva Ramanan, Piotr Dollar, and C Lawrence Zitnick. Microsoft coco: Common objects in context. In European conference on computer vision, pp. 740-755. Springer, 2014.
Nian Liu and Junwei Han. Dhsnet: Deep hierarchical saliency network for salient object detection. In Proceedings of the IEEE Conference on Computer Vision and Pattern Recognition, pp. 678-686, 2016.
Nian Liu, Junwei Han, and Ming-Hsuan Yang. Picanet: Learning pixel-wise contextual attention for saliency detection. In Proceedings of the IEEE Conference on Computer Vision and Pattern Recognition, pp. 3089-3098, 2018.
Jonathan Long, Evan Shelhamer, and Trevor Darrell. Fully convolutional networks for semantic segmentation. In Proceedings of the IEEE conference on computer vision and pattern recognition, pp. 3431-3440, 2015.
Zhiming Luo, Akshaya Mishra, Andrew Achkar, Justin Eichel, Shaozi Li, and Pierre-Marc Jodoin. Non-local deep features for salient object detection. In Proceedings of the IEEE Conference on computer vision and pattern recognition, pp. 6609-6617, 2017.
Robert Osserman et al. The isoperimetric inequality. Bulletin of the American Mathematical Society, 84(6):1182-1238, 1978.
Youwei Pang, Xiaoqi Zhao, Lihe Zhang, and Huchuan Lu. Multi-scale interactive network for salient object detection. In Proceedings of the IEEE/CVF Conference on Computer Vision and Pattern Recognition, pp. 9413-9422, 2020.
Chao Peng, Xiangyu Zhang, Gang Yu, Guiming Luo, and Jian Sun. Large kernel matters-improve semantic segmentation by global convolutional network. In Proceedings of the IEEE conference on computer vision and pattern recognition, pp. 4353-4361, 2017.
Olaf Ronneberger, Philipp Fischer, and Thomas Brox. U-net: Convolutional networks for biomedical image segmentation. In International Conference on Medical image computing and computer-assisted intervention, pp. 234-241. Springer, 2015.
Xiaoyong Shen, Aaron Hertzmann, Jiaya Jia, Sylvain Paris, Brian Price, Eli Shechtman, and Ian Sachs. Automatic portrait segmentation for image stylization. In Computer Graphics Forum, vol. 35, pp. 93-102. Wiley Online Library, 2016.
Jianping Shi, Qiong Yan, Li Xu, and Jiaya Jia. Hierarchical image saliency detection on extended cssd. IEEE transactions on pattern analysis and machine intelligence, 38(4):717-729, 2015.
Karen Simonyan and Andrew Zisserman. Very deep convolutional networks for large-scale image recognition. arXiv preprint arXiv:1409. 1556, 2014.
Christian Szegedy, Wei Liu, Yangqing Jia, Pierre Sermanet, Scott Reed, Dragomir Anguelov, Dumitru Erhan, Vincent Vanhoucke, and Andrew Rabinovich. Going deeper with convolutions. In Proceedings of the IEEE conference on computer vision and pattern recognition, pp. 1-9, 2015.
Jingdong Wang, Ke Sun, Tianheng Cheng, Borui Jiang, Chaorui Deng, Yang Zhao, Dong Liu, Yadong Mu, Mingkui Tan, Xinggang Wang, et al. Deep high-resolution representation learning for visual recognition. IEEE transactions on pattern analysis and machine intelligence, 2020.
Lijun Wang, Huchuan Lu, Xiang Ruan, and Ming-Hsuan Yang. Deep networks for saliency detection via local estimation and global search. In Proceedings of the IEEE Conference on Computer Vision and Pattern Recognition, pp. 3183-3192, 2015.
Lijun Wang, Huchuan Lu, Yifan Wang, Mengyang Feng, Dong Wang, Baocai Yin, and Xiang Ruan. Learning to detect salient objects with image-level supervision. In Proceedings of the IEEE Conference on Computer Vision and Pattern Recognition, pp. 136-145, 2017.
Linzhao Wang, Lijun Wang, Huchuan Lu, Pingping Zhang, and Xiang Ruan. Saliency detection with recurrent fully convolutional networks. In European conference on computer vision, pp. 825-841. Springer, 2016.
Yichen Wei, Fang Wen, Wangjiang Zhu, and Jian Sun. Geodesic saliency using background priors. In European conference on computer vision, pp. 29-42. Springer, 2012.
Ning Xu, Brian Price, Scott Cohen, and Thomas Huang. Deep image matting. In Proceedings of the IEEE Conference on Computer Vision and Pattern Recognition, pp. 2970-2979, 2017.
Chuan Yang, Lihe Zhang, Huchuan Lu, Xiang Ruan, and Ming-Hsuan Yang. Saliency detection via graph-based manifold ranking. In Proceedings of the IEEE conference on computer vision and pattern recognition, pp. 3166-3173, 2013.
Yi Zeng, Pingping Zhang, Jianming Zhang, Zhe Lin, and Huchuan Lu. Towards high-resolution salient object detection. In Proceedings of the IEEE International Conference on Computer Vision, pp. 7234-7243, 2019.
Chi Zhang, Guosheng Lin, Fayao Liu, Rui Yao, and Chunhua Shen. Canet: Class-agnostic segmentation networks with iterative refinement and attentive few-shot learning. In Proceedings of the IEEE Conference on Computer Vision and Pattern Recognition, pp. 5217-5226, 2019.
Jianming Zhang and Stan Sclaroff. Saliency detection: A boolean map approach. In Proceedings of the IEEE international conference on computer vision, pp. 153-160, 2013.
Lihe Zhang, Jianwu Ai, Bowen Jiang, Huchuan Lu, and Xiukui Li. Saliency detection via absorbing markov chain with learnt transition probability. IEEE Transactions on Image Processing, 27(2):987-998, 2017.
Lu Zhang, Ju Dai, Huchuan Lu, You He, and Gang Wang. A bi-directional message passing model for salient object detection. In Proceedings of the IEEE Conference on Computer Vision and Pattern Recognition, pp. 1741-1750, 2018.
Lihe Zhang, Chuan Yang, Huchuan Lu, Xiang Ruan, and Ming-Hsuan Yang. Ranking saliency. IEEE transactions on pattern analysis and machine intelligence, 39(9):1892-1904, 2016.

(56) References Cited

OTHER PUBLICATIONS

Pingping Zhang, Dong Wang, Huchuan Lu, Hongyu Wang, and Xiang Ruan. Amulet: Aggregating multi-level convolutional features for salient object detection. In Proceedings of the IEEE International Conference on Computer Vision, pp. 202-211, 2017.
Xiaoning Zhang, Tiantian Wang, Jinqing Qi, Huchuan Lu, and Gang Wang. Progressive attention guided recurrent network for salient object detection. In Proceedings of the IEEE Conference on Computer Vision and Pattern Recognition, pp. 714-722, 2018.
Hengshuang Zhao, Jianping Shi, Xiaojuan Qi, Xiaogang Wang, and Jiaya Jia. Pyramid scene parsing network. In Proceedings of the IEEE conference on computer vision and pattern recognition, pp. 2881-2890, 2017.
Jia-Xing Zhao, Jiang-Jiang Liu, Deng-Ping Fan, Yang Cao, Jufeng Yang, and Ming-Ming Cheng. Egnet: Edge guidance network for salient object detection. In Proceedings of the IEEE International Conference on Computer Vision, pp. 8779-8788, 2019.
Rui Zhao, Wanli Ouyang, Hongsheng Li, and Xiaogang Wang. Saliency detection by multi-context deep learning. In Proceedings of the IEEE conference on computer vision and pattern recognition, pp. 1265-1274, 2015.
Shuai Zheng, Sadeep Jayasumana, Bernardino Romera-Paredes, Vibhav Vineet, Zhizhong Su, Dalong Du, Chang Huang, and Philip HS Torr. Conditional random fields as recurrent neural networks. In Proceedings of the IEEE international conference on computer vision, pp. 1529-1537, 2015.
Wangjiang Zhu, Shuang Liang, Yichen Wei, and Jian Sun. Saliency optimization from robust background detection. In Proceedings of the IEEE conference on computer vision and pattern recognition, pp. 2814-2821, 2014.
X. Bai and G. Sapiro. Geodesic matting: A framework for fast interactive image and video segmentation and matting. International Journal of Computer Vision, 82(2):113-132, 2008.
Y. Y. Boykov and M.-P. Jolly. Interactive graph cuts for optimal, boundary & region segmentation of objects in n-d images. In Computer Vision, 2001. ICCV 2001. Proceedings. Eighth IEEE International Conference on, vol. 1, pp. 105-112. IEEE, 2001.
L.-C. Chen, G. Papandreou, I. Kokkinos, K. Murphy, and A. L. Yuille. Semantic image segmentation with deep convolutional nets and fully connected crfs. arXiv preprint arXiv:1412.7062, 2014.
R. Girshick, J. Donahue, T. Darrell, and J. Malik. Rich feature hierarchies for accurate object detection and semantic segmentation. In Computer Vision and Pattern Recognition (CVPR), 2014 IEEE Conference on, pp. 580-587. IEEE, 2014.
L. Grady. Random walks for image segmentation. Pattern Analysis and Machine Intelligence, IEEE Transactions on, 28(11):1768-1783, 2006. Part 1.
L. Grady. Random walks for image segmentation. Pattern Analysis and Machine Intelligence, IEEE Transactions on, 28(11):1768-1783, 2006. Part 2.
V. Gulshan, C. Rother, A. Criminisi, A. Blake, and A. Zisserman. Geodesic star convexity for interactive image segmentation. In Computer Vision and Pattern Recognition (CVPR), 2010 IEEE Conference on, pp. 3129-3136. IEEE, 2010.
G. Lin, C. Shen, I. Reid, et al. Efficient piecewise training of deep structured models for semantic segmentation. arXiv preprint arXiv:1504.01013, 2015.
Z. Liu, X. Li, P. Luo, C. C. Loy, and X. Tang. Semantic image segmentation via deep parsing network. arXiv preprint arXiv:1509.02634, 2015.
J. Long, E. Shelhamer, and T. Darrell. Fully convolutional networks for semantic segmentation. arXiv preprint arXiv:1411.4038, 2014.
B. L. Price, B. Morse, and S. Cohen. Geodesic graph cut for interactive image segmentation. In Computer Vision and Pattern Recognition (CVPR), 2010 IEEE Conference on, pp. 3161-3168. IEEE, 2010.
C. Rother, V. Kolmogorov, and A. Blake. Grabcut: Interactive foreground extraction using iterated graph cuts. ACM Transactions on Graphics (TOG), 23(3):309-314, 2004.
S. Zheng, S. Jayasumana, B. Romera-Paredes, V. Vineet, Z. Su, D. Du, C. Huang, and P. Torr. Conditional random fields as recurrent neural networks. arXiv preprint arXiv:1502.03240, 2015.
Roth, H.—"DeepOrgan: Multi-level Deep Convolutional Networks for Automated Pancreas Segmentation"—Jun. 22, 2015—arXiv: 1506.06448v1, pp. 1-12.
Wang, N.—"Transferring Rich Feature Hierarchies for Robust Visual Tracking"—Apr. 23, 2015—arXiv:1501.04587v2, pp. 1-9.
Farag, A.—"A Bottom-up Approach for Pancreas Segmentation using Cascaded Superpixels and (Deep) Image Patch Labeling"—May 22, 2015—Elsevier Journal of Medical Image Analysis, pp. 1-21.
D. Acuna, H. Ling, A. Kar, and S. Fidler. Efficient interactive annotation of segmentation datasets with Polygon-RNN++. In CVPR, 2018.
D. Batra, P. Yadollahpour, A. Guzman-Rivera, and G. Shakhnarovich. Diverse m-best solutions in markov random fields. In ECCV, 2012.
L. Castrejon, K. Kundu, R. Urtasun, and S. Fidler. Annotating object instances with a polygon-rnn. In IEEE CVPR, Jul. 2017.
L.-C. Chen, Y. Zhu, G. Papandreou, F. Schroff, and H. Adam. Encoder-decoder with atrous separable convolution for semantic image segmentation. arXiv preprint arXiv:1802.02611, 2018.
A. Criminisi, T. Sharp, and A. Blake. GeoS: Geodesic image segmentation. In ECCV, pp. 99-112, 2008.
M. Everingham, L. Van Gool, C. K. Williams, J. Winn, and A. Zisserman. The pascal visual object classes (VOC) challenge. IJCV, 88(2):303-338, 2010.
M. Firman, N. D. F. Campbell, L. Agapito, and G. J. Brostow. Diversenet: When one right answer is not enough. In IEEE CVPR, Jun. 2018.
D. Freedman and T. Zhang. Interactive graph cut based segmentation with shape priors. In IEEE CVPR, vol. 1, pp. 755-762. IEEE, 2005.
A. Guzman-rivera, D. Batra, and p. Kohli. Multiple choice learning: Learning to produce multiple structured outputs. In F. Pereira, C. J. C. Burges, L. Bottou, and K. Q. Weinberger, editors, NIPS, pp. 1799-1807. 2012.
B. Hariharan, P. Arbelaez, L. Bourdev, S. Maji, and J. Malik. Semantic contours from inverse detectors. 2011.
K. He, X. Zhang, S. Ren, and J. Sun. Deep residual learning for image recognition. In IEEE CVPR, Jun. 2016.
Y. Hu, A. Soltoggio, R. Lock, and S. Carter. A fully convolutional two-stream fusion network for interactive image segmentation. Neural Networks, 109:31-42, 2019.
M. Kass, A. Witkin, and D. Terzopoulos. Snakes: Active contour models. IJCV, 1(4):321-331, 1988.
H. Le, L. Mai, B. Price, S. Cohen, H. Jin, and F. Liu. Interactive boundary prediction for object selection. In ECCV, Sep. 2018.
S. Lee, S. Purushwalkam Shiva Prakash, M. Cogswell, D. Crandall, and D. Batra. Why M heads are better than one: Training a diverse ensemble of deep networks. CoRR, abs/1511.06314, 2015.
S. Lee, S. Purushwalkam Shiva Prakash, M. Cogswell, V. Ranjan, D. Crandall, and D. Batra. Stochastic multiple choice learning for training diverse deep ensembles. In D. D. Lee, M. Sugiyama, U. V. Luxburg, I. Guyon, and R. Garnett, editors, NIPS, pp. 2119-2127. 2016.
Y. Li, J. Sun, C.-K. Tang, and H.-Y. Shum. Lazy snapping. In ACM Transactions on Graphics, vol. 23, pp. 303-308, 2004.
Z. Li, Q. Chen, and V. Koltun. Interactive image segmentation with latent diversity. In IEEE CVPR, pp. 577-585, 2018.
J. H. Liew, Y. Wei, W. Xiong, S.-H. Ong, and J. Feng. Regional interactive image segmentation networks. In IEEE ICCV, Oct. 2017.
S. Mahadevan, P. Voigtlaender, and B. Leibe. Iteratively trained interactive segmentation. arXiv preprint arXiv:1805.04398, 2018.
K. Maninis, S. Caelles, J. Pont-Tuset, and L. Van Gool. Deep extreme cut: From extreme points to object segmentation. In IEEE CVPR, 2018.
K. McGuinness and N. E. OConnor. Toward automated evaluation of interactive segmentation. Computer Vision and Image Understanding, 115(6):868-884, 2011.
E. N. Mortensen and W. A. Barrett. Intelligent scissors for image composition. In Proceedings of the 22nd annual conference on Computer graphics and interactive techniques, pp. 191-198, 1995.

(56) References Cited

OTHER PUBLICATIONS

J. Redmon, S. Divvala, R. Girshick, and A. Farhadi. You only look once: Unified, real-time object detection. In Proceedings of the IEEE conference on computer vision and pattern recognition, pp. 779-788, 2016.
S. Ren, K. He, R. Girshick, and J. Sun. Faster r-cnn: Towards real-time object detection with region proposal networks. In Advances in neural information processing systems, pp. 91-99, 2015.
O. Russakovsky, J. Deng, H. Su, J. Krause, S. Satheesh, S. Ma, Z. Huang, A. Karpathy, A. Khosla, M. Bernstein, et al. Imagenet large scale visual recognition challenge. IJCV, 115(3):211-252, 2015.
S. Vicente, V. Kolmogorov, and C. Rother. Graph cut based image segmentation with connectivity priors. In IEEE CVPR, pp. 1-8. IEEE, 2008.
N. Xu, B. Price, S. Cohen, J. Yang, and T. S. Huang. Deep interactive object selection. In IEEE CVPR, pp. 373-381, Mar. 13, 2016.
K. Yamaguchi, M. H. Kiapour, L. E. Ortiz, and T. L. Berg. Parsing clothing in fashion photographs. In Computer Vision and Pattern Recognition (CVPR), 2012 IEEE Conference on, pp. 3570-3577. IEEE, 2012.
B. Zhou, H. Zhao, X. Puig, S. Fidler, A. Barriuso, and A. Torralba. Scene parsing through ade20k dataset. In Proceedings of the IEEE Conference on Computer Vision and Pattern Recognition, 2017.
Everingham, M. and VanGool, L. and Williams, C. K. I. and Winn, J. and Zisserman, A.; "The PASCAL Visual Object Classes Challenge 2007," (VOC2007) Results, Nov. 8, 2007, available at http://host.robots.ox.ac.uk/pascal/VOC/voc2007/.
Tsung-Yi Lin, Michael Maire, Serge Belongie, Lubomir Bourdev, Ross Girshick, James Hays, Pietro Perona, Deva Ramanan, C. Lawrence Zitnick, Piotr Dollár; "Microsoft COCO: Common Objects in Context," Submitted on May 1, 2014 (v1), last revised Feb. 21, 2015 (this version, v3), Cornell University Library, arXiv:1405.0312v3 [cs.CV], 15 pages.
Gao Huang, Zhuang Liu, Kilian Q. Weinberger, and Laurens V.D. Maaten; "Densely connected convolutional networks," In arXiv:1608.06993v3, 2016.
C. Szegedy, W. Liu, Y.Q. Jia, P. Sermanet, S. Reed, D. Anguelov, D. Erhan, V. Vanhoucke, and A. Rabinovich; "Going deeper with convolutions," In CVPR , 2015.
Chen et al., 'DISC: Deep Image Saliency Computing via Progressive Representation Learning', 2016, IEEE Transactions on Neural Networks and Learning Systems, vol. 27, No. 6, pp. 1135-1149 (Year: 2016).
Kamat, S. P.; Control Theory and Informatics, vol. 2, No. 1, 2012 Digital Image Processing for Camera Application in Mobile Devices using Artificial Neural Networks, pp. 11-17.
IEEE Conference on Computer Vision and Pattern Recognition (CVPR), 2016, Liang Chieh Chen et al, "Attention to Scale: Scale-Aware Semantic Image Segmentation", pp. 3640-3649 abstract 1. 7-9 and p. 2 left column, 1st paragraph starting at "In particular . . . ", 1. 4-7, Sec. 3.1, Fig. 5 col. (c).
IEEE/CVF International Conference on Computer Vision (ICCV), 2019, Liew Jun Hao et al, "MultiSeg: Semantically Meaningful, Scale-Diverse Segmentations From Minimal User Input", pp. 662-670 the whole document.
Chen, Liang-Chieh et al. "Rethinking Atrous Convolution for Semantic Image Segmentation." ArXiv abs/1706.05587 (2017): n. pag.
M. Rajchl et al., "DeepCut: Object Segmentation From Bounding Box Annotations Using Convolutional Neural Networks," in IEEE Transactions on Medical Imaging, vol. 36, No. 2, pp. 674-683, Feb. 2017, archived at arxiv.org/pdf/1605.07866.
Combined Search and Examination Report as received in UK application GB1915436.8 dated Aug. 12, 2020.
Combined Search & Examination Report as received in UK application GB1813276.1 dated Feb. 14, 2019.
Intention to Grant as received in UK application GB1915436.8 dated Aug. 25, 2021.
Zhang et al. in U.S. Appl. No. 16/988,055, filed Aug. 7, 2020, entitled Generating an Image Mask for a Digital Image by Utilizing a Multi-Branch Masking Pipeline With Neural Networks.
Guo, Z.—"Deep Learning-Based Image Segmentation on Multimodal Medical Imaging" - IEEE—Mar. 1, 2019—pp. 162-169 ( Year: 2019).
Wang, G.—"Interactive Medical Image Segmentation using Deep Learning with Image-specific Fine-tuning"—arXiv—Oct. 11, 2017—pp. 1-11 (Year: 2017).
Guo, Z.—"Medical Image Segmentation Based on Multi-Modal Convolutional Neural Network: Study on Image Fusion Schemes"—arXiv—Nov. 2, 2017—pp. 1-10 (Year: 2017).
Examination Report as received in Australian application 2019250107 dated Oct. 14, 2021.
Examination Report as received in Australian application 2019250107 dated Nov. 5, 2021.
Notice of Grant as received in UK application GB1813276.1 dated Oct. 12, 2021.
Notice of Grant as received in Australian application 2019250107 dated Mar. 17, 2022.
U.S. Appl. No. 14/945,245, filed Sep. 21, 2017, Preinterview 1st Office Action.
U.S. Appl. No. 14/945,245, filed Nov. 1, 2017, 1st Action Office Action.
U.S. Appl. No. 14/945,245, filed Apr. 17, 2018, Office Action.
U.S. Appl. No. 14/945,245, filed Sep. 12, 2018, Notice of Allowance.
U.S. Appl. No. 16/216,739, filed Feb. 25, 2021, Preinterview 1st Office Action.
U.S. Appl. No. 16/216,739, filed Apr. 5, 2021, 1st Action Office Action.
U.S. Appl. No. 16/216,739, filed Sep. 13, 2021, Office Action.
U.S. Appl. No. 16/216,739, filed Dec. 23, 2021, Notice of Allowance.
U.S. Appl. No. 15/799,395, filed Mar. 14, 2019, Office Action.
U.S. Appl. No. 15/799,395, filed Jul. 12, 2019, Notice of Allowance.
U.S. Appl. No. 15/967,928, filed Dec. 10, 2020, Preinterview 1st Office Action.
U.S. Appl. No. 15/967,928, filed Apr. 2, 2021, 1st Action Office Action.
U.S. Appl. No. 15/967,928, filed May 13, 2021, Office Action.
U.S. Appl. No. 15/967,928, filed Sep. 29, 2021, Notice of Allowance.
U.S. Appl. No. 16/231,746, filed Feb. 18, 2021, Preinterview 1st Office Action.
U.S. Appl. No. 16/231,746, filed Jun. 11, 2021, 1st Action Office Action.
U.S. Appl. No. 16/231,746, filed Nov. 10, 2021, Notice of Allowance.
U.S. Appl. No. 16/988,408, filed Oct. 5, 2021, Preinterview 1st Office Action.
U.S. Appl. No. 16/988,408, filed Nov. 24, 2021, 1st Action Office Action.
U.S. Appl. No. 16/988,408, filed Jan. 5, 2022, Notice of Allowance.
U.S. Appl. No. 16/376,704, filed Dec. 29, 2021, Preinterview 1st Office Action.
U.S. Appl. No. 16/376,704, filed Feb. 7, 2022, 1st Action Office Action.
Chang, Yong et al. "Accurate pelvis and femur segmentation in hip CT with a novel patch-based refinement." IEEE journal of biomedical and health informatics 23.3 (2018): 1192-1204. (Year: 2018).
Costea, Arthur Daniel, Andra Petrovai, and Sergiu Nedevschi. "Fusion scheme for semantic and instance-level segmentation." 2018 21st International Conference on Intelligent Transportation Systems (ITSC). IEEE, 2018. (Year: 2018).
Zhou, Peng, et al. "Deepstrip: High-resolution boundary refinement." Proceedings of the IEEE/CVF conference on computer vision and pattern recognition. 2020. (Year: 2020).
U.S. Appl. No. 17/585,140, Mar. 27, 2024, Notice of Allowance.
U.S. Appl. No. 17/584,233, Apr. 11, 2024, Office Action.
Office Action as received in CN application 201910967936.4 dated Jun. 5, 2024.

(56) References Cited

OTHER PUBLICATIONS

He et al. in Guided Image Filtering, IEEE Transactions on Pattern Analysis and Machine Intelligence, vol. 35, 2013.
He et al. in Fast Guided Filter, Computer Vision and Pattern Recognition, arXiv:1505.00996, 2015.
Ning Xu et al., "Deep GrabCut for Object Selection," published Jul. 14, 2017.
Yang et al., Meticulous Object Segmentation, Dec. 13, 2020, available at https://arxiv.org/pdf/2012.07181.pdf.
Office Action as received in CN application 201810886944.1 dated Dec. 29, 2023.
Wang, Y., Zhao, X., Li, Y., & Huang, K. (2018). Deep crisp boundaries: From boundaries to higher-level tasks. IEEE Transactions on Image Processing, 28(3), 1285-1298. (Year: 2018).
Le, T., & Duan, Y. (2020). REDN: a recursive encoder-decoder network for edge detection. IEEE Access, 8, 90153-90164. (Year: 2020).
Zhao, H., Shi, J., Qi, X., Wang, X., & Jia, J. (2017). Pyramid scene parsing network. In Proceedings of the IEEE conference on computer vision and pattern recognition (pp. 2881-2890). (Year: 2017).
Cheng, Ho & Chung, Jihoon & Tai, Yu-Wing & Tang, Chi-Keung. (2020). CascadePSP: Toward Class-Agnostic and Very High-Resolution Segmentation via Global and Local Refinement. arXiv:2005.02551v1 [cs.CV] May 6, 2020.
U.S. Appl. No. 17/126,986, Jan. 17, 2023, Notice of Allowance.
U.S. Appl. No. 17/660,361, Mar. 28, 2023, Notice of Allowance.
U.S. Appl. No. 17/200,525, Mar. 6, 2023, Office Action.
U.S. Appl. No. 16/376,704, Oct. 4, 2022, Notice of Allowance.
U.S. Appl. No. 17/660,361, Dec. 8, 2022, Office Action.
Zhang, Y., Li, X., Lin, M., Chiu, B., & Zhao, M. (2020). Deep-recursive residual network for image semantic segmentation. Neural computing and applications, 32, 12935-12947.
U.S. Appl. No. 17/200,525, Sep. 5, 2023, Notice of Allowance.
Office Action as received in CN application 201810886944.1 dated Apr. 8, 2023.
U.S. Appl. No. 17/584,233, Oct. 1, 2024, Office Action.

* cited by examiner

SEGMENTING OBJECTS USING SCALE-DIVERSE SEGMENTATION NEURAL NETWORKS

CROSS-REFERENCE TO RELATED APPLICATIONS

The present application is a continuation of U.S. application Ser. No. 16/231,746, filed on Dec. 24, 2018. The aforementioned application is hereby incorporated by reference in its entirety.

BACKGROUND

Recent years have seen significant development in hardware and software platforms for identifying and editing objects portrayed in digital images. Indeed, conventional digital image editing systems can select an object portrayed in a digital image and then modify the digital image based on the selection (e.g., modify the object portrayed in the digital image or place the object portrayed in the digital image on a different background image). To illustrate, conventional digital image editing systems can utilize machine learning models trained on large repositories of labeled digital images to analyze user selection of one or more foreground pixels (e.g., via a pixel selection tool or a digital lasso tool) and then identify an object corresponding to the foreground pixel for editing.

Although conventional digital image systems can identify an object portrayed in a digital image, these systems still have a number of shortcomings with regard to accuracy and efficiency. For example, with regard to accuracy, conventional digital image editing systems often identify incorrect objects portrayed in digital images. Indeed, because many digital images portray a variety of different objects multiple possible modes/selections exist that are equally plausible given a click set. As a result, conventional systems often identify inaccurate objects (e.g., select objects that users do not seek to select). For example, in response to user indication of a pixel within a logo of a shirt of a person portrayed in a digital image, ambiguity arises as to whether the user seeks to select the logo, the shirt, or the person. Conventional digital image editing systems often select the incorrect object due to this latent ambiguity.

In addition, conventional digital image editing systems also have a number of drawbacks in relation to efficiency. For example, conventional digital image editing systems often require a significant number of user interactions (and a significant amount of time) to select an object portrayed in a digital image. Indeed, conventional digital image editing systems can require a large number of different inputs of foreground and/or background pixels to accurately identify pixels corresponding to an object portrayed in a digital image. To illustrate, in order to isolate and select a shirt worn by a person portrayed in a digital image, conventional digital image editing systems can require a large number of user inputs to distinguish foreground pixels of the desired shirt from background pixels. This problem is only exacerbated when desired objects have similar visual features and characteristics relative to background objects (e.g., a digital image of a tree in front of background bushes).

Furthermore, as mentioned above, some digital image editing systems utilize machine learning models trained based on large repositories of training digital images to identify objects portrayed in digital images. Building and managing training digital image repositories with corresponding ground truth masks requires significant computing resources and time, further reducing efficiency of conventional systems. Some digital image editing systems seek to avoid these computational costs by utilizing models that encode rules or heuristics for selecting objects. These non-machine learning approaches, however, introduce additional problems in efficiency and accuracy. Indeed, such systems are limited to hand-crafted low-level features, which results in ineffective selection of different objects and excessive user interactions.

These and other problems exist with regard to identifying objects in digital visual media.

BRIEF SUMMARY

Embodiments of the present disclosure provide benefits and/or solve one or more of the foregoing or other problems in the art with systems, non-transitory computer-readable media, and methods for training and utilizing neural networks to identify multiple potential objects portrayed in digital media at differing scales. In particular, the disclosed systems can utilize a neural networks to produce a set of scale-varying segmentation proposals based on user input. Specifically, given an image and user interactions, the disclosed systems can generate a diverse set of segmentations at different scales from which a user can select a desired result.

To train and evaluate such a model, the disclosed systems can employ a training pipeline that synthesizes diverse training samples without requiring collection or generation of new training datasets. In particular, the disclosed systems can utilize a training input sampling strategy that simulates ambiguous user inputs where multiple possible segmentations are equally plausible. In this manner, the disclosed system can explicitly encourage the model to more accurately learn diversity in segmentation generation. Accordingly, the disclosed systems can generate training data with an ambiguous sampling strategy to efficiently train a neural network to generate multiple semantically significant segmentation outputs (at different scale variations).

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1A:
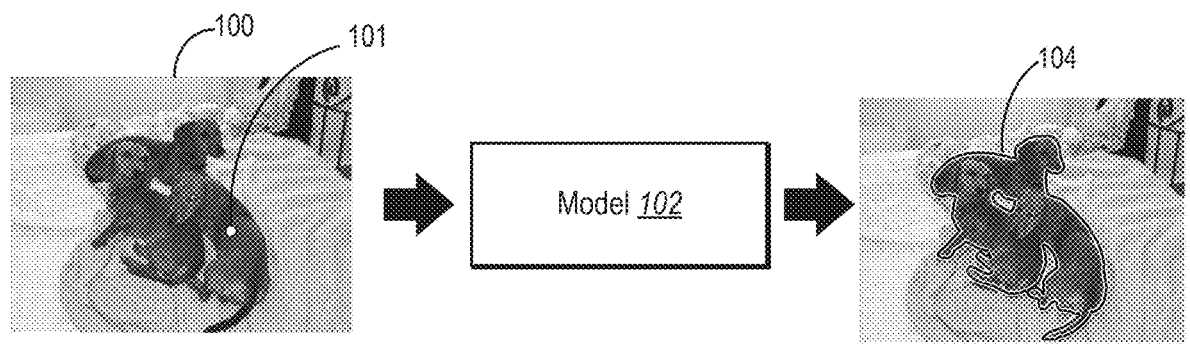
FIG. 1A illustrates an overview of a conventional segmentation approach.

This disclosure describes one or more embodiments of a digital object selection system that trains and utilizes scale-diverse segmentation neural networks to analyze digital images at different scales and identify different target objects portrayed in the digital images. In particular, the digital object selection system can utilize a single-stage or multi-stage scale-diverse segmentation neural network to suggest a plurality of object segmentation outputs at different scales based on minimal user input. The digital object selection system can improve target object selection by allowing users to choose a suggested selection from semantically meaningful alternatives defined with regard to scale, which leads to improved interpretation of each output and identification of target objects after just a few user interactions.

Moreover, the digital object selection system can efficiently train scale-diverse segmentation neural networks by explicitly encouraging segmentation diversity with definite sampling and ambiguous sampling approaches. In this manner, the digital object selection system can simulate ambiguity that arises in user indicators/user inputs and learn diversity in segmentation generation. Thus, the object selection system can efficiently train and utilize a scale-diverse segmentation neural network to resolve ambiguity and accurately select target objects within digital images with minimal user inputs.

To illustrate, in one or more embodiments, the digital object selection system receives a digital image (portraying a target object) and a user indicator (e.g., a foreground click, background click, and/or edge click corresponding to the target object). In response, the digital object selection system can utilize a scale-diverse segmentation neural network to generate multiple object segmentation outputs. Specifically, the digital object selection system can utilize the scale-diverse segmentation neural network to generate a first object segmentation output at a first scale based on the digital image and the user indicator. Moreover, the digital object selection system can utilize the scale-diverse segmentation neural network to generate a second object segmentation output at a second scale based on the digital image and the user indicator. Optionally, the digital object selection system can generate third, fourth, fifth, or more object segmentation outputs. As mentioned, the digital object selection system can provide the varying scale object segmentation outputs for display, allowing a client device to select the object segmentation output that aligns to one or more target objects or other desired outputs.

As just mentioned, the digital object selection system can generate segmentations based on user indicators corresponding to target objects portrayed in digital images. In particular, the digital object selection system can analyze a variety of user inputs that indicate how one or more pixels relate to target objects portrayed in the digital images. For example, the digital object selection system can analyze foreground indicators (e.g., foreground clicks), background indicators, edge indicators, boundary region indicators (e.g., a bounding box), and/or verbal indicators provided via a client device. The digital object selection system can then generate object segmentation selections based on these multiple user input modes and the digital image.

As discussed above, user indicators/inputs are often ambiguous. The digital object selection system can resolve this ambiguity by generating a diversity of object segmentation outputs defined in terms of scale. For example, the digital object selection system can define different scales in terms of size and aspect ratios. The digital object selection system can train and utilize a scale-diverse segmentation neural network that generates multiple segmentation outputs that correspond to (e.g., fit within) different scale anchor boxes of different sizes and aspect ratios. For instance, the scale-diverse segmentation neural network can generate segmentation masks and/or segmentation boundaries indicating different objects (or object groupings) portrayed in a digital image in relation to different scales.

In one or more embodiments, the digital object selection system can also generate more semantically meaningful object segmentation outputs by applying an object verification model as part of the scale-diverse segmentation neural network. For instance, the digital object selection system can incorporate a trained object classifier into the scale-diverse segmentation neural network architecture to determine (via an object score) that proposed object segmentations outputs reflect objects portrayed in digital images or otherwise semantically meaningful results.

Upon generating object segmentation outputs, the digital object selection system can provide the object segmentation outputs for display via a client device. For example, the digital object selection system can provide different object segmentation outputs for display via a client device to allow a user to identify the object segmentation output that aligns to a target object or other desired output. Based on user selection of an object segmentation output, the digital object selection system can select the corresponding target object (and modify the digital image based on the target object).

The digital object selection system can utilize single-stage or multi-stage scale-diverse segmentation neural networks. For example, in one or more embodiments, the digital object selection system utilizes a single-stage scale-diverse segmentation neural network that includes multiple output channels corresponding to multiple (pre-defined) scales. By utilizing different output channels trained to identify object segmentation outputs at different scales, the single stage scale-diverse segmentation neural network can generate a plurality of object segmentation outputs in a single pass.

In other embodiments, the digital object selection system can utilize a multi-stage scale-diverse segmentation neural network. In particular, the digital object selection system can utilize a multi-stage scale-diverse segmentation neural network trained to analyze a continuous range of input scales (e.g., rather than pre-defined input scales via different scale channels). For example, the digital object selection system can utilize a multi-stage scale-diverse segmentation neural network having an additional scale input plane to analyze a scale input that generates an object segmentation output specific to the scale input. The digital object selection system can generate a variety of different object segmentation outputs based on different scale inputs.

The digital object selection system can identify different scale inputs and generate different object segmentation outputs based on user input and/or based on a scale proposal neural network. For example, in one or more embodiments, the digital object selection system provides a user interface element for receiving scale inputs from a user (e.g., via a scale input slider or a timer input element that expands the scale based on user input time). In other embodiments, the digital object selection system can utilize a trained scale proposal neural network that analyzes a digital image and user indicators to generate input scales.

As mentioned above, the digital object selection system can also efficiently train a scale-diverse segmentation neural network. In particular, the digital object selection system can train a scale-diverse segmentation neural network utilizing a supervised training approach based on ground truth segmentations corresponding to particular scales and training indicators within training digital images. In addition, the digital object selection system can generate training data from existing training repositories. For example, the digital object selection system can generate positive and negative samples from existing training images. Moreover, the digital object selection system can generate definite samples and ambiguous samples. For instance, the digital object selection system can generate definite samples by gathering training indicators from foreground and background pixels that define a single ground truth segmentation. The digital object selection system can generate ambiguous samples by gathering training indicators from common foreground and/or common background pixels corresponding to multiple ground truth segmentations.

The digital object selection system provides a variety of advantages and benefits over conventional systems and methods. For example, by generating multiple object segmentation outputs at different scale levels, the digital object selection system can improve accuracy in identifying target objects in digital images. Indeed, because user indicators/ inputs are often ambiguous with regard to different combinations of objects in a digital image, the digital object selection system can generate multiple object segmentation outputs to identify the segmentation that accurately aligns to target objects. Indeed, the digital object selection system allows a user to choose the segmentation that is closest to the desired output and provide additional refinement if necessary. Furthermore, in one or more embodiments, by utilizing a scale-diverse segmentation neural network, the digital object selection system learns a deep representation that is better in understanding the semantic content of the image as compared to hand-crafted low-level features.

In addition, the digital object selection system can also improve efficiency relative to conventional systems. Indeed, the digital object selection system can utilize a scale-diverse segmentation neural network to analyze user indicators corresponding to a digital image at different scales to generate a set of object segmentation selections. By providing the set of object segmentation selections for user interaction, the digital object selection system can allow for efficient selection of an object segmentation that corresponds to particular target objects portrayed in the digital image with minimal user input. Indeed, the digital object selection system can simplify the selection process for users by allowing a user to choose from a set of suggested selections after just a few clicks (or even a single click).

Moreover, the digital object selection system can provide additional efficiencies in training scale-diverse segmentation neural networks. As mentioned above, the digital object selection system can train a scale-diverse segmentation neural network utilizing existing training data, which reduces the processing power and time required with building a labeled training dataset. Further, by using definite and/or ambiguous training samples, the digital object selection system can improve efficiency while also improving performance in generating distinguishable, diverse, semantically relevant segmentations relative to different scales.

As illustrated by the foregoing discussion, the present disclosure utilizes a variety of terms to describe features and advantages of the digital object selection system. Additional detail is now provided regarding the meaning of such terms. For example, as used herein, the term "neural network" refers to a machine learning model that can be tuned (e.g., trained) based on inputs to approximate unknown functions. In particular, a neural network can include a model of interconnected artificial neurons (in different layers) that communicate and learn to approximate complex functions and generate outputs based on a plurality of inputs provided to the model. For example, a neural network can include deep convolutional neural networks (i.e., "CNNs"), fully convolutional neural networks (i.e., "FCNs"), or recurrent neural networks (i.e., "RNNs"). In other words, a neural network is an algorithm that implements deep learning techniques, i.e., machine learning that utilizes a set of algorithms to attempt to model high-level abstractions in data.

Moreover, as used herein a "scale-diverse segmentation neural network" refers to a neural network that generates object segmentation outputs for a digital image based on scale. In particular, a scale-diverse segmentation neural network includes a fully-convolutional neural network that analyzes user indicators (e.g., in the form of distance map input channels) together with a digital image (e.g., in the form of RGB input channels) at different scales (e.g., anchor regions such as anchor boxes) to generate object segmentation outputs (e.g., segmentation boundaries and segmentation masks).

As used herein, the term "scale proposal neural network" refers to a neural network that generates different scales. In particular, a scale proposal neural network includes a neural network that analyzes input digital images and user indicators and generates a plurality of proposed scales. For example, the digital object selection system can utilize a scale proposal neural network to generate one or more scales that are utilized by a scale-diverse segmentation neural network to analyze a digital image.

As used herein, the term "object verification model" refers to a computer-implemented algorithm that determines an indication that a scale corresponds to one or more objects. In particular, an object verification model includes layers of a neural network that predict an object score that indicates whether a particular scale configuration contains objects. For example, an object verification model can include an object classifier neural network that determines an object score indicating whether an object segmentation output at a particular scale includes complete or partial objects.

As used herein, the term "digital image" refers to any digital visual representation (e.g., digital symbol, picture, icon, or illustration). For example, the term "digital image" includes digital files with the following file extensions: JPG, TIFF, BMP, PNG, RAW, or PDF. A digital image can include a part or portion of other digital visual media. For instance, a digital include can include one or more frames of a digital video. Accordingly, digital images can also include digital files with the following file extensions: FLV, GIF, MOV, QT, AVI, WMV, MP4, MPG, MPEG, or M4V. Indeed, although many example embodiments are described in relation to digital images, the digital object selection system can also select objects in frames of digital videos.

As used herein, the term "object" refers to an item, design, person, or thing. In particular, the term object includes a person or thing portrayed (represented) in a digital image. An object can include other objects. For example, a person (i.e., an object) in a digital image can include a shirt, pants, shoes, face, etc. Similarly, a group of animals in a digital image can include multiple individual animals. Moreover, as used herein, the term "target object" refers to an object portrayed in a digital image that is sought to be identified or selected. For instance, the term "target object" includes an object reflected in a digital image, that a user seeks to identify or select.

As used herein, the term "user indicators" refers to user input in relation to a target object of a digital image (e.g., user selections of one or more pixels). In particular, the term user indicators includes user input indicating one or more pixels of a digital image and an indication of how the one or more indicated pixels correspond to a target object portrayed in the digital image. For example, user indicators can include positive indicators (also called foreground indicators, such as a click or swipe of foreground pixels of a target object), negative indicators (also called background indicators, such as a click or swipe of background pixels not include as part of a target object), edge indicators (e.g., a click along a boundary or edge between a target object and background), a boundary region indicator (e.g., user input of a bounding box or other shape that encompasses a target object), or verbal indicator (e.g., verbal input such as text input or spoken input indicating pixels of a target object).

As used herein, the term "object segmentation output" (or "segmentation" or "object segmentation") refers to an indication of a plurality of pixels portraying one or more objects. For example, an object segmentation output can include a segmentation boundary (e.g., a boundary line or curve indicating an edge of one or more objects) or a segmentation mask (e.g., a binary mask identifying pixels corresponding to an object).

As used herein, the term "scale" refers to an indication of a relative portion, size, extent, or degree. In particular, scale includes an indication of a portion, size, extent, or degree of a digital image. For instance, the term scale can include an anchor region (e.g., an anchor box or anchor circle) of a particular size, shape, and/or dimension. To illustrate, a scale can include an anchor box with a particular size (e.g., area or dimension) and aspect ratio that defines a portion of a digital image. Similarly, a scale can include or an anchor circle (or other shape) with a particular radius that defines a portion of a digital image.

As used herein, the term "training" is used as a modifier to describe information, data, or objects utilized to train a neural network. For example, a training digital image portraying a training object refers to a digital image portraying an object utilized to train a neural network (e.g., an object or collection of individual objects corresponding to a ground truth mask). Similarly, training indicators refer to user indicators (or samples approximating user indicators) used to train a neural network. As described below, training indicators can include definite indicators (sometimes referred to as definite samples, which refer to training indicators that indicate a particular object segmentation in a digital image) and/or ambiguous indicators (sometimes referred to as ambiguous samples, which refer to training indicators that indicate multiple possible object segmentations in a digital image). Similarly, as used herein, the term "ground truth segmentation" refers to a segmentation (e.g., a ground truth boundary or ground truth mask) indicating pixels of a training object.

Figure 1B:
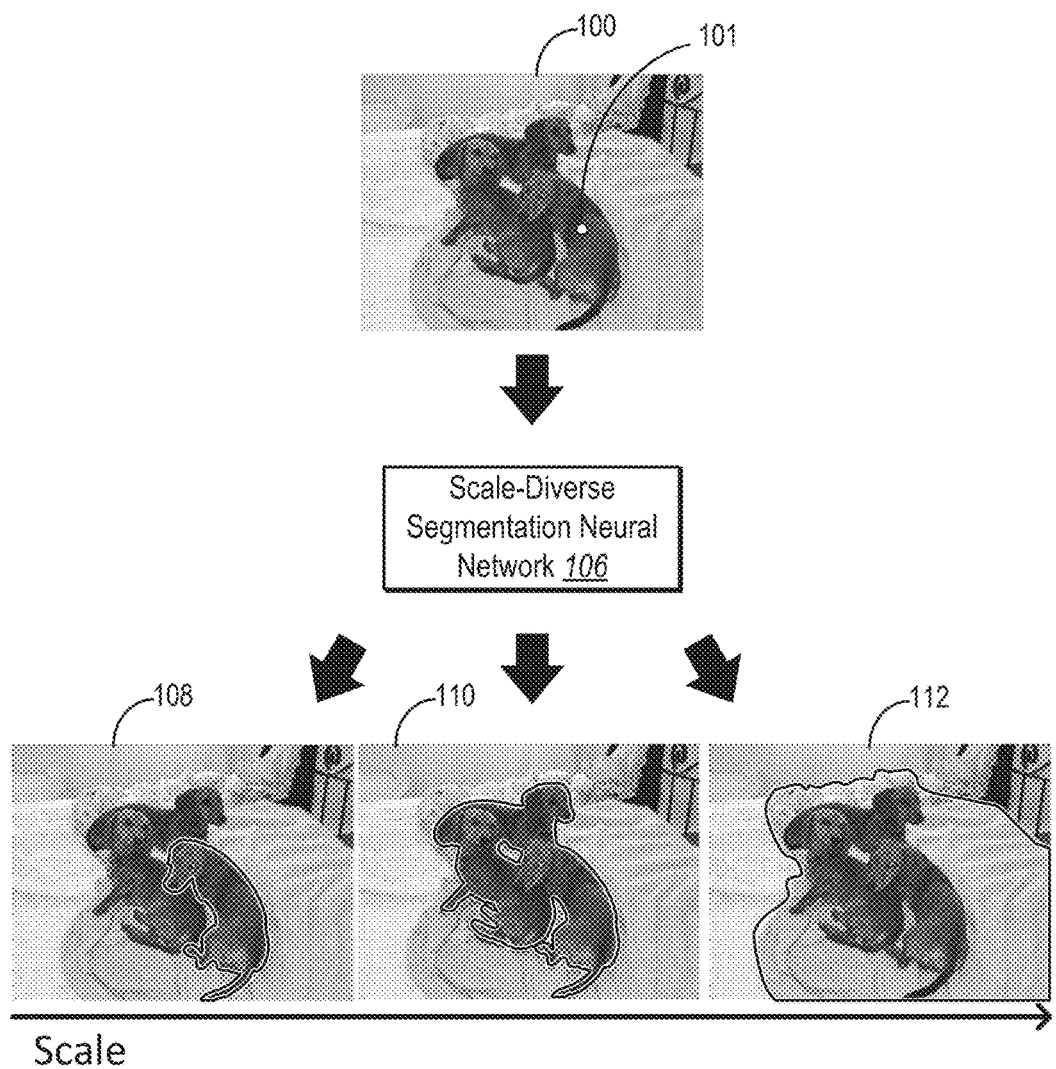
FIG. 1B illustrates an overview of utilizing a scale-diverse segmentation neural network to generate a plurality of object segmentation outputs from a digital image in accordance with one or more embodiments.

Additional detail regarding various embodiments of the digital object selection system will now be provided in relation to illustrative figures. For example, as discussed above, the digital object selection system can improve efficiency and accuracy relative to conventional systems by generating a plurality of scale-varying object segmentation outputs. FIGS. 1A-1B contrast applying a conventional approach for identifying a target object in a digital image with one or more embodiments of the digital object selection system.

Specifically, FIG. 1A illustrates a digital image 100 and a corresponding user indicator 101 (i.e., a foreground (or positive) indicator). As shown, conventional systems provide the digital image 100 and user indicator to a model 102, which identifies a segmentation 104 of three dogs portrayed in the digital image 100. However, as illustrated in FIG. 1A, the digital image 100 contains multiple different objects and the user indicator 101 is ambiguous as to what combination of the different objects is desired as the target object. Indeed, the digital image 100 portrays three different dogs lying on a blanket on a bed. Accordingly, the user indicator 101 could indicate a desire to select one dog; two dogs; three dogs; three dogs and the blanket; or three dogs, the blanket, and the bed. Despite this ambiguity, the model 102 generates the segmentation 104 of the three dogs.

This approach requires a variety of additional user inputs to select a particular target object. For example, to select a single dog, the conventional system of FIG. 1A would require a number of user indicators to differentiate the desired dog from the other objects portrayed in the digital image 100. For example, a client device would need to capture negative user indicators around the desired dog to exclude the blanket, the bed, and other dogs from the resulting segmentation.

In contrast, FIG. 1B illustrates utilizing a scale-diverse segmentation neural network 106 in accordance with one or more embodiments of the digital object selection system. As shown, the digital object selection system analyzes the digital image 100 and the user indicator 101 utilizing the scale-diverse segmentation neural network 106 to generate a plurality of scale-variant object segmentation outputs 108-112. Indeed, as shown in FIG. 1, the object segmentation output 108 identifies a single dog, the object segmentation output 110 identifies three dogs, and the object segmentation output 112 identifies three dogs and the blanket the dogs are sitting on. The digital object selection system provides the object segmentation outputs 108-112 for display via a client device. Moreover, if a user seeks to select a single dog, the user can interact with the object segmentation output 108 via a client device. Thus, by providing a single user indicator, the user can identify the appropriate segmentation from a plurality of segmentations generated by the digital object selection system.

As illustrated in FIG. 1B, the digital object selection system generates the plurality of object segmentation outputs 108-112 based on a plurality of scales. Indeed, the digital object selection system can apply a first (small) scale to generate the object segmentation output 108, a second (medium) scale to generate the object segmentation output 110, and a third (large) scale to generate the object segmentation output 112. As illustrated, the digital object selection system can thus generate a plurality of semantically meaningful segmentations (e.g., segmentations that portray meaningful, complete objects) in a logical progression (e.g., based on scale) to allow for fast and accurate target object selection.

Although FIG. 1B illustrates three object segmentation outputs, the digital object selection system can generate additional (or fewer) object segmentation outputs. For example, in some embodiments, the digital object selection system generates twelve object segmentation outputs at different scales (e.g., segmentations including the bed, two dogs, etc.). Moreover, although FIG. 1B illustrates a particular user indicator (e.g., a positive indicator), the digital object selection system can analyze a variety of different inputs.

Indeed, as mentioned above, the digital object selection system can analyze a combination of a variety of user inputs via a scale-diverse segmentation neural network to generate a variety of different object segmentations. For example, FIG. 2A-2C illustrate inputs to a scale-diverse segmentation neural network 201, architecture of the scale-diverse segmentation neural network 201, and outputs of a scale-diverse segmentation neural network 201 in accordance with one or more embodiments.

Figure 2A:
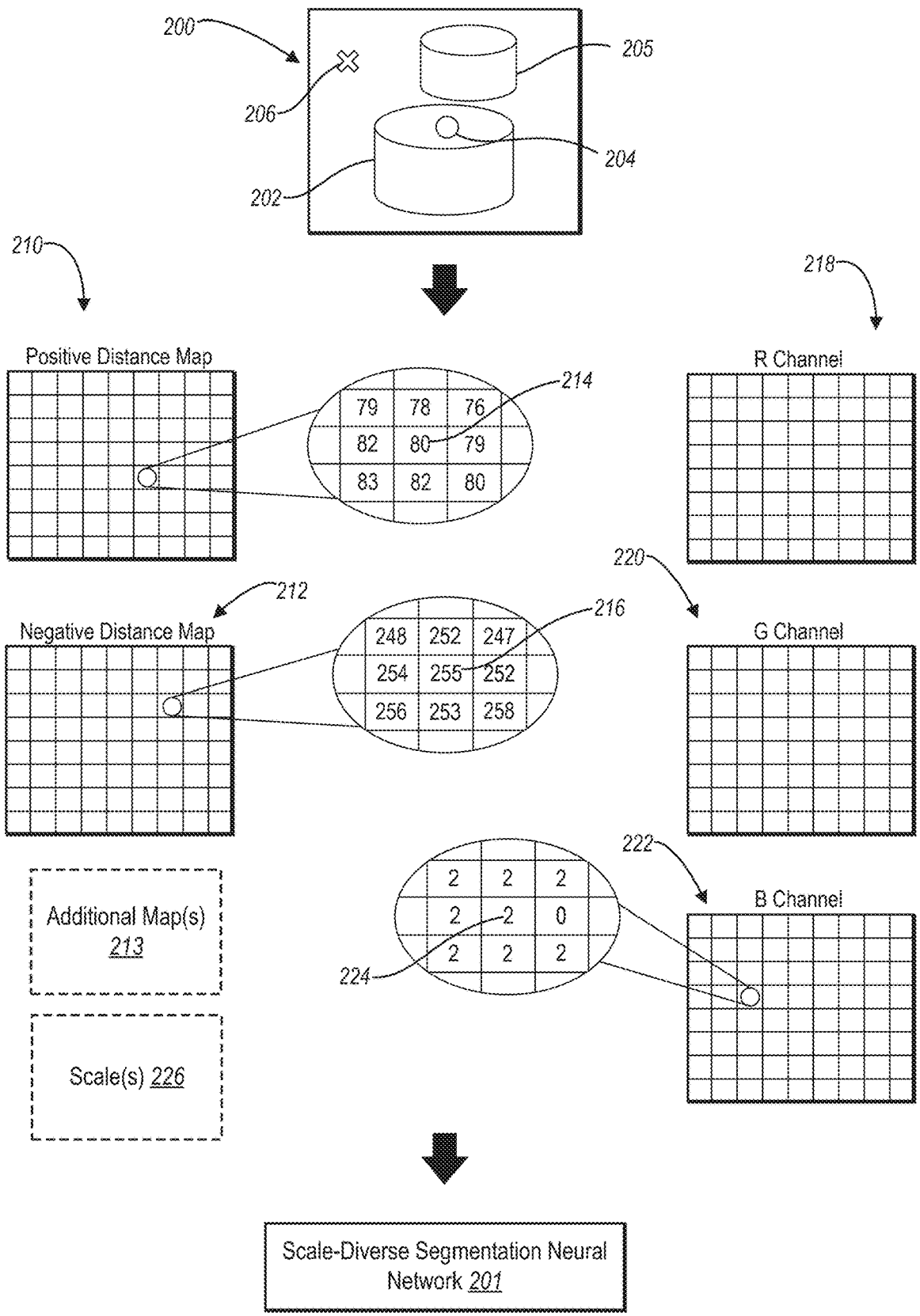
FIGS. 2A-2C illustrate digital inputs, layers, and outputs of a scale-diverse segmentation neural network that utilizes multiple channels for generating multiple object segmentation outputs corresponding to multiple scales in accordance with one or more embodiments.
Figure 2B:
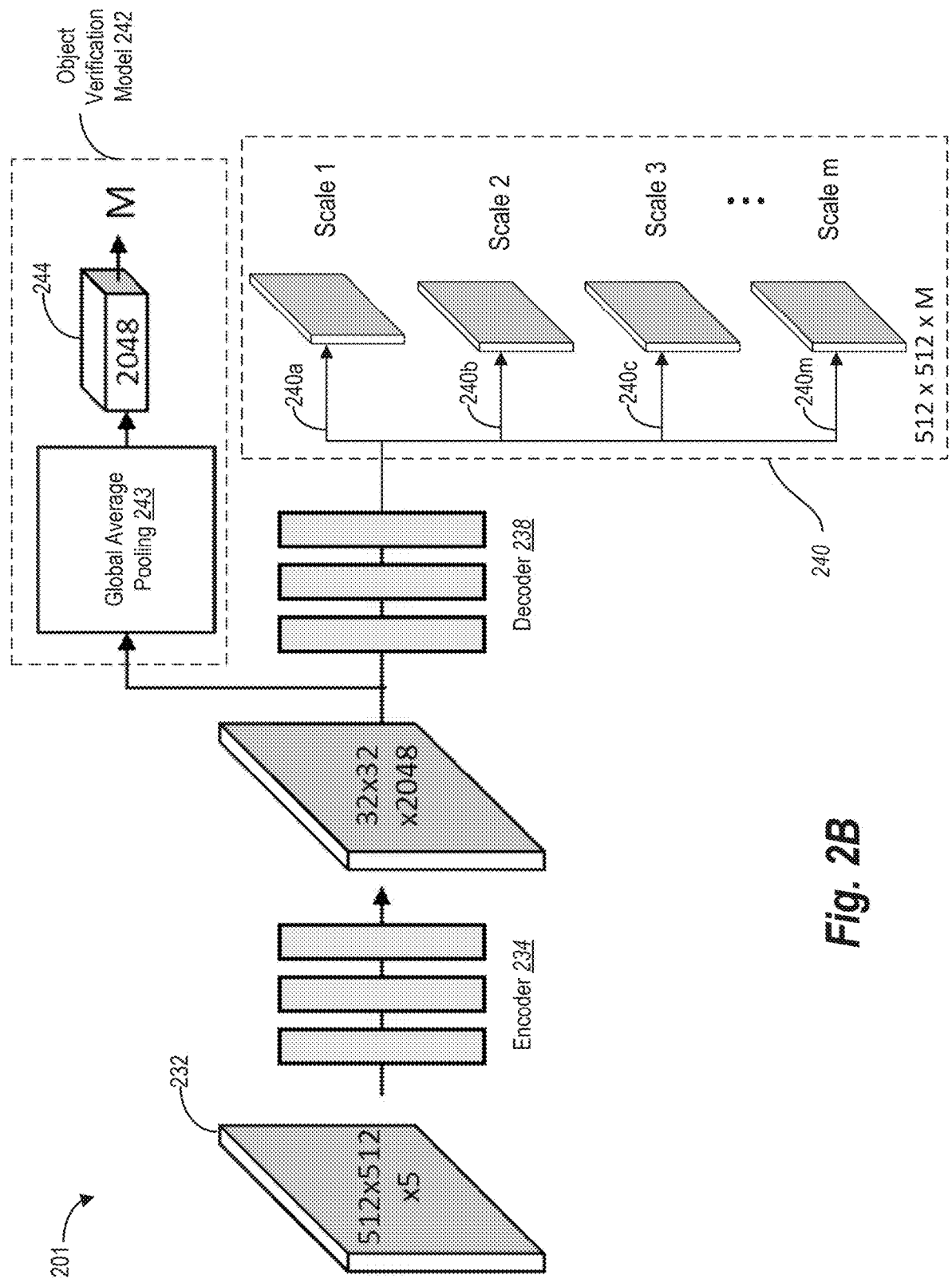
Figure 2C:
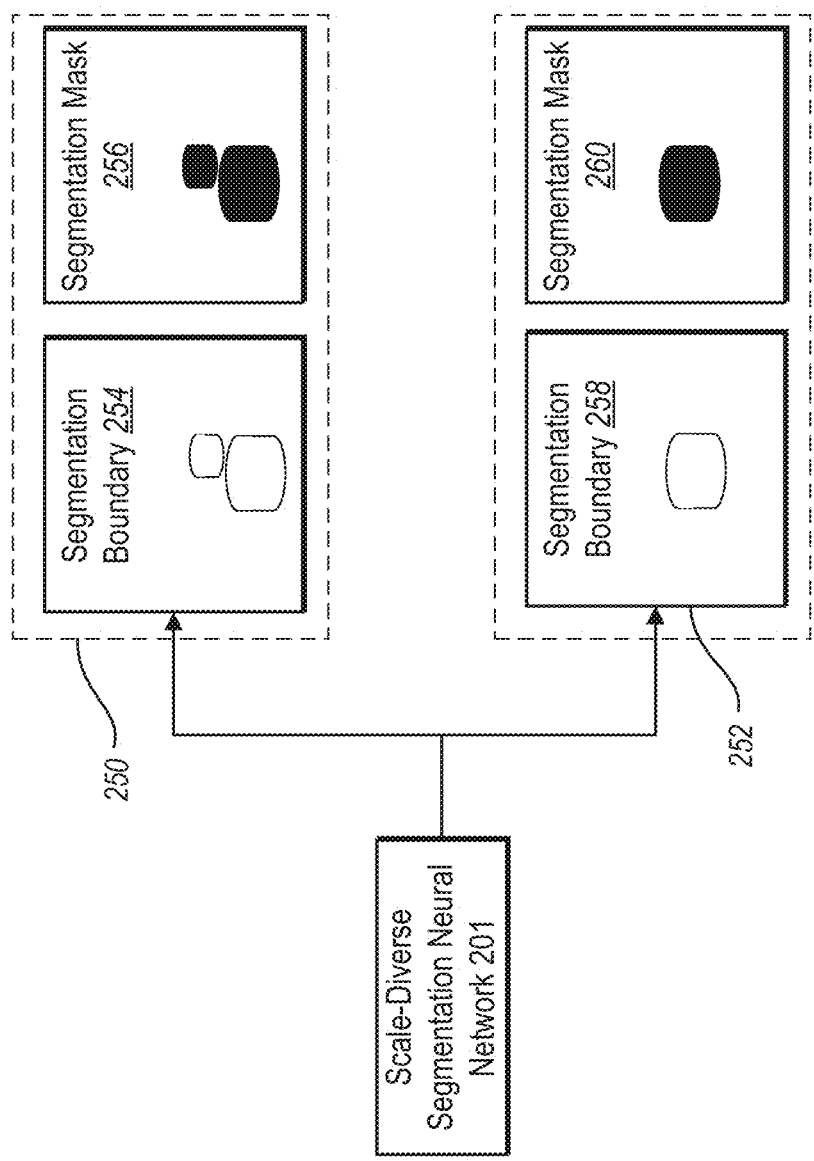

Specifically, FIG. 2A illustrates a digital image 200 with user indicators, including a positive indicator 204 (e.g., a positive click on a pixel of the target object) and a negative indicator 206 (e.g., a negative click on a pixel of the background outside of the target object). The digital object selection system can recognize various types of user input as positive indicators and negative indicators. For example, in one or more embodiments, the digital object selection system recognizes a left mouse click, a single tap touch gesture, a circle, or another type of user input as an indication of a positive user indicator. Similarly, the digital object selection system can recognize a right mouse click, a double tap touch gesture, an "x," or as an indication of a negative user indicator.

As illustrated in FIG. 2A, the digital object selection system utilizes a digital image together with user indicators to generate distance maps. For example, as illustrated in FIG. 2A, the digital object selection system generates distance maps 210, 212 based on the digital image 200 and the user indicators 204, 206. In particular, the digital object selection system generates a positive distance map 210 based on the positive user indicator 204. Moreover, the digital object selection system generates a negative distance map 212 based on the negative user indicator 206.

As used herein, a "distance map" refers to a digital item that reflects a distance between a pixel and a selected pixel in a digital image. For instance, a distance map can include a database or digital file that includes distances between pixels in a digital image and selected pixels (i.e., positive user indicators or negative user indicators). For example, a positive distance map includes a digital item that reflects a distance between a pixel in a digital image and a selected pixel that is part of a target object. Similarly, a negative distance map includes a digital item that reflects a distance between a pixel and a selected pixel that is not part of a target object.

For example, with regard to FIG. 2A, the positive distance map 210 comprises a two-dimensional matrix with entries for each pixel in the digital image 200. Specifically, the positive distance map 210 comprises a matrix with entries for pixels in the digital image 200, where each entry reflects the distance between the pixel corresponding to the entry and the positive user indicator 204. Thus, as illustrated, an entry 214 in the positive distance map 210 reflects the distance (i.e., 80 pixels) between the pixel corresponding to the entry 214 and the pixel corresponding to the positive user indicator 204.

Similarly, the negative distance map 212 comprises a two-dimensional matrix with entries for pixels in the digital image 200. Specifically, each entry in the negative distance map 212 reflects the distance between the pixel corresponding to the entry and the negative user indicator 206. Thus, as illustrated, an entry 216 reflects the distance (i.e., 255 pixels) between the pixel corresponding to the entry 216 and the pixel corresponding to the negative user indicator 206.

As illustrated in FIG. 2A the digital object selection system can also provide (alternative or) additional maps 213 as input to the scale-diverse segmentation neural network 201. For example, with regard to edge indicators (e.g., clicks indicating an edge of a target object), the digital object selection system can provide an edge distance map reflecting distance between the selected edge pixel and other pixels of the digital image. Similarly, for boundary box indicators, the digital object selection system can provide a boundary distance map reflecting distance between any pixel of the digital image and the pixels of the bounding box. The digital object selection system can provide each distance map via a particular channel trained to analyze the particular type of user input (e.g., an edge channel for edge distance maps).

Although FIG. 2A illustrates a single positive user indicator and a single negative user indicator, it will be appreciated that the digital object selection system can also generate distance maps based on additional (or fewer) user indicators. For example, in circumstances where the digital object selection system receives a plurality of positive user indicators (or a plurality of edge indicators), the digital object selection system generates a distance map that reflects the distance between a pixel and the nearest user indicator. Similarly, in circumstances where the digital object selection system receives a plurality of negative user indicators, the digital object selection system generates a negative distance map that reflects the distance between a pixel and the nearest negative user indicator. In yet other embodiments, the digital object selection system generates a separate distance map for each user indicator.

In addition to distance maps, the digital object selection system also utilizes one or more color channels. For example, with regard to FIG. 2A, the digital object selection system utilizes three color channels, an R channel 218 (corresponding to red colors), a G channel 220 (corresponding to green colors), and a B channel 222 (corresponding to blue colors). In particular, in one or more embodiments, each color channel 218-222 comprises a two-dimensional matrix (e.g., a color map) with entries for each pixel in the digital image 200. Specifically, as shown, the B channel 222 comprises a matrix (e.g., a blue color map) with entries for each pixel in the digital image 200, where each entry (e.g., an entry 224) reflects the amount of blue corresponding to each pixel. Thus, the entry 224, corresponding to a pixel with very little blue color, reflects a low value (i.e., one) in the B channel 222.

Although illustrated as three separate channels, the digital object selection system can utilize fewer or more channels. For example, the digital object selection system can utilize four color channels in conjunction with CMYK images. Similarly, the digital object selection system can utilize a single color channel with regard to gray scale images. Moreover, although illustrated as R, G, and B channels with regard to FIG. 2A, it will be appreciated that the digital object selection system can utilize a variety of other colors or color spaces for color channels. For instance, in one or more embodiments, the digital object selection system utilizes an LAB color space and LAB color channels rather than an RGB color space and RGB color channels.

In one or more embodiments the digital object selection system generates an image/user interaction pair (e.g., a combination of distance maps and color channels). For example, FIG. 2A generates an image/user interaction pair by combining user interaction data reflected in the positive distance map 210 and the negative distance map 212 and image data reflected in color channels 218-222.

In one or more embodiments, the digital object selection system utilizes a series of equations and algorithms to generate the image/user interaction pair. For example, in one or more embodiments, the digital object selection system defines a sequence of user indicators, $\mathcal{S}$, that include a set of positive user indicators, $\mathcal{S}^1$ (e.g., the positive user indicator 204), and a set of negative user indicators, $\mathcal{S}^0$ (e.g., the negative user indicator 206). In one or more embodiments, the digital object selection system utilizes Euclidean distance transformation (or some other distance measure, such as a truncated distance map or non-linear gaussian distribution) to transform $\mathcal{S}^1$ and $\mathcal{S}^0$ to separate channels $U^1$ (e.g., positive distance map 210) and $U^0$ (e.g., the negative distance map 212), respectively. Each channel, $U^1$ and $U^0$, reflects a two-dimensional matrix with the same height and width as a digital image (e.g., the digital image 200). More particularly, the number of rows in the matrix equates to the number of pixel rows in the digital image, and the number of columns in the matrix equates to the number of pixels columns in the digital image.

To calculate the distance value $u_{ij}^t$ (e.g., the entry 214 in the positive distance map 210 or the entry 216 in the negative distance map 212) at the location (i,j), $t \in \{0,1\}$, in one or more embodiments the digital object selection system defines an operator, $f$, that calculates the minimum Euclidean distance (or other distance) between a point (e.g., a pixel in the digital image 200) and a set (e.g., a set of positive user indicators including the positive user indicator 204). In other words, the digital object selection system defines operator $f$ such that given a set of points $p_{i,j} \in \mathcal{A}$ where (i, j) is the point location, then for any point $p_{m,n} | \mathcal{A} = \min_{\forall p_{ij} \in \mathcal{A}} \sqrt{(m-i)^2 + (n-j)^2}$. Moreover, the digital object selection system can define $u_{ij}^t$ (e.g., individual entries in the distance maps) by the following:

$$u_{ij}^t = f(p_{i,j} | \mathcal{S}^t), t \in \{0, 1\}$$

In one or more embodiments, for the efficiency of data storage, the digital object selection system takes the unsigned integer part of $u_{ij}^t$ and truncates it at 255.

Accordingly, with regard to FIG. 2A, the digital object selection system generates the positive distance map 210 and the negative distance map 212 utilizing the channels $U^1$ and $U^0$. For instance, the channel $U^1$ provides the matrix illustrated with regard to positive distance map 210. Moreover, the digital object selection system combines color channels 218-222 with the distance maps reflecting $U^1$ and $U^0$ to generate the image/user interaction pair.

In other words, the digital object selection system can transform the sparse binary positive and negative clicks to two truncated Euclidean distance maps $u=(u_+; u_-)$ to the union of the user's positive clicks and the union of the user's negative clicks, respectively, before concatenating with the RGB input image to form a 5-channel input (x, u).

As shown in FIG. 2A, the digital object selection system can also provide a scale 226 (or additional scales) as input to the scale-diverse segmentation neural network 201. For example, the scale 226 can include a size (e.g., a vertical or horizontal dimension of an anchor box) and aspect ratio.

As mentioned above, in some embodiments, the digital object selection system utilizes a multi-stage scale-diverse segmentation neural network that can consider a variety of scales (e.g., any scale entry along a continuous range that fits within a digital image) as input. In such embodiments, the digital object selection system can utilize the scale 226 as input to generate an object segmentation output. Additional detail regarding providing scales as input to a neural network (e.g., a multi-stage scale-diverse segmentation neural network) is provided below (e.g., in relation to FIG. 7).

In other embodiments, the digital object selection system can utilize a network architecture that includes channels for different scales and generates object segmentation outputs according to the different scales. For instance, the digital object selection system can formulate a set of scales and then include an output channel for each scale in the scale-diverse segmentation neural network. As mentioned above, using this single-stage approach, the digital object selection system can generate a plurality of object segmentation maps in a single pass. Additional detail regarding such a single-stage scale-diverse segmentation neural network is discussed in the remainder of FIGS. 2B-2C.

For instance, in one or more embodiments, the digital object selection system defines different scales (e.g., scale diversity) with regard to different combinations of aspect ratios a and sizes s. Mathematically, given P sizes and Q aspect ratios, M=PQ possible combinations of scale exist, $S=\{(s_p, a_q) | p=1, \ldots, P, q=1, \ldots, Q\}$. Given an input image $x \in \mathbb{R}^{H \times W \times 3}$ and some user inputs $u \in \mathbb{R}^{H \times W \times 2}$, the digital object selection system can formulate the task of synthesizing a diverse set of segmentations as learning a mapping function $f(; \theta, S)$ that is parameterized by $\theta$ and conditioned on a set of predefined scales S:

$$\mathcal{O} = f(x, u; \theta, S)$$

where $\mathcal{O} = \{o_1, o_2 \ldots o_M\}$ is a set of scale-diverse segmentation outputs where each segmentation output $o_i$ corresponds to a 2D scale in S.

To illustrate, in one or more embodiments, the digital object selection system resizes the digital image 200 to 512×512. The digital object selection system then uses 3 aspect ratios (1:1, 1:2 and 2:1) and 3 scales (64, 128, 256). On top of that, the digital object selection system includes 3 anchors with size of 16, 32, and 512 with aspect ratio of 1:1, resulting in 12 proposals in total. Although the foregoing example utilizes 12 anchor boxes with particular sizes and aspect ratios, the digital object selection system can utilize a variety of different anchors (e.g., circular anchors), a variety of different sizes and/or shapes, and a different number of anchors (e.g., 5 or 20).

Upon generating inputs illustrated in FIG. 2A, the digital object selection system can analyze the inputs utilizing the scale-diverse segmentation neural network 201. For example, FIG. 2B illustrates an example architecture of the scale-diverse segmentation neural network 201 (e.g., a single-stage scale-diverse segmentation neural network) in accordance with one or more embodiments. Specifically, FIG. 2B illustrates the scale-diverse segmentation neural network 201, which includes a 512×512×5 input layer 232 (e.g., for the 5-channel input discussed in FIG. 2A which can be modified for different input indicators), an encoder 234, a decoder 238, and a 512×512 output layer 240 with M output channels 240a-240m. As shown in FIG. 2B, the digital object selection system also includes an object verification model 242 having a global average pooling layer 243 and a fully connected layer 244.

In one or more embodiments, the scale-diverse segmentation neural network 201 comprises a fully-convolutional neural network. For example, the digital object selection system can utilize the ResNet-101 variant of DeepLabv3+ equipped with (1) dilated convolutional kernels (i.e., to increase the output resolution while keeping the same amount of network parameters), (2) an Atrous Spatial Pyramid Pooling (ASPP) encoder (the encoder 234) to encode rich multi-scale contextual information and (3) a decoder (the decoder 238) to recover the object boundaries.

In one or more embodiments, the digital object selection system can generate the scale-diverse segmentation neural network 201 by applying the following modifications to the ResNet-101 variant of DeepLabv3+: (1) modify the first convolution filter to accept the additional (two or more) channels of user input u; (2) modify the output layer to have M channels (i.e., outputs/branches) that correspond to M different scales; and (3) add the object verification model 242 as a new fully connected layer with M outputs appended before the decoder to predict an object score for each of the M segmentation masks.

Utilizing the architecture illustrated in FIG. 2B, the digital object selection system can analyze the inputs described in relation to FIG. 2A. For example, the digital object selection system can analyze encoded 512×512 color maps and distance maps via the encoder 234. Specifically, the encoder 234 can utilize tunable parameters (e.g., internal weighting parameters that can be modified in training, such as via back propagation) to generate one or more latent feature maps reflecting features of the digital image and input indicators. The digital object selection system can then utilize the decoder 238 and the output layer 240 to analyze the latent feature maps with respect to M varying scales. As shown, the output layer 240 includes M output channels 240a-240m for each of M different scales.

As shown, the digital object selection system can also utilize the object verification model 242 of the scale-diverse segmentation neural network 201. Indeed, as discussed above, not all scales necessarily correspond to meaningful selections. The digital object selection system can utilize the object verification model 242 to filter and/or remove scales (i.e., segmentation outputs) that do not include meaningful object selections. To illustrate, the digital object selection system can utilize the object verification model 242 to remove segmentations that include partial or incomplete objects or other non-semantically meaningful outputs.

As illustrated, the global average pooling layer 243 and the fully connected layer 244 can analyze latent feature maps generated by the encoder 234 to output M object scores (e.g., confidence scores) for the M scale-diverse segmentations. The digital object selection system can analyze the object scores to determine scales portraying semantically meaningful results. For example, the digital object selection system can filter/remove segmentations with low object scores (e.g., below a threshold object score). Similarly, the digital object selection system can provide segmentations for display with high object scores (e.g., higher than a threshold object score).

To illustrate, in one or more embodiments, the scale-diverse segmentation neural network 201 applies one or more post-processing mechanism to remove segmentation proposals that portray incomplete objects. Generally, a meaningful segmentation includes confident predictions (either from confidence scores generated by the output layer 240 or the object score generated via the object verification model 242) at a large portion of the pixel locations. On the other hand, in non-meaningful proposals (e.g., proposals that include no objects or partial objects) there is large amount of uncertain predictions. Accordingly, in some embodiments, the digital object selection system applies a threshold to each indicator to obtain a binary mask.

For instance, if the object score/confidence score for a pixel is above a threshold, the digital object selection system can utilize a 1 in the binary mask for that pixel. Similarly, if the object score/confidence score for a pixel is below a threshold the digital object selection system can utilize a 0 in the binary mask for that pixel. The digital object selection system can then determine the IoU (intersection over union) score between the prediction of the scale-diverse segmentation neural network 201 and the thresholded binary mask. The computed IoU score serves as a verification score to decide if a proposal should be presented to the user. The digital object selection system can then present the proposals with high verification scores to the user.

Indeed, as illustrated in FIG. 2C, the digital object selection system utilizes the scale-diverse segmentation neural network 201 to generate and display a plurality of object segmentation outputs (in one or more formats). For example, as shown, the digital object selection system can generate a first object segmentation output 250 (corresponding to a first scale) and a second object segmentation output 252 (corresponding to a second scale). Although FIG. 2C illustrates two object segmentation outputs, the digital object selection system can generate additional object segmentation outputs (e.g., M segmentation outputs).

As mentioned above, the digital object selection system can generate object segmentation outputs comprising segmentation boundaries and/or segmentation masks. Indeed, as illustrated in FIG. 2C, the first object segmentation output 250 includes a segmentation boundary 254 and a segmentation mask 256. Similarly, the second object segmentation output 252 includes a segmentation boundary 258 and a segmentation mask 260.

As shown, the segmentation boundaries 254, 258 illustrate a boundary or edge corresponding to one or more target objects portrayed in the digital image 200. For example, the segmentation boundaries 254, 258 can comprise probability maps indicating the probability that each pixel in the digital image corresponds to a boundary or edge of a target object in a digital image. Such segmentation boundaries can be utilized in a variety of post-processing algorithms, such as graph-cut algorithms, to accurately cut or isolate particular objects from a digital image. Accordingly, the digital object selection system can utilize the segmentation boundary 254 as part of a graph-cut algorithm to isolate the objects 202, 205 from the digital image 200.

Similarly, FIG. 2C illustrates that the segmentation masks 256, 260 identify foreground pixels and background pixels corresponding to different segmentations. For example, the segmentation masks 256, 260 can comprise probability maps indicating the probability that each pixel in the digital image is part of a target object. Such segmentation masks can also be utilized in a variety of post-processing algorithms. For example, the digital object selection system can select and edit all of the pixels in the segmentation mask 256 that satisfy a threshold confidence level to modify the objects 256, 260 in the digital image 200.

Figure 3:
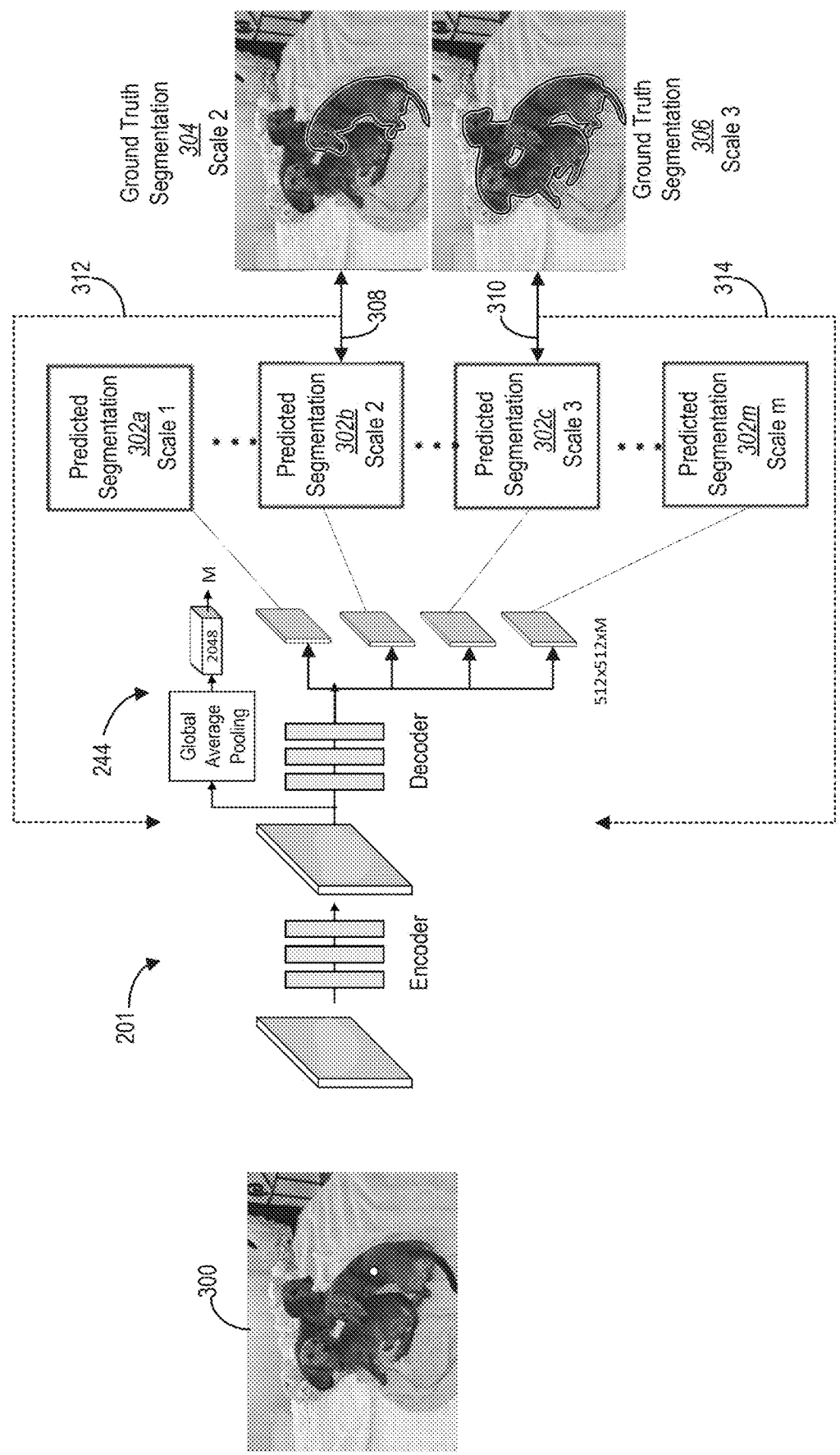
FIG. 3 illustrates a schematic diagram for training a scale-diverse segmentation neural network in accordance with one or more embodiments.

As mentioned above, the digital object selection system can also train a scale-diverse segmentation neural network. FIG. 3 illustrates training a scale-diverse segmentation neural network (e.g., the scale-diverse segmentation neural network 201 illustrated in FIG. 2B) in accordance with one or more embodiments. Specifically, FIG. 3 illustrates training the scale-diverse segmentation neural network 201 utilizing a training digital image 300 (with a positive training indicator) and ground truth segmentations 304, 306 at different scales.

As described above, the digital object selection system provides the training digital image 300 and training indicators to the scale-diverse segmentation neural network 201. In particular, as described in FIG. 2A, the digital object selection system can generate RGB channels and distance maps (e.g., image/user interaction pairs) and provide the RGB channels and distance maps as training input.

As illustrated, the scale-diverse segmentation neural network 201 analyzes the training inputs and generates predicted segmentations 302a-302m at different scales. For example, the digital object selection system can generate a first predicted segmentation 302a at a first scale (e.g., a first size and aspect ratio) and a second predicted segmentation 302b at a second scale (e.g., a second size and aspect ratio).

The digital object selection system can then compare the predicted segmentations 302a-302m with ground truth segmentations. In particular, the digital object selection system can determine a measure of loss by applying a loss function to each predicted segmentation and its corresponding ground truth segmentation. The digital object selection system can then modify parameters of the scale-diverse segmentation neural network 201 based on the comparison (e.g., back-propagate based on the measure of loss).

For example, the digital object selection system can perform act 308 of comparing the predicted segmentation 302b (corresponding to scale 2) and the ground truth segmentation 304 (corresponding to scale 2). Based on the comparison, the digital object selection system can determine a measure of loss between the predicted segmentation 302b and the ground truth segmentation 304. The digital object selection system can then perform the act 312 of modifying internal parameters of the scale-diverse segmentation neural network 201 (e.g., modify weighting parameters of the encoder, the decoder, the output layer, and other layers to reduce the measure of loss). To illustrate, the digital object selection system can modify internal parameters of the channel corresponding to scale 2 via back-propagation to train the digital object selection system to more accurately identify segmentations at scale 2.

In some circumstances, a particular scale channel (e.g., a predicted segmentation) will not correspond to a ground truth. For example, as shown in FIG. 3, the predicted segmentation 302a does not have a corresponding ground truth segmentation at that scale (e.g., no object falls within a particular anchor box size and aspect ratio). Accordingly, as shown in FIG. 3, the digital object selection system can identify channels of the scale-diverse segmentation neural network 201 that have corresponding ground truth segmentations and only back-propagate on the matched scales (e.g., leaving the other channels untouched).

For example, as shown in FIG. 3, the digital object selection system identifies ground truth segmentations 304, 306 corresponding to scale 2 and scale 3. The digital object selection system performs the acts 308, 310 of comparing the predicted segmentations 302b, 302c with corresponding ground truth segmentations 304, 306 and also performs the acts 312, 314 of back-propagating to modify the scale-diverse segmentation neural network 201 based on the comparison. As shown, the digital object selection system does not compare the predicted segmentations 302a, 302m with corresponding ground truth segmentations or back-propagate along those channels.

In one or more embodiments, the digital object selection system identifies which scales have corresponding ground truth segmentations by comparing the ground truth segmentations with a plurality of scales. The digital object selection system identifies those scales that have corresponding ground truth segments (e.g., ground truth segments that fill a threshold portion of a particular scale). Specifically, given a ground truth segmentation mask y, the digital object selection system can compute its size $s_y$ and aspect ratio $a_y$. Then, the digital object selection system finds the set $S_y = \{(s_p, a_q) | \forall (p, q) : \text{IoU (bbox}(s_y, a_y), \text{box}(s_p, a_q)) > 0.5\}$ where IoU is intersection-over-union while box $(s_p, a_q)$ is a bounding box with size of $s_p$ and aspect ratio of $a_q$, where the center is the center of the bounding box enclosing the ground truth y. The digital object selection system can then back-propagate the loss only through these branches. Although the digital object selection system can utilize a variety of different loss functions, in one or more embodiments the digital object selection system utilizes:

$$L = \sum_{s \in S_y} l(f(x; s), y)$$

where l is the standard sigmoid cross-entropy loss.

By repeatedly analyzing different training images and training indicators, generating predicted segmentations at different scales, and comparing the predicted segmentations with ground truth segmentations specific to particular scales, the digital object selection system can train the scale-diverse segmentation neural network to accurately generate segmentations across different scales.

In one or more embodiments, the digital object selection system can also train the object verification model 242 of the scale-diverse segmentation neural network 201. In particular, as shown, the object verification model 242 generates a predicted object score (e.g., a vector of M dimension scores corresponding to each scale). The digital object selection system then compares the predicted object score with a ground truth object verification. Specifically, the digital object selection system can identify those scales that actually comprise objects (e.g., complete objects), and compare the predicted object score with the ground truth object verification (e.g., utilizing a loss function). The digital object selection system can then train the object verification model 242 by modifying internal parameters of the object verification model 242 to reduce the loss function.

Although the digital object selection system can utilize a variety of different loss functions in training, in some embodiments the digital object selection system utilizes a class-balancing sigmoid cross entropy loss to train the object verification model 242. Indeed, the digital object selection system can use this loss function because the distribution of positive/negative samples can be imbalanced (e.g., only a small set of scales exist that contain objects).

Figure 5A:
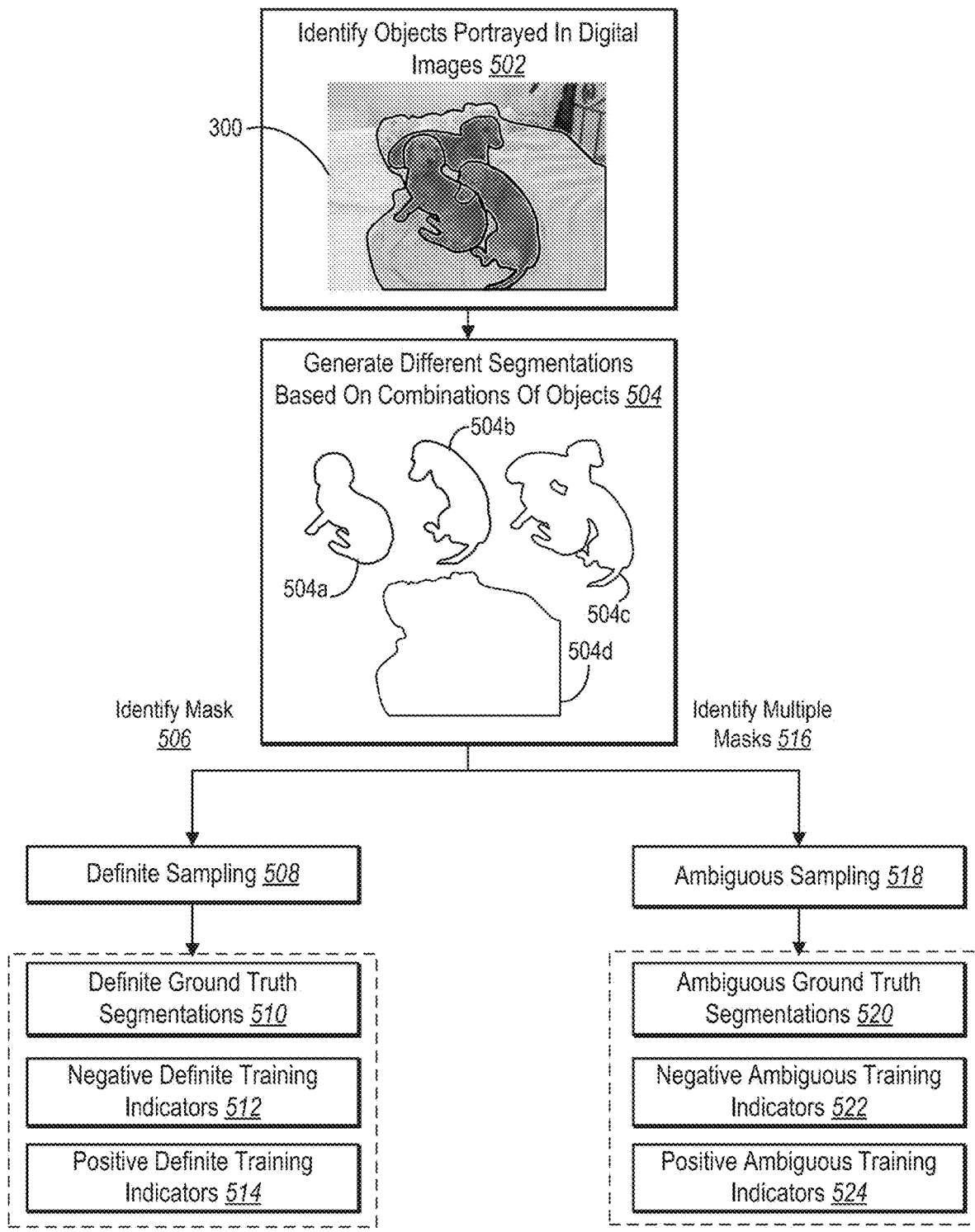
FIGS. 5A-5C illustrate generating definite positive samples, definite negative samples, definite ground truth segmentations, ambiguous positive samples, ambiguous negative samples, and ambiguous ground truth segmentations in accordance with one or more embodiments.
Figure 5B:
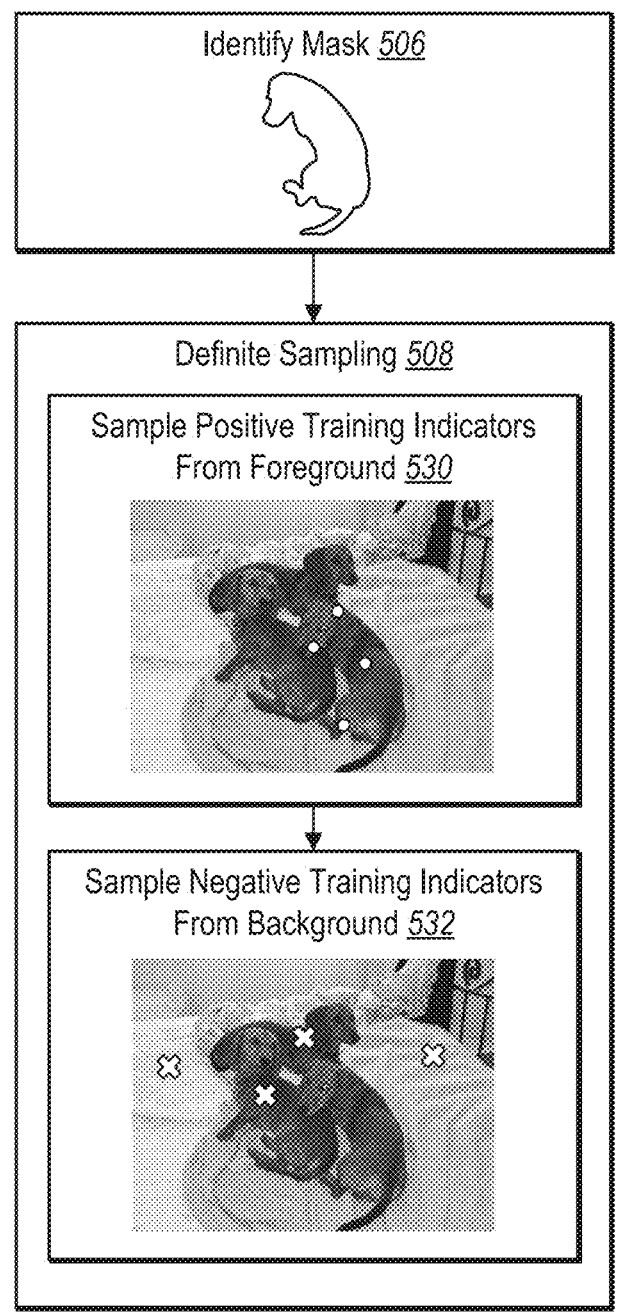
Figure 5C:
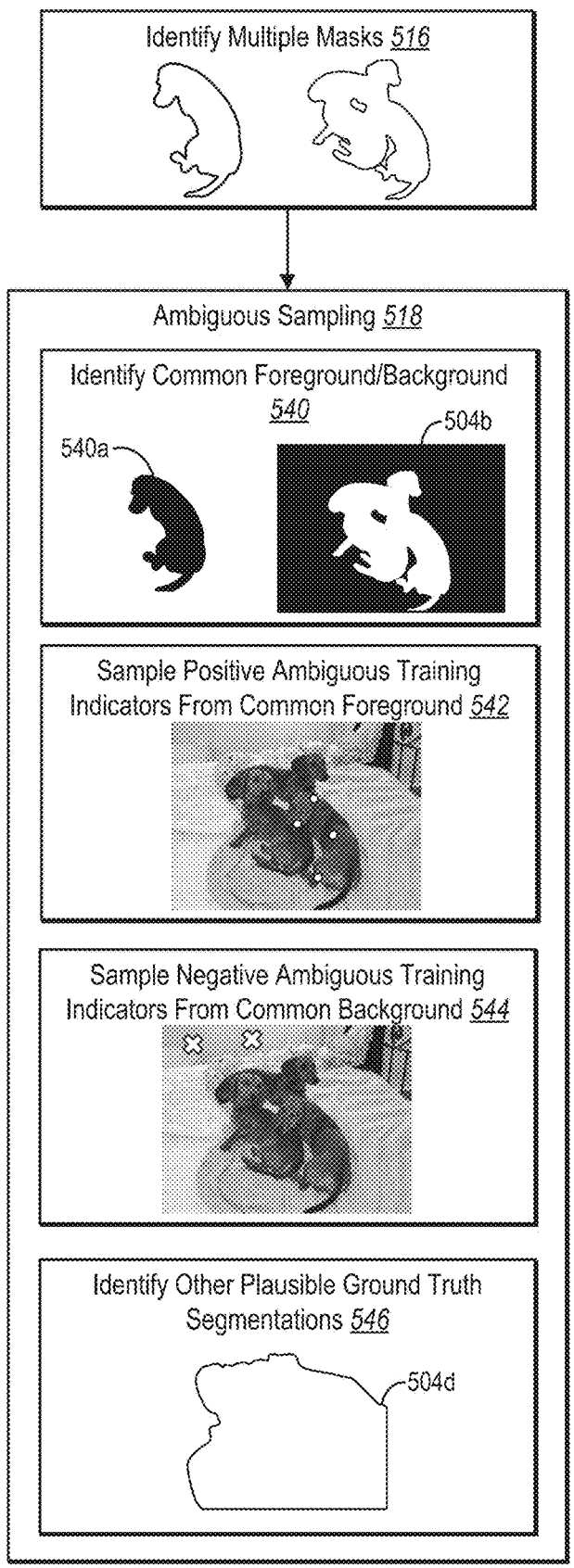
Figure 6:
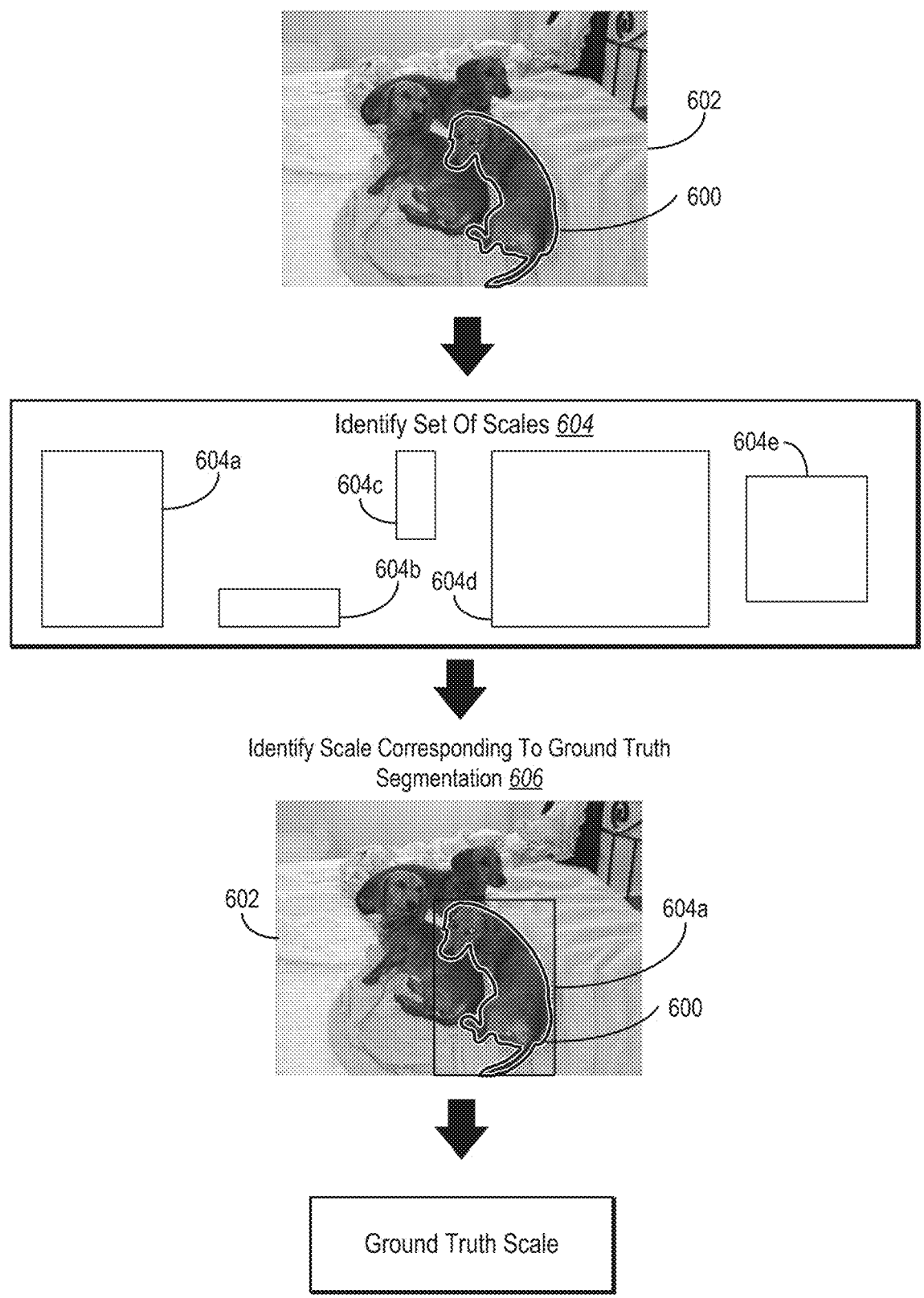
FIG. 6 illustrates a schematic diagram of identifying a ground truth scale for a ground truth segmentation in accordance with one or more embodiments.

As just discussed, the digital object selection system can utilize training images, training indicators, and ground truth segmentations corresponding to the training images and training indicators at different scales to train a scale-diverse segmentation neural network. The digital object selection system can efficiently and accurately generate this training data. Moreover, as discussed previously, the digital object selection system can generate both definite training indicators and ambiguous training indicators to more efficiently and accurately train a scale-diverse segmentation neural network. FIGS. 4, 5A-5C provide additional detail regarding generating training samples including definite indicators and ambiguous indicators. Moreover, FIG. 6 provides additional detail regarding identifying appropriate scales corresponding to ground truth segmentations for training.

Figure 4:
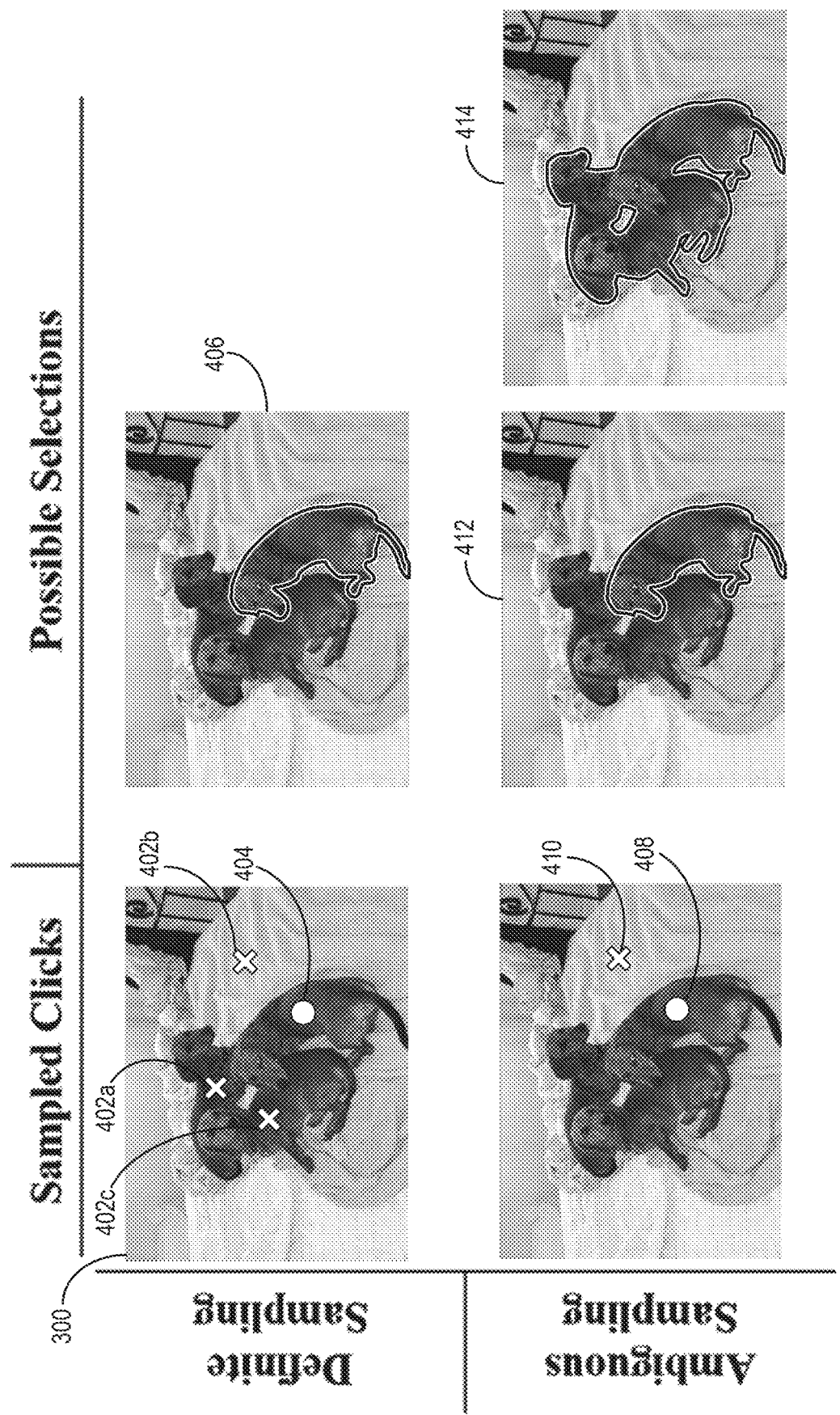
FIG. 4 illustrates a representation of definitive sampling and ambiguous sampling in accordance with one or more embodiments.

FIG. 4 illustrates a set of definite training indicators 402a-402c, 404 with regard to the training image 300 and a set of ambiguous training indicators 408, 410 with regard to the training image 300. Specifically, the definite training indicators include negative definite training indicators 402a-402c and positive definite training indicators 404. Moreover, the ambiguous training indicators include a positive ambiguous training indicator 408 and a negative ambiguous training indicator 410.

As illustrated, the definite training indicators 402a-402c, 404 collectively indicate a single ground truth segmentation 406 within the training digital image 300. Indeed, the definite training indicators 402a-402c, 404 preclude a ground truth segmentation that includes other dogs, a blanket, or the bed, but only correspond to the ground truth segmentation 406 portraying the dog. In contrast, the ambiguous training indicators 408, 410 indicate a plurality of ground truth segmentations 412, 414. Indeed, the positive training indicator 408 and the negative training indicator 410 could equally indicate the ground truth segmentation 412 indicating a single dog or the ground truth segmentation 414 indicating all three dogs. By generating and training a scale-diverse segmentation neural network with definite training samples and ambiguous training samples, the digital object selection system can improve the diversity and accuracy of resulting object segmentation objects generated by the scale-diverse segmentation neural network.

As mentioned above, the digital object selection system can generate training samples (including definite and ambiguous training data) from existing training data repositories. For example, FIGS. 5A-5C provide additional detail regarding generating definite training indicators (corresponding to definite ground truth segmentations) and ambiguous training indicators (corresponding to ambiguous ground truth segmentations) from existing training data. Specifically, FIG. 5A illustrates the digital object selection system performing an act 502 of identifying objects portrayed in the training digital image 300. For example, the digital object selection system can perform the act 502 by accessing an existing training data repository of labeled digital images. Indeed, the digital object selection system can access a digital repository of digital images with objects (e.g., pixels of the objects) identified in the digital images. It is common for existing training repositories to include digital images with segmentations of objects portrayed in the digital image.

Traditional training repositories, however, generally do not include training indicators, or diverse training segmentations corresponding to different scales (as utilized above in relation to FIG. 3). As shown in FIG. 5A the digital object selection system can perform an act 504 of generating different segmentations based on combinations of objects. In particular, the digital object selection system can identify objects portrayed in digital images (form the act 502) and combine the objects to generate different segmentations. For example, the digital object selection system generates the segmentations 504a-504d be combining different objects within the training image 300.

In one or more embodiments, the digital object selection system identifies the segmentations 504a-504d based on proximity or distance within a digital image. For example, the digital object selection system can identify an object (for a first segmentation) and a neighboring object (for a second segmentation). The digital object selection system can then generate a hierarchical list of segmentations based on different combinations of neighboring objects. Specifically, for each instance in a digital image (e.g., multiple dogs), the digital object selection system can find all the neighboring instances (e.g., all the neighboring dogs). Then, the digital object selection system can build a hierarchical list of segmentations based on different combinations of instances (e.g. expanding segmentations portraying multiple dogs).

In some embodiments, the digital object selection system combines neighboring instances in a class-agnostic manner. In particular, the digital object selection system does not consider object classes in generating a diverse set of ground truth segmentations (e.g., the digital object selection system combines dogs and blankets rather than only dogs). In other embodiments, the digital object selection system can generate ground truth segmentations based on class.

Moreover, in one or more embodiments, the digital object selection system uses other factors (in addition to or in the alternative to proximity or distance) in generating a set of ground truth segmentations. For example, the digital object selection system can consider depth. In particular, the digital object selection system can combine objects in a digital image portrayed at a similar depth (and exclude object combinations where the objects are at different depths beyond a particular depth difference threshold).

As shown in FIG. 5A, the digital object selection system can then generate definite samples and/or ambiguous samples from the identified masks. With regard to definite sampling, the digital object selection system can perform the act 506 of identifying a single mask (e.g., segmentation) from the segmentations 504a-504d. The digital object selection system can then perform the act 508 of definite sampling from the identified mask. In this manner, the digital object selection system can generate training data comprising negative definite training indicators 510 and positive definite training indicators 512 corresponding to a definite ground truth segmentation (i.e., the identified mask). Additional detail regarding definite sampling is provided in relation to FIG. 5B.

Similarly, the digital object selection system can generate ambiguous samples by performing the act 516 of identifying multiple masks. For example, the digital object selection system can select two or more segmentations from the segmentations 504a-504d. The digital object selection system can then perform an act 518 of ambiguous sampling from the multiple masks to generate training data comprising negative ambiguous training indicators 522, positive ambiguous training indicators 524 and ambiguous ground truth segmentations 520 (e.g., the multiple masks). Additional detail regarding definite sampling is provided in relation to FIG. 5C.

FIG. 5B provides additional detail regarding definite sampling in accordance with one or more embodiments. As shown in FIG. 5B, the digital object selection system performs the act 506 by identify a mask of a single dog portrayed in the training image 300. The act 508 of definite sampling is performed by performing an act 530 of sampling positive training indicators from the foreground based on the identified mask. Specifically, the digital object selection system samples pixels from within the mask identified at the act 506. Moreover, the digital object selection system performs the act 532 of sampling negative samples from the background based on the identified mask. Specifically, the digital object selection system samples pixels from outside the mask identified at the act 506.

The digital object selection system can utilize a variety of approaches to generate positive and negative training samples. For instance, in one or more embodiments, the digital object selection system utilizes random sampling techniques (within our outside of a mask). Moreover, in other embodiments, the digital object selection system utilizes random sampling techniques within untargeted objects.

Random sampling, however, can fail to provide sufficient information regarding boundaries, shapes, or features of target objects in training a neural network. Accordingly, in one or more embodiments, the digital object selection system samples training indicators based on the location of (or distance to) other training indicators. More specifically, in one or more embodiments, the digital object selection system samples positive training indicators to cover the target object with positive training indicators (e.g., such that the samples are spread across the target object are fall within a threshold distance of a boundary and/or a exceed a threshold distance from another sample). Similarly, in one or more embodiments, the digital object selection system samples negative training indicators to surround the target object with negative training indicators (e.g., fall within a threshold distance of a target object).

FIG. 5C provides additional detail regarding ambiguous sampling. As shown in FIG. 5C, the digital object selection system identifies multiple masks at the act 516, such as a mask of a single dog and a mask of three dogs. The digital object selection system can select the multiple masks from the set of segmentations (at the act 504) in a variety of ways. For example, the digital object selection system can select the multiple masks by random sampling. In other embodiments, the digital object selection system can select the multiple masks based on proximity (e.g., distance within the digital image) or depth.

In performing the act 518, the digital object selection system performs an act 540 of identifying common foreground and/or background regions from the multiple masks. Indeed, as illustrated, the digital object selection system performs the act 540 by identifying a common foreground 540a that indicates pixels of the dog common to both masks. Moreover, the digital object selection system performs the act 540 by identifying a common background 540b that indicates pixels that are not included in the set of three dogs (e.g., the background pixels common to both masks).

Upon identifying the common foreground and/or background regions, the digital object selection system then performs an act 542 of sampling positive ambiguous training indicators from the common foreground. For instance, as shown in FIG. 5C, the digital object selection system can sample from within the common foreground 540a to generate samples within the dog.

Moreover, the digital object selection system can also perform an act 544 of sampling negative ambiguous samples from the common background. For instance, as shown in FIG. 5C, the digital object selection system samples from the common background 540b to generate samples from outside the region portraying all three dogs.

Notably, each of the positive and negative training indicators sampled in the acts 542 and 544 are ambiguous in that they do not differentiate between the multiple masks identified at the act 516. Indeed, both the positive ambiguous training indicators and the negative ambiguous training indicators would be consistent with identifying a single dog or multiple dogs in the training image 300.

As shown in FIG. 5C, the digital object selection system can also perform an act 546 of identifying other plausible ground truth segments (in addition to the multiple masks identified at the act 516). The digital object selection system performs the act 546 by analyzing the segmentations identified at the act 504 to determine if there are any additional segmentations that would satisfy the positive training indicators and the negative training indicators identified at the acts 542, 544. As illustrated in FIG. 5C, the digital object selection system determines that the segmentation 504d satisfies the positive training indicators and the negative training indicators. Thus, the segmentation 504d can also be utilized as an additional ground truth segmentation for the positive ambiguous training indicators and the negative ambiguous training indicators.

As mentioned above, in addition to generating training indicators, the digital object selection system can also determine ground truth scales corresponding to ground truth segmentations (e.g., to align the ground truth to an appropriate scale in training a scale-diverse segmentation neural network). FIG. 6 illustrates identifying ground truth scales corresponding to ground truth segmentations in accordance with one or more embodiments. Specifically, FIG. 6 illustrates a ground truth segmentation 602 for a training image 600. The digital object selection system performs an act 604 of identifying a set of scales. As shown in FIG. 6, the digital object selection system identifies scales 604a-604e which comprise anchor boxes at different sizes and aspect ratios. In one or more embodiments, the digital object selection system identifies the scales 604a-604e based on channels of a scale-diverse segmentation neural network. For example, the first scale 604*a* can reflect a corresponding scale of a first channel of the scale-diverse segmentation neural network 201.

Upon identifying a set of scales, the digital object selection system performs an act 606 of identifying a scale (e.g., anchor box) corresponding to the ground truth segmentation. Specifically, the digital object selection system can find the closest matching anchor box to train the selection model. For example, in one or more embodiments, the digital object selection system determines the center of a bounding box B that encloses the ground truth segmentation. Next, the digital object selection system aligns the set of anchors (from the act 604) conditioned on this center. The digital object selection system then determines the similarity between B and each anchor box based on Intersection-over-Union (IoU). The anchor box with the largest IoU is considered as the scale that corresponds to that particular selection.

As shown in FIG. 6, the digital object selection system can identify the scale that corresponds to the ground truth segmentation as the ground truth scale. The digital object selection system can use this matching approach to find the ground truth scale for each possible ground truth mask. Moreover, as mentioned in FIG. 3, in one or more embodiments, the digital object selection system only backpropagates the gradients of the scale-diverse segmentation neural network on the matched anchors, while leaving the others untouched.

Many of the foregoing examples and illustrations have been discussed in relation to the scale-diverse segmentation neural network 201 (e.g., a single-stage scale-diverse segmentation neural network). As discussed above, the digital object selection system can also utilize a multi-stage scale-diverse segmentation neural network that considers various scales as inputs to the neural network. Indeed, as discussed above, utilizing a scale-diverse segmentation neural network without pre-determined scale channels can allow for additional flexibility in generating segmentations that reflect any scale over a continuous range. For instance, a possible downside of the one-stage approach is that some intermediate scales that correspond to semantically meaningful selections might be missing due to the discretization. An alternative would be defining a continuous scales variation such that the full spectrum of possible selections can be obtained.

Figure 7:
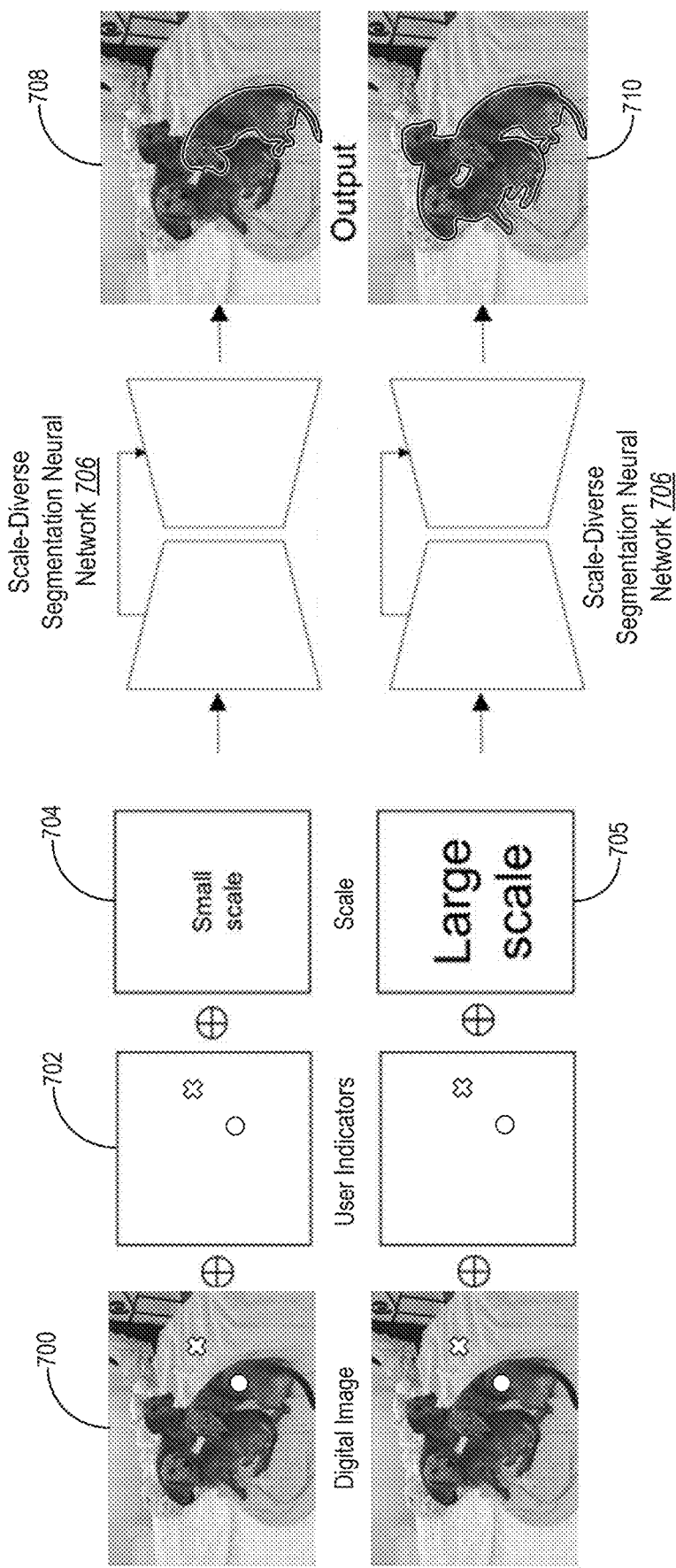
FIG. 7 illustrates a schematic diagram of a multi-stage scale-diverse segmentation neural network in accordance with one or more embodiments.

For example, FIG. 7 illustrates utilizing a multi-stage scale-diverse segmentation neural network in accordance with one or more embodiments. In contrast to the scale-diverse segmentation neural network 201 illustrated in FIG. 2B, the scale-diverse segmentation neural network 706 does not include multiple channels for individual scales. Rather, the scale-diverse segmentation neural network 706 receives a scale input, and then generates an object segmentation output based on the scale input. The scale-diverse segmentation neural network 706 can generate multiple object segmentation outputs in response to multiple input scales.

For instance, as illustrated in FIG. 7, the digital object selection system provides a digital image 700 with user indicators 702 to the scale-diverse segmentation neural network 706. In addition, the digital object selection system provides a first (small) scale 704. The scale-diverse segmentation neural network 706 analyzes the digital image 700, the user indicators 702, and the first scale 704 and generates an object segmentation output 708 corresponding to the first scale.

The digital object selection system also provides the digital image 700, the user indicators 702 and a second (larger) scale 705 to the scale-diverse segmentation neural network 706. The scale-diverse segmentation neural network 706 analyzes the digital image 700, the user indicators 702, and the second scale 705 and generates an object segmentation output 710 corresponding to the second scale.

As mentioned, the architecture of the scale-diverse segmentation neural network 706 differs from the architecture of the scale-diverse segmentation neural network 201 illustrated in FIG. 2B. For example, the digital object selection system appends scale as an additional channel to form a 6-dimensional input (image, user inputs, scale) that will be forward passed to the scale-diverse segmentation neural network 706. To illustrate, for the scale channel, the digital object selection system can generate a scale map that repeats the scale value (scalar) at every pixel location. Therefore, given the same (image, user inputs), such formulation enforces the model to learn to produce different selection conditioned on a given scale.

In some embodiments, rather than using a scale input plane, the digital object selection system can input the scale value in a different manner. For example, the digital object selection system can utilize a single scale value (rather than an entire scale plane). The scale-diverse segmentation neural network 201 can analyze the scale value as a numerical input to generate an object segmentation output corresponding to the scale value.

Moreover, in generating the scale-diverse segmentation neural network 706, digital object selection system replaces multiple scale output channels from the scale-diverse segmentation neural network 201 with a scale output channel corresponding to the input scale. Thus, the digital object selection system can generate a specific object segmentation output via the scale-diverse segmentation neural network 706 for a particular discretized scale input. Furthermore, in some embodiments, the scale-diverse segmentation neural network 706 does not include an object verification model 242.

The digital object selection system can train the scale-diverse segmentation neural network 706 in a similar manner to the scale-diverse segmentation neural network 201. The digital object selection system can identify training images, generate ground truth segmentations and corresponding training segmentations and train the scale-diverse segmentation neural network by comparing predicted segmentations with the ground truth segmentations.

Because the scale-diverse segmentation neural network 706 considers an input scale, the digital object selection system can also train the scale-diverse segmentation neural network 706 with training scales. For instance, the digital object selection system can provide a scale corresponding to a ground truth segmentation (e.g., the ground truth scale from FIG. 6) as a training input scale. The scale-diverse segmentation neural network 706 can then generate a predicted segmentation corresponding to the training input scale and compare the predicted segmentation with the ground truth segmentation corresponding to the training scale. The scale-diverse segmentation neural network can then back-propagate and modify tunable parameters of the scale-diverse segmentation neural network 706 based on the comparison.

In training the scale-diverse segmentation neural network 706, the digital object selection system can generate training indicators and ground truth segmentations as described above (e.g., in relation to FIGS. 5A-5C). Moreover, the digital object selection system can determine training scales corresponding to ground truth segmentations. For example, in one or more embodiments, the digital object selection system utilizes the approach described above (e.g., in relation to FIG. 6). In some embodiments, the digital object selection system determines a training scale by determining the size and the aspect ratio of a ground truth segmentation and utilizing the size and the aspect ratio as the training scale.

Although FIG. 7 describes a scale-diverse segmentation neural network that considers user inputs with only a single output channel, the digital object selection system can utilize a scale-diverse segmentation neural network that considers input scales while retaining multiple scale output channels. For example, in one or more embodiments, the digital object selection system can utilize a scale-diverse segmentation neural network that considers scale inputs and utilizes a similar architecture as the scale-diverse segmentation neural network 201 of FIG. 2B (with additional input channels). For example, the scale-diverse segmentation neural network can receive one or more inputs of scale and then generate object segmentation outputs using only those channels that correspond to the input scales (e.g., using the channel closest to the input scales). In this manner, the digital object selection system can receive multiple scale inputs and generate multiple object segmentation outputs that correspond to the scale inputs in a single pass.

As just mentioned, in one or more embodiments, the digital object selection system can identify scale inputs. The digital object selection system can identify scale inputs in a variety of ways. For example, in one or more embodiments, the digital object selection system receiver user input of different scales. Additional detail regarding user interfaces and user interface elements for receiving user input of scales is provided below (e.g., in relation to FIGS. 9A-9C).

Figure 8:
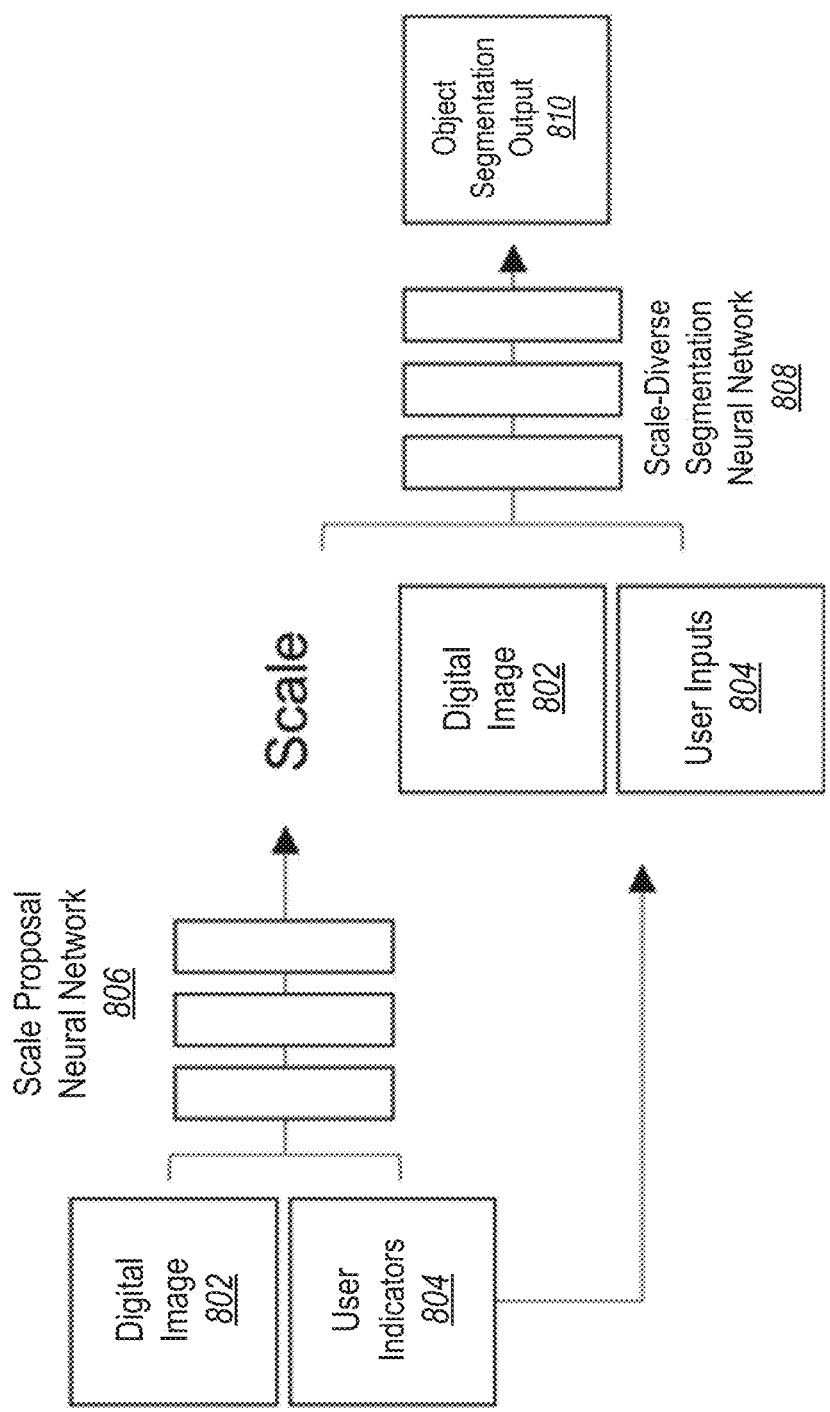
FIG. 8 illustrates a schematic diagram of a scale-diverse segmentation neural network with a scale proposal neural network for generating the input scales in accordance with one or more embodiments.

In other embodiments, the digital object selection system can generate scale inputs utilizing a scale proposal neural network. For example, FIG. 8 illustrates generating and utilizing scales via a scale proposal neural network 806. As shown in FIG. 8, the scale-diverse segmentation neural network provides a digital image 802 and user indicators 804 to the scale proposal neural network 806. The scale proposal neural network 806 generates one or more scales, which are then analyzed as input by a scale-diverse segmentation neural network 808 to generate one or more object segmentation outputs 810.

The digital object selection system can train the scale proposal neural network 806 to generate scales that correspond to objects portrayed in the digital image and the user indicators. For example, the digital object selection system can provide a training image and training indicators to the scale proposal neural network 806 to generate one or more predicted scales. The digital object selection system can compare the one or more predicted scales with ground truth scales.

For example, the digital object selection system can identify training objects in the training image and identify ground truth scales corresponding to the training objects (e.g., ground truth scales that encompass the training objects). The digital object selection system can then utilize the identified ground truth scales to compare the predicted scales generated via the scale proposal neural network 806. The digital object selection system can then modify parameters of the scale proposal neural network 806 based on the comparison. In this manner, the digital object selection system can identify diverse scales appropriate to a digital image and then identify diverse object segmentation outputs corresponding to the diverse scales.

Figure 9A:
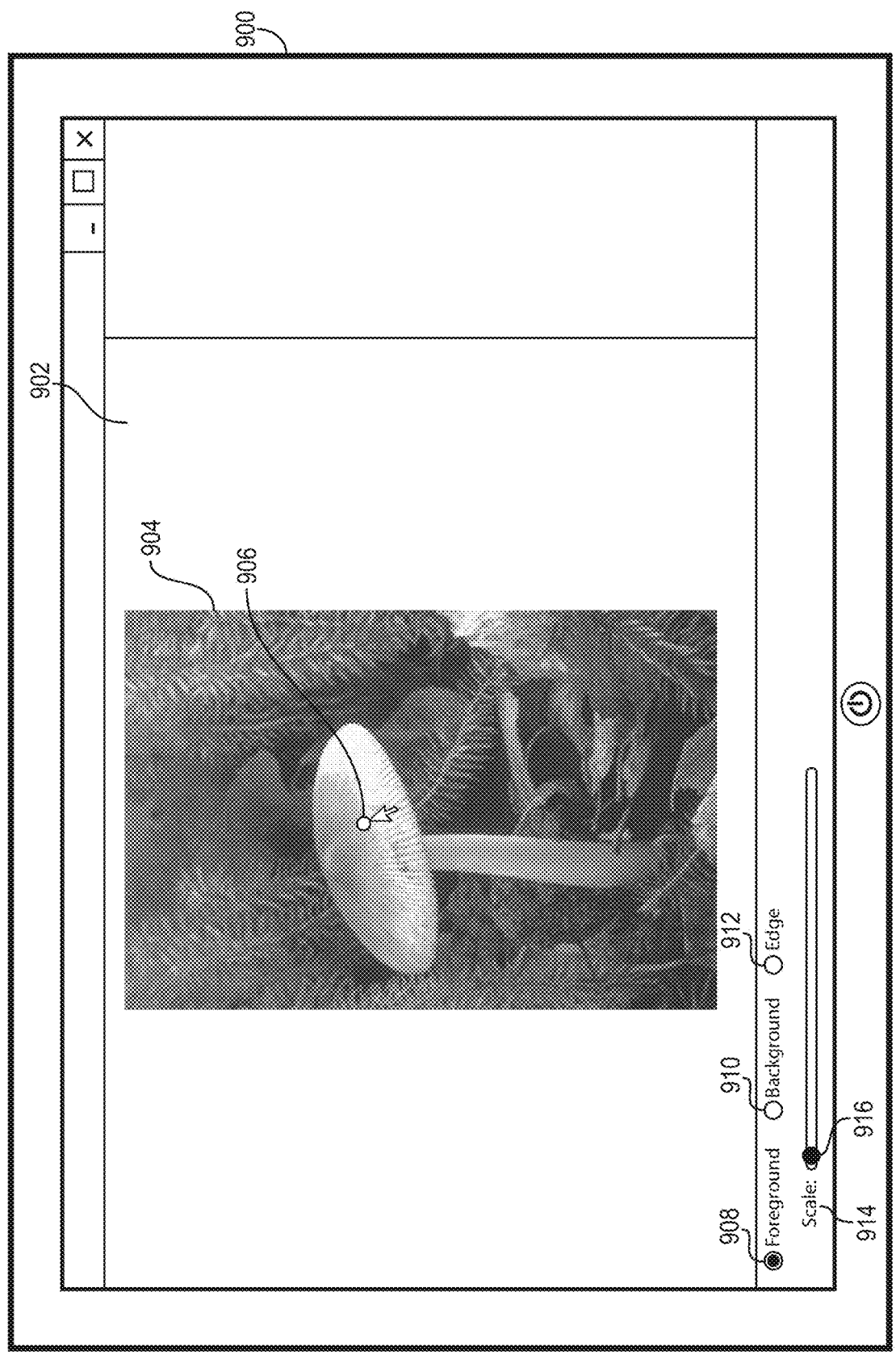
FIGS. 9A-9C illustrate a computing device with a graphical user interface including user interface elements for identifying input of user indicators and different scales and providing object segmentation outputs corresponding to the different scales for display in accordance with one or more embodiments.

As mentioned previously, the digital object selection system can provide various graphical user interfaces and interface elements via computing devices for providing digital images, receiving user indicators, and providing object segmentation outputs. For example, FIG. 9A illustrates a computing device 900 portraying a user interface 902 generated via the digital object selection system. As shown, the user interface 902 includes a digital image 904, user indicator elements 908-912, and scale input slider element 914.

Specifically, the user interface 902 includes a foreground user indicator element 908, a background user indicator element 910, and an edge user indicator element 912. Based on user interaction with the foreground user indicator element 908, the background user indicator element 910, and/or the edge user indicator element 912, the digital object selection system can identify and receive different types of user indicators. For example, as shown in FIG. 9A, the foreground user indicator element 908 is activated and the user has selected a pixel of the digital image 904. In response, the digital object selection system identifies a positive user indicator 906.

Although the user interface 902 illustrates three user indicator elements 908-912, the digital object selection system can generate a user interface with additional user indicator elements. For example, as mentioned above, the digital object selection system can generate a user interface with bounding box indicator elements and/or voice user indicator elements.

As mentioned, the user interface 902 also includes the scale input slider element 914. Based on user interaction with the scale input slider element 914, the digital object selection system can identify user input of a scale for generating object segmentation outputs. For example, FIG. 9A illustrates that the scale input slider element 914 is in a first position 916 corresponding to a first scale.

Figure 9B:
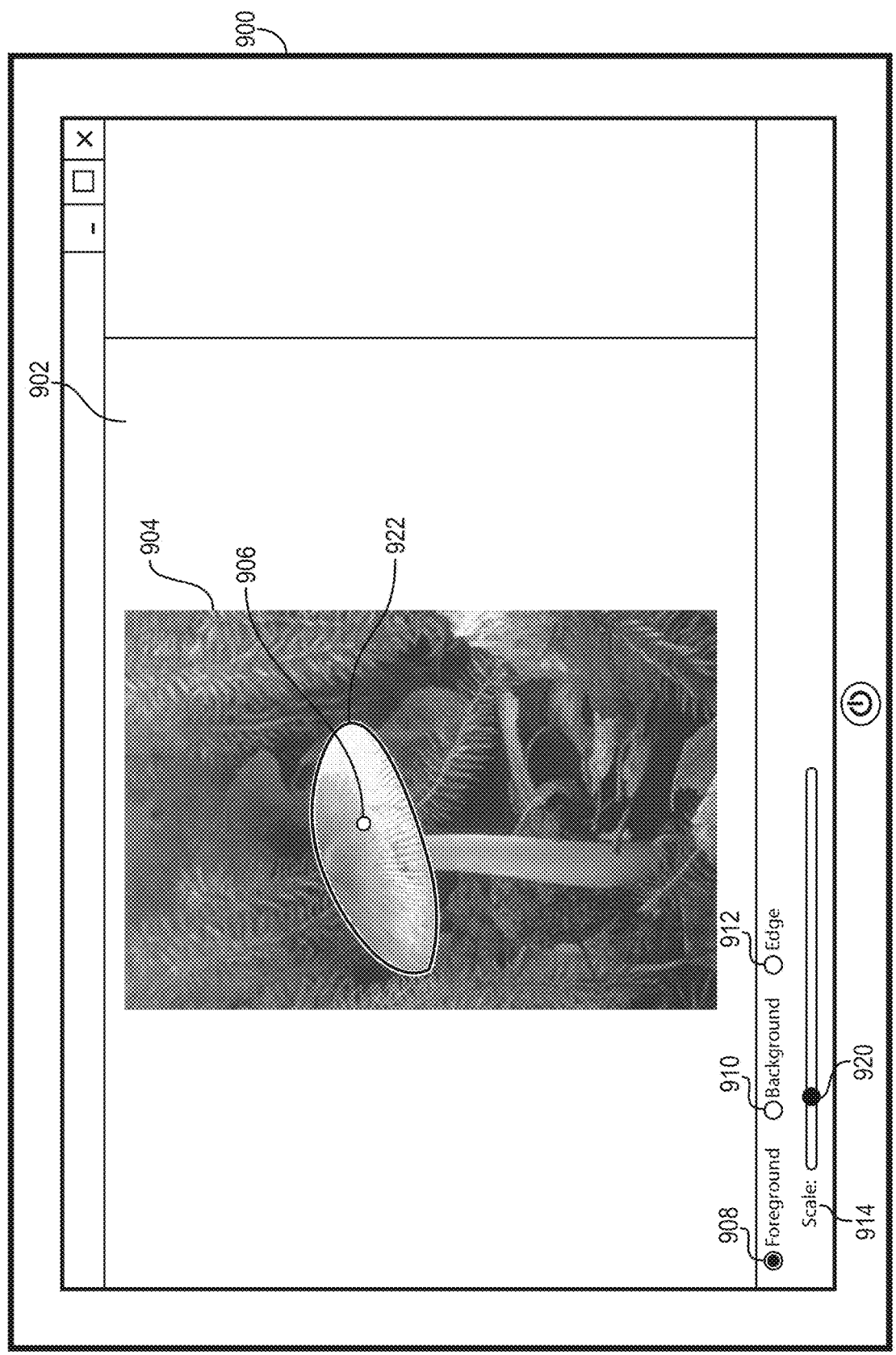

The digital object selection system can identify various scales based on user interaction with the scale input slider element 914. For example, as shown in FIG. 9B, the digital object selection system identifies user input via the scale input slider element 914 of a second position 920 corresponding to a second scale. Based on the positive user indicator 906 and the second scale, the digital object selection system can generate an object segmentation output.

For example, FIG. 9B illustrates the user interface 902 comprising an object segmentation output 922. In particular, the digital object selection system analyzes the positive user indicator 906 and the second scale via a scale-diverse segmentation neural network to generate the object segmentation output 922. Specifically, the digital object selection system utilizes a multi-stage scale-diverse segmentation neural network (as described in relation to FIG. 7) to analyze the second scale, the digital image 904, and the positive user indicator 906 as input to generate the object segmentation output 922.

Figure 9C:
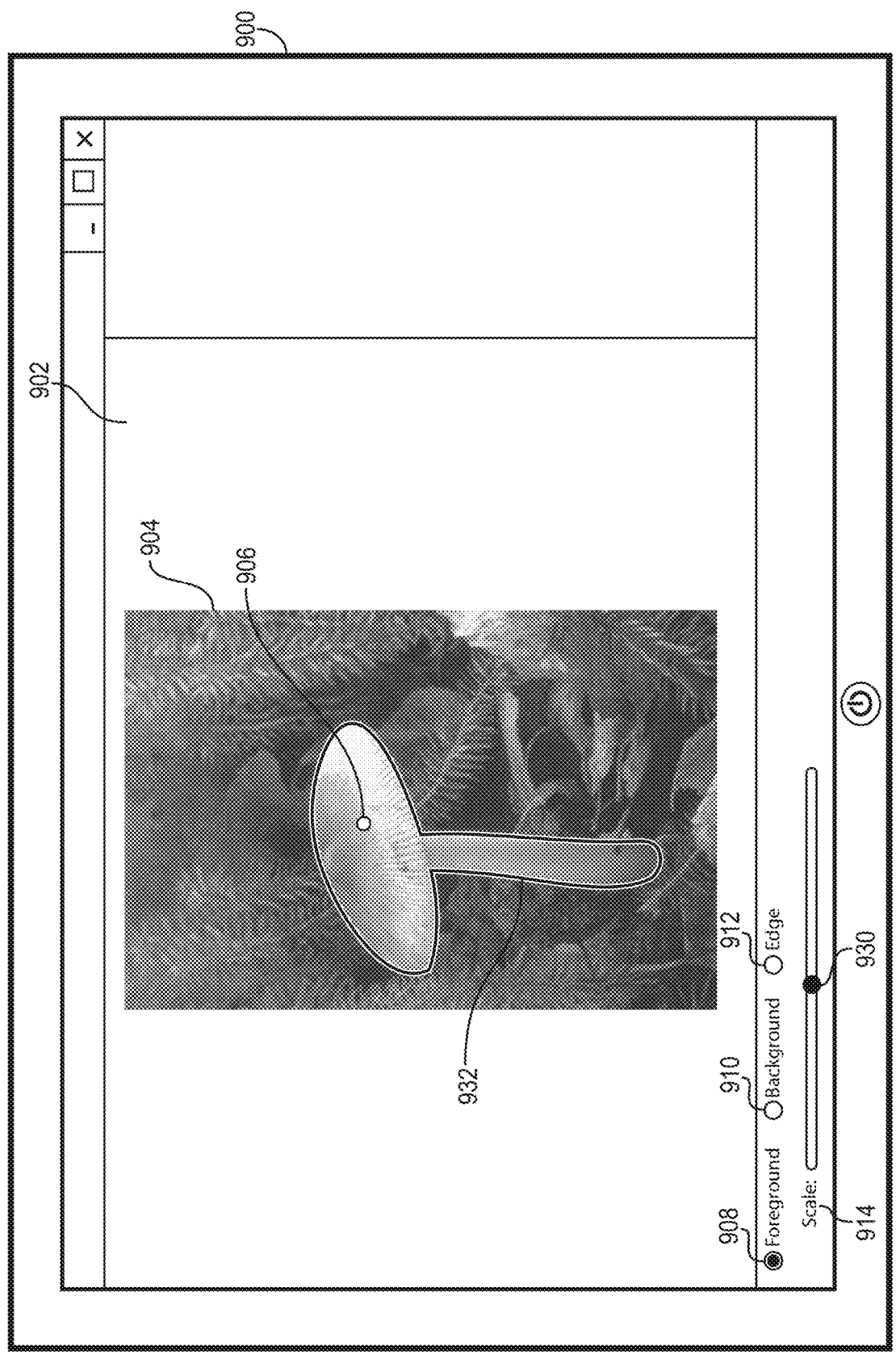

The digital object selection system can generate additional object segmentation outputs at different scales based on user input of different scales. For example, FIG. 9C illustrates the user interface 902 upon receiving additional user input of a third position 930 corresponding to a third scale via the scale input slider element 914. The digital object selection system analyzes the digital image 904, the positive user indicator 906, and the third scale via a scale-diverse segmentation neural network and generates a second segmentation output 932. Moreover, the digital object selection system provides the second segmentation output 932 for display via the user interface 902.

Thus, a user can modify the scale input slider element 914 and dynamically generate different object segmentation outputs. Upon identifying an object segmentation output that corresponds to a target object (e.g., the head of the mushroom or the entire mushroom shown in FIG. 9C), the user can select the object segmentation output via the computing device 900. For example, the user can interact with an editing element to modify the object segmentation output that corresponds to the target object.

Although FIGS. 9A-9C illustrate a particular type of user interface element for providing scale input (e.g., a slider element), the digital object selection system can utilize a variety of elements for identifying scale input. For instance, in one or more embodiments, the digital object selection system utilizes a timing element that modifies the scale input based on an amount of time of user interaction. For example, if a user presses a time element, the digital object selection system can generate different object segmentation outputs based on the amount of time that the user presses the time element. Thus, for example, the digital object selection system can generate dynamically increasing object segmentation outputs based on a single press and hold event with a timing element via the computing device 900.

Similarly, in one or more embodiments, the digital object selection system utilizes a pressure element that modifies scale based on an amount of pressure corresponding to the user interaction. For instance, if the computing device 900 includes a touchscreen, the amount of pressure of a user input can determine the corresponding scale (e.g., the digital object selection system can dynamically modify the segmentations based on the amount of pressure identified).

In one or more embodiments, the digital object selection system can identify different scale values based on a scroll event (e.g., from a scroll wheel of a mouse) or based on a pinching event (e.g., two-fingered movement on a tablet). To illustrate, the digital object selection system can detect a vertical pinch to modify the vertical scale size and detect a horizontal pinch to detect the horizontal scale size. Moreover, in some embodiments, the digital object selection system utilizes two slider elements (e.g., one slider element for modifying a vertical dimension, another slider element for modifying a horizontal dimension).

Similarly, although the slider element of FIGS. 9A-9C can select a continuous range of scales, in some embodiments the digital object selection system utilizes a sticky slider element that corresponds to a set of scales (e.g., predefined scales or those scales that correspond to semantically meaningful segmentations). For example, the slider knob can stick with a particular scale or position until the knob is moved close enough to the next scale corresponding to a semantically meaningful output. In this case, the intermediate results (selections with scale that do not correspond to a semantically meaningful output) will not be visible and only a set of high-quality proposals will be shown to the user.

In other embodiments, the digital object selection system generates a histogram or plot of all the recommended scales on top of a slider while the user has the full control of the slider. The user can obtain all the intermediate results and visualize the selection "growing" process when he/she moves the slider. The plot serves as a guide showing the user the location of likely good proposals.

Figure 10A:
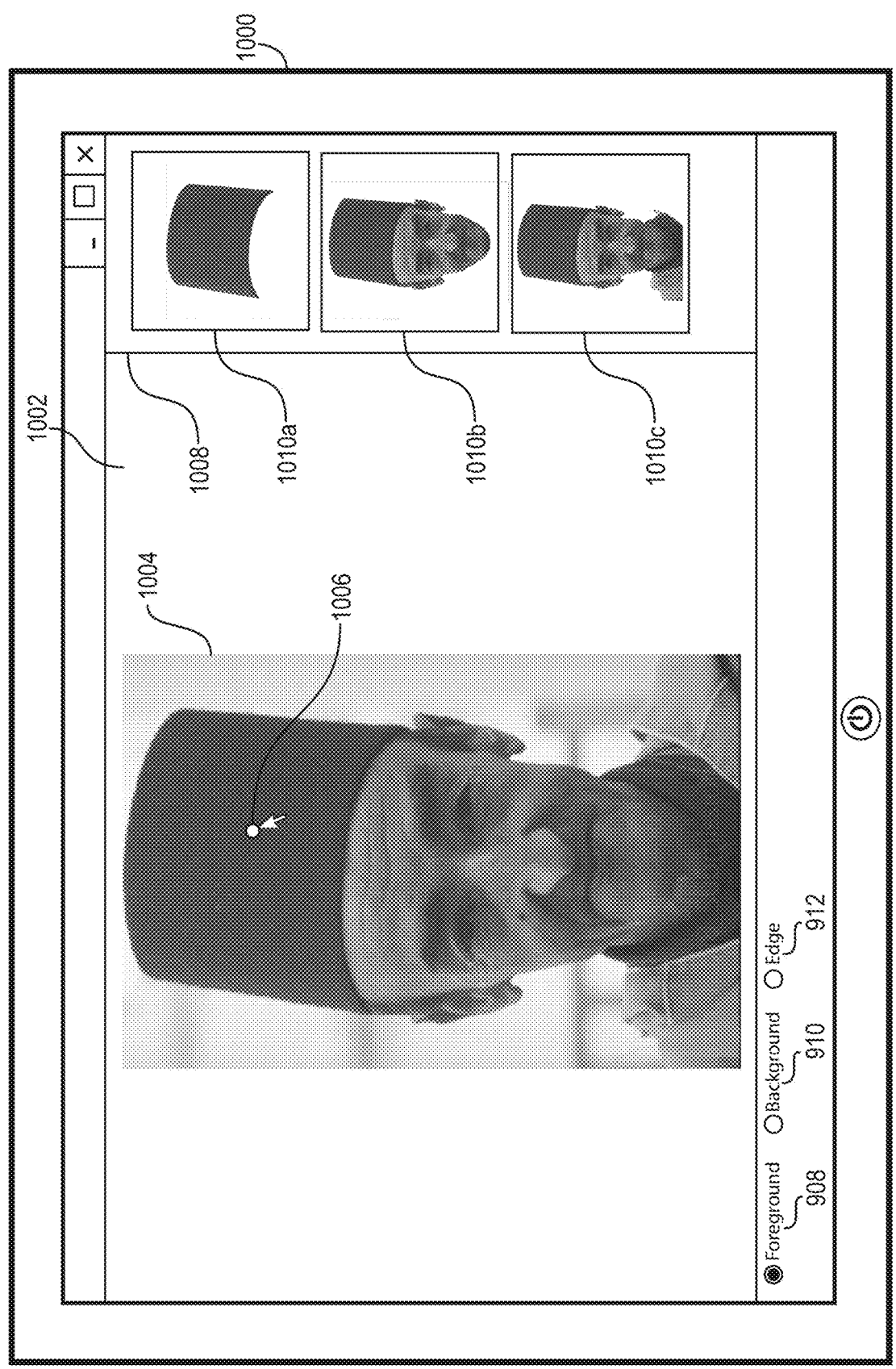
FIGS. 10A-10D illustrate a computing device with a graphical user interface including user interface elements for identifying user indicators and providing object segmentation outputs corresponding to different scales for display in accordance with one or more embodiments.

As mentioned above, the digital object selection system can also generate a plurality of object segmentation outputs and provide the object segmentation outputs for display simultaneously. For example, FIG. 10A illustrates a computing device 1000 displaying a user interface 1002 generated by the digital object selection system in accordance with one or more embodiments. The user interface 1002 includes a digital image 1004 and the user indicator elements 908-912. As shown in FIG. 10A, the digital object selection system identifies a positive user indicator 1006 within the digital image 1004 (e.g., a click on the hat while the foreground user indicator element 908 is active). Based on the positive user indicator 1006 the digital object selection system generates a plurality of object segmentation outputs 1010a-1010c corresponding to a plurality of scales in a segmentation output region 1008.

In contrast with FIGS. 9A-9C, the digital object selection system generates the plurality of object segmentation outputs 1010a-1010c simultaneously (or near simultaneously) and without user input of a scale. The digital object selection system utilizes a single-stage scale-diverse segmentation neural network to analyze the digital image 1004 and the user indicator 1006 to generate the object segmentation outputs 1010a-1010c.

As described above, the digital object selection system can determine a number of different scales for generating the object segmentation outputs 1010a-1010c. In some embodiments, the digital object selection system generates the object segmentation outputs utilizing different scales corresponding to different channels of a scale-diverse segmentation neural network (e.g., the channels described in FIG. 2B). In other embodiments, the scale-diverse segmentation neural network can generate scales utilizing a scale proposal neural network (as described in FIG. 8). Regardless of approach, the digital object selection system can utilize the different scales to generate the object segmentation outputs 1010a-1010c, and a user can then interact with the object segmentation outputs 1010a-1010c.

Figure 10B:
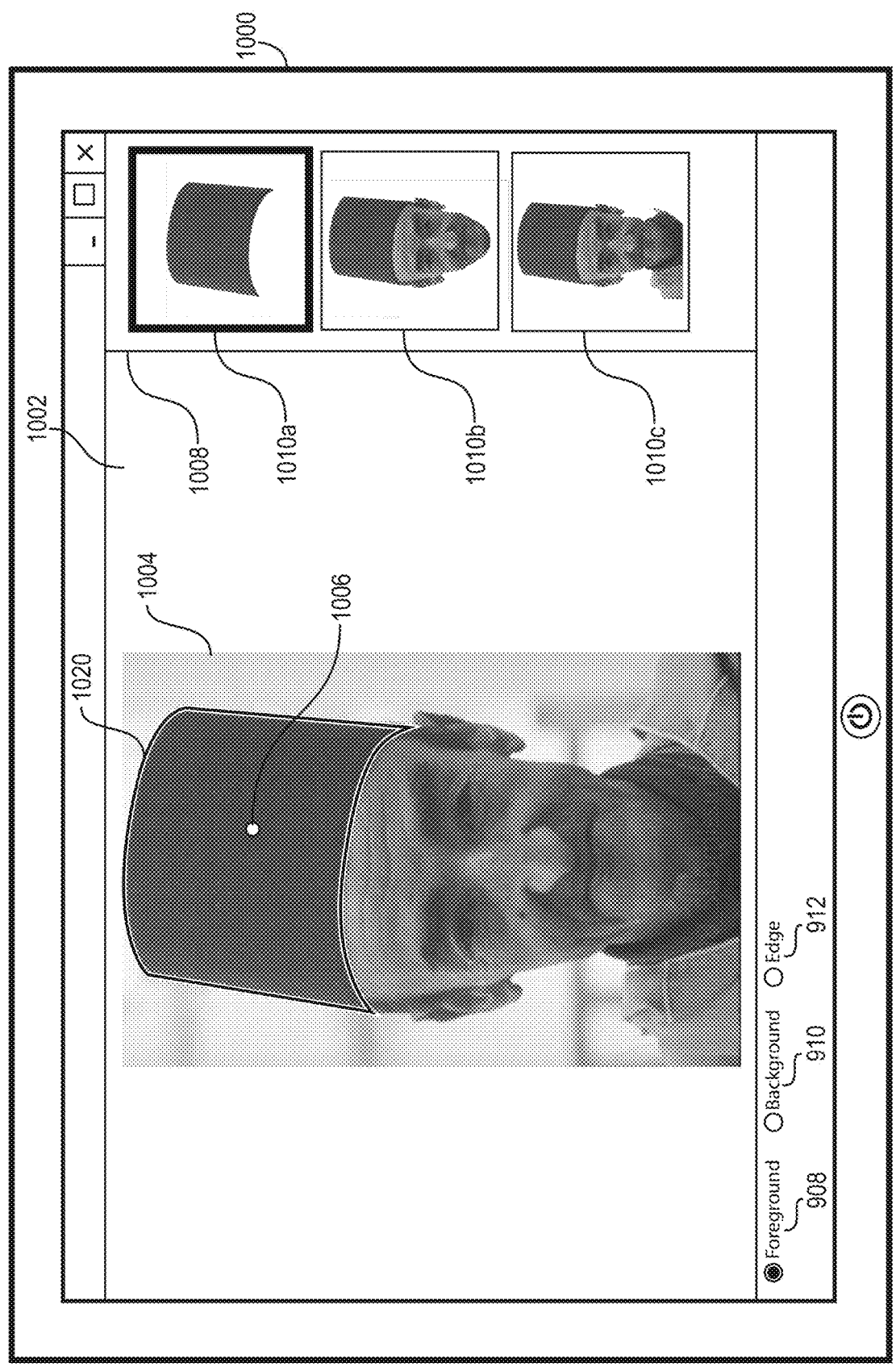

For example, as shown in FIG. 10B, the digital object selection system identifies user selection of a first object segmentation output 1010a. In response, the digital object selection system also provides a corresponding object segmentation selection 1020 in the digital image 1004. In this manner, a user can quickly and efficiently review a plurality of object segmentation outputs and select a particular object segmentation output that corresponds to a target object.

Figure 10C:
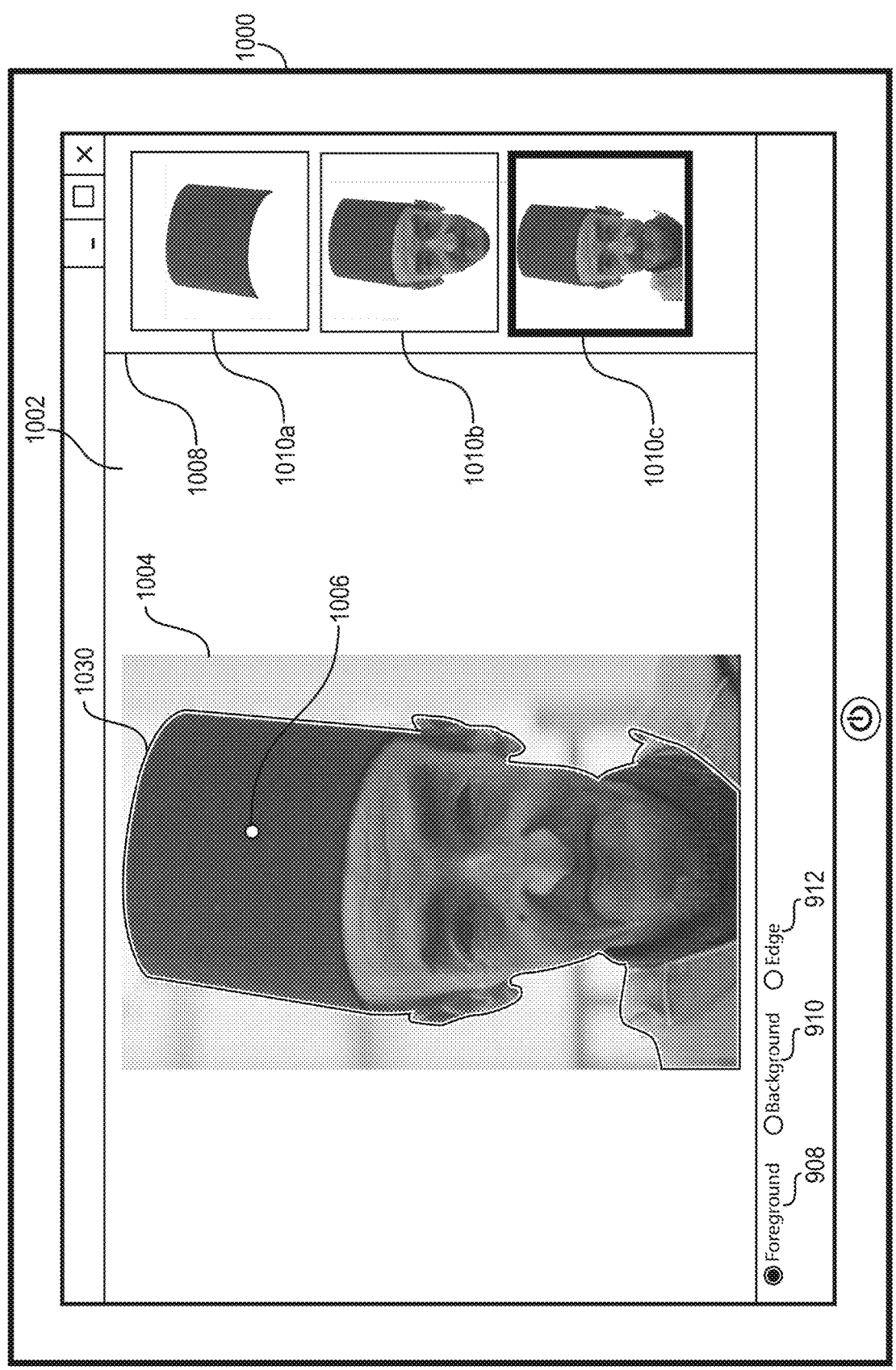

As shown in FIG. 10C, a user can select different object segmentation outputs and the digital object selection system can provide corresponding object segmentation selections. For example, in FIG. 10C, the digital object selection system identifies user interaction with the third object segmentation element 1010c. In response, the digital object selection system generates a corresponding object segmentation selection 1030 within the digital image 1004.

The digital object selection system can further refine an object segmentation based on additional user selection. For example, with regard to FIG. 10D upon selection of the third object segmentation element 1010c, a user provides an additional user selection. Specifically, the third object segmentation element 1010c omits a portion of the shirt portrayed in the digital image 1004. The user activates the edge user indicator element 912 and provides an edge indicator 1042 (e.g., a click at or near the edge of the shirt shown in the digital image 1004). In response, the digital object selection system modifies the object segmentation selection 1030 to generate a new object segmentation 1032 that includes the portion of the shirt that was originally omitted. Thus, the digital object selection system can generate a plurality of object segmentation selections and further consider additional user indicators to identify a segmentation that aligns with a target object.

Figure 10D:
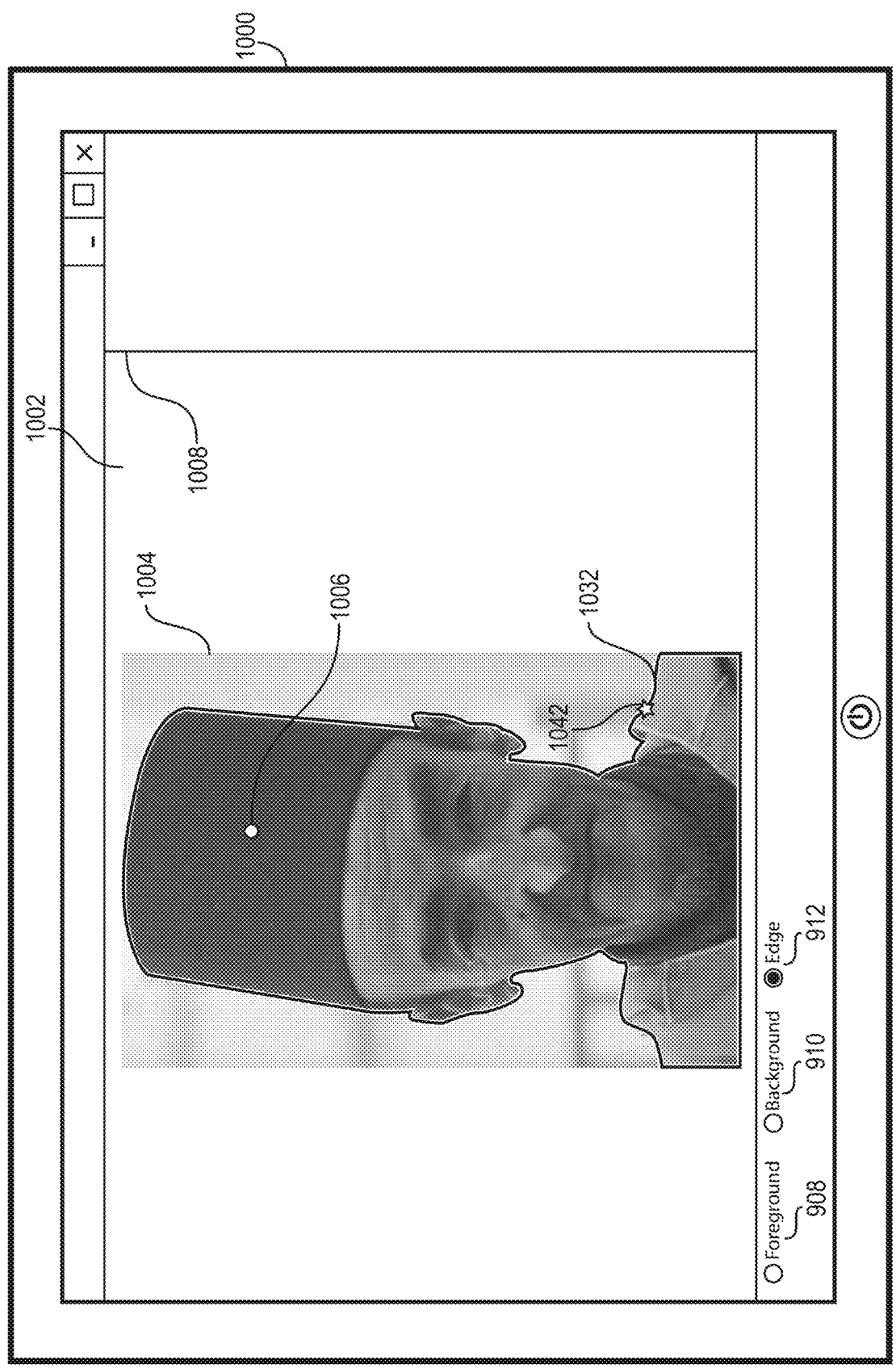

Although FIG. 10D, does not include additional object segmentation output proposals, in one or more embodiments, upon receiving the additional user indicator, the digital object selection system generates an additional set of object segmentation output proposals. Accordingly, if the user indicator is still ambiguous, the digital object selection system can provide a set of additional object segmentation outputs to reduce the time and user interactions needed to identify a target object.

In addition, although FIGS. 10A-10D illustrate a particular number of object segmentation outputs (i.e., three), the digital object selection system can generate a variety of different object segmentation outputs. For example, as described above, in one or more embodiments the digital object selection system generates and provides twelve segmentations. To illustrate, in some embodiments, the digital object selection system generates and provides twelve segmentations but emphasizes (e.g., outlines with an additional border) those segmentations with the highest quality (e.g., the highest confidence scores or object scores). In other embodiments, the digital object selection system filters out segmentations with low confidence scores or low object scores.

In addition, although FIGS. 10A-10D provide a plurality of object segmentation proposals as separate visual elements, the digital object selection system can display the object segmentation proposals as different overlays to a single digital image. For example, the digital object selection system can overlay all the proposals with different color codes (e.g., different colors corresponding to different scales) on the digital image 1004 where the user can simply drag the curser to select or deselect the proposals.

As discussed above, the digital object selection system can improve efficiency and accuracy. Indeed, researchers have conducted experiments to illustrate the improvement provided by the digital object selection system relative to conventional systems. A common practice to evaluate the performance of a single-output interactive image segmentation system is as follows: given an initial positive click at the center of the object-of-interest, the model to evaluate outputs an initial prediction. Subsequent clicks are iteratively added to the center of the largest wrongly labeled region and this step is repeated until the maximum number of clicks (fixed as 20) is reached. The intersection-over-union (IoU) at each click is recorded. The average number of clicks required to achieve a certain IoU on a particular dataset is reported.

However, because the digital object selection system can produce multiple segmentations, researches also considered the amount of interactions needed when choosing one of the predictions. This is because in order to add a new click to the center of the largest erroneous region, researches needed to pick one of the M segmentations as the model's output to compute the segmentation error. To achieve this, researchers maintained a "default" segmentation branch and increased the number of changes if the user needs to change from the "default" segmentation mask to another.

Researchers compared the digital object selection system with multiple image segmentation models based on published benchmarks with instance-level annotations, including PASCAL VOC validation set and Berkeley dataset. Researchers evaluated the digital object selection system in relation to Deep Interactive Object Selection by N. Xu, et. al (DISO), Regional Interactive Image Segmentation Networks by J. H. Liew, et. Al (RIS-Net), Iteratively Trained Interactive Segmentation by S, Mahadevan, et al. (ITIS), Deep Extreme Cut: From extreme points to object segmentation by K. Maninis, et. Al (DEXTR), Interactive Image Segmentation With Latent Diversity by Z. Li, et. Al (LDN), and A Fully Convolutional Two-Stream Fusion Network For Interactive Image Segmentation by Y. Hu, et al. (FCFSFN).

The results showing the improvement in clicks resulting from the digital object selection system are provided in Table 1. As shown, the digital object selection system resulted in the lowest number of clicks across all systems.

TABLE 1

| Segmentation Model | Number of Clicks | |
| --- | --- | --- |
| | PASCAL Dataset | Berkeley Dataset |
| DIOS | 6.04 | 8.65 |
| RIS-Net | 5.00 | 6.03 |
| ITIS | 5.6 | — |
| DEXTR | 4 | — |
| LDN | 4.79 | — |
| FCTSFN | 3.76 | 6.49 |
| Digital object selection system | 2.68 | 4.67 |

Figure 11:
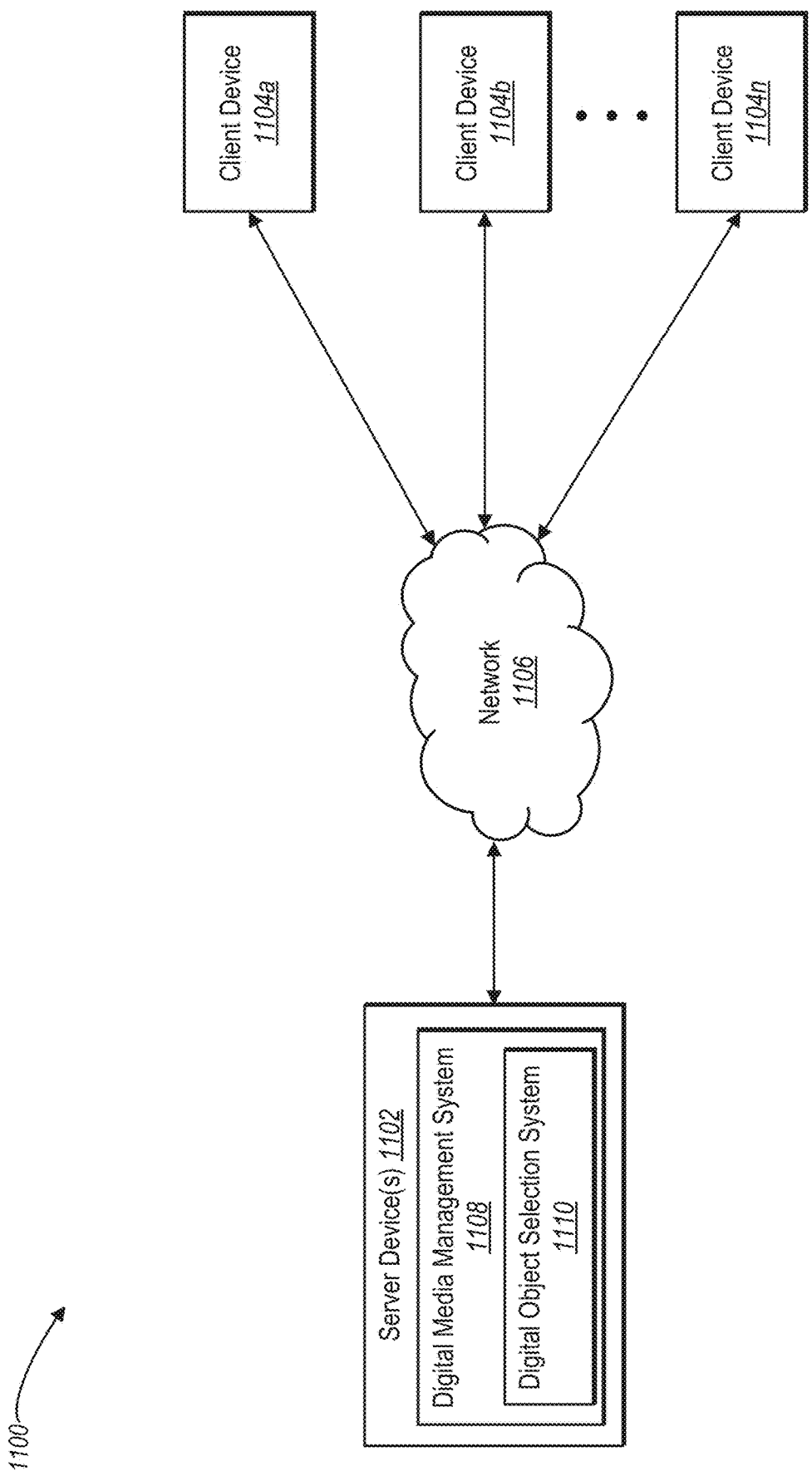
FIG. 11 illustrates a schematic diagram of an example environment in which a digital object selection system is implemented in accordance with one or more embodiments.

As mentioned above, the digital object selection system can be implemented in conjunction with one or more computing devices. FIG. 11 illustrates a diagram of an environment 1100 in which the digital object selection system can operate. As shown in FIG. 11, the environment 1100 includes server device(s) 1102 and client devices 1104a-1104n. Moreover, each of the devices within the environment 1100 can communicate with each other via a network 1106 (e.g., the Internet). Although FIG. 11 illustrates a particular arrangement of components, various additional arrangements are possible. For example, the server device(s) 1102 may communicate directly with the client devices 1104a-1104n rather than via the network 1106. Moreover, while FIG. 11 illustrates three client devices 1104a-1104n, in alternative embodiments, the environment 1100 includes any number of user client devices.

As illustrated in FIG. 11, the environment 1100 may include client devices 1104a-1104n. The client devices 1104a-1104n may comprise a variety of computing devices, such as one or more personal computers, laptop computers, mobile devices, mobile phones, tablets, special purpose computers, including computing devices described below with regard to FIG. 14.

Moreover, as illustrated in FIG. 11, the client devices 1204a-1204n and server device(s) 1102 may communicate via the network 1106. The network 1106 may represent a network or collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the network 1106 may be any suitable network over which the client devices 1104a-1104n may access the server device(s) 1102, or vice versa. Additional detail regarding the network 1106 is provided below (e.g., in relation to FIG. 14).

In addition, as shown in FIG. 11, the environment 1100 may also include the server device(s) 1102. The server device(s) 1102 may generate, store, analyze, receive, and transmit various types of data. For example, the server device(s) 1102 may receive data from a client device, such as the client device 1104a, and send the data to another client device, such as the client device 1104b. The server device(s) 1102 can also transmit electronic messages between one or more users of the environment 1100. In some embodiments, the server device(s) 1102 is a data server. The server device(s) 1102 can also comprise a communication server or a web-hosting server. Additional details regarding the server device(s) 1102 will be discussed below (e.g., in relation to FIG. 14).

As shown, the server device(s) 1102 includes a digital media management system 1108, which can manage the storage, selection, editing, modification, and distribution of digital media, such as digital images or digital videos. For example, the digital media management system 1108 can gather digital images (and/or digital videos) from the client device 1104*a*, edit the digital images, and provide the edited digital images to the client device 1104*a*.

As shown in FIG. 11, digital media management system 1108 includes the digital object selection system 1110. The digital object selection system 1110 can identify one or more target objects in a digital image. For instance, the server device(s) 1102 can receive user indication of a pixel in a digital image via the client device 1104*a*. The digital object selection system 1110 can utilize a scale-diverse segmentation neural network to generate a plurality of object segmentations and provide the plurality of object segmentations for display via the client device 1104*a*.

In addition, the digital object selection system 1110 can also train one or more scale-diverse segmentation neural networks. Indeed, as discussed above, the digital object selection system 1110 can generate training data (e.g., training images, definite training indicators, ambiguous training indicators, and ground truth segmentations) and utilize the training data to train a scale-diverse segmentation neural network. In one or more embodiments a first server device (e.g., a third-party server) trains the scale-diverse segmentation neural network and a second server device (or client device) applies the scale-diverse segmentation neural network.

Although FIG. 11 illustrates the digital object selection system 1110 implemented via the server device(s) 1102, the digital object selection system 1110 may be implemented in whole, or in part, by the individual devices 1102-1104*n* of the environment 1100. For instance, in one or more embodiments, the digital object selection system 1110 is implemented on the client device 1102*a*. Similarly, in one or more embodiments, the digital object selection system 1110 may be implemented on the server device(s) 1102. Moreover, different components and functions of the digital object selection system 1110 may be implemented separately among client devices 1204*a*-1204*n*, the server device(s) 1102, and the network 1106.

Figure 12:
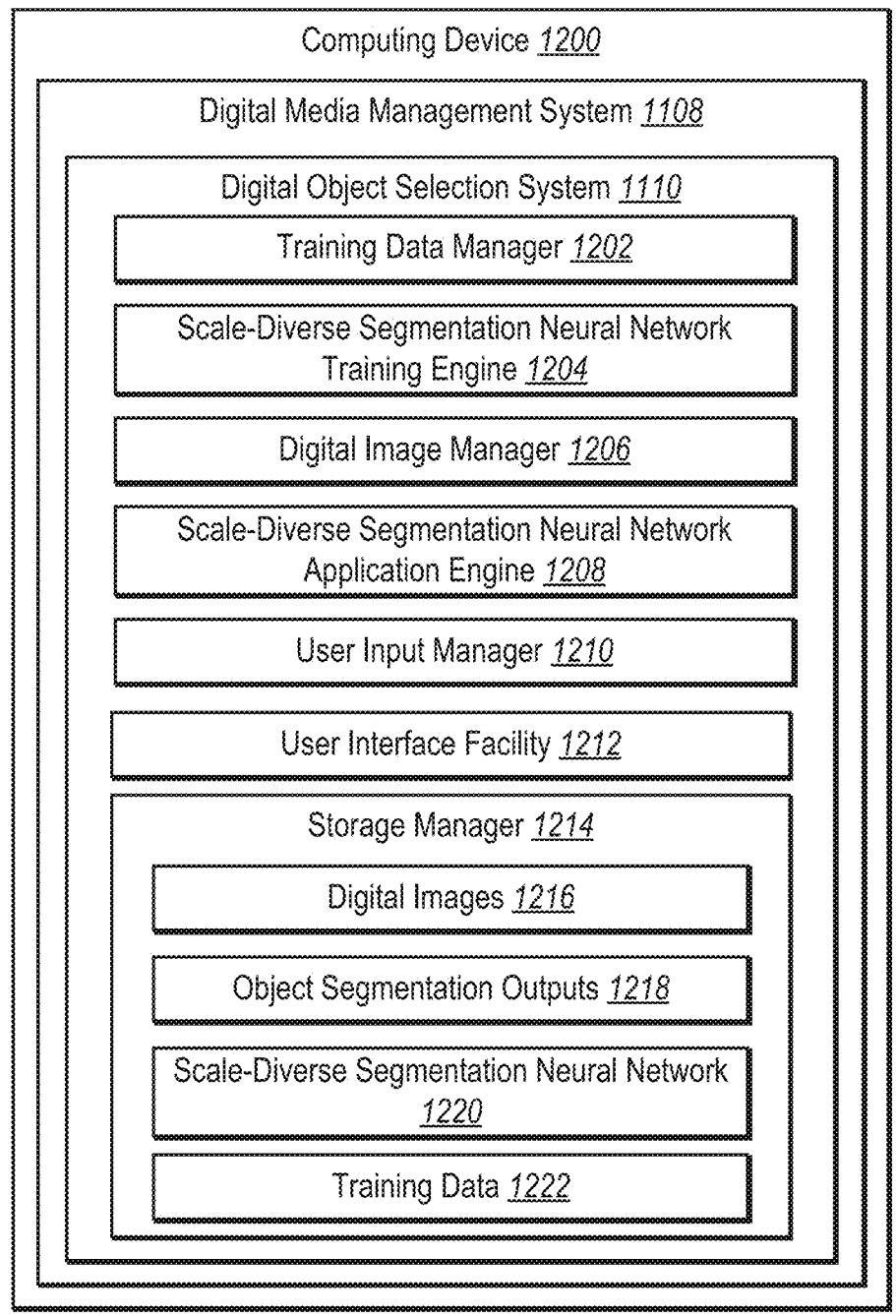
FIG. 12 illustrates a schematic diagram of the digital object selection system in accordance with one or more embodiments.

Referring now to FIG. 12, additional detail will be provided regarding capabilities and components of the digital object selection system 1110 in accordance with one or more embodiments. In particular, FIG. 12 shows a schematic diagram of an example architecture of the digital object selection system 1110 of the digital media management system 1108 implemented on a computing device 1200.

As shown, the digital object selection system 1110 is implemented via a computing device 1200. In general, the computing device 1200 may represent various types of computing devices (e.g., the server device(s) 1102 or the client devices 1104*a*-1104*n*). As illustrated in FIG. 7, the digital object selection system 1110 includes various components for performing the processes and features described herein. For example, the digital object selection system 1110 includes a training data manager 1202, a scale-diverse segmentation neural network training engine 1204, a digital image manager 1206, a scale-diverse segmentation neural network application engine 1208, a user input manager 1210, a user interface facility 1212, and a storage manager 1214. Each of these components is described in turn below.

As shown in FIG. 12, the digital object selection system 1110 includes a training data manager 1202. The training data manager 1202 can receive, manage, identify, generate, create, modify, and/or provide training data for the digital object selection system 1110. For instance, as described above, the digital object selection system can access training repositories, generate training indicators (e.g., positive training indicators, negative training indicators, definite training indicators, and/or ambiguous training indicators), identify ground truth segmentations corresponding to training indicators, and identify ground truth scales corresponding to ground truth segmentations.

In addition, as illustrated in in FIG. 12, the digital object selection system 1110 also includes a scale-diverse segmentation neural network training engine 1204. The scale-diverse segmentation neural network training engine 1204 can tune, teach, and/or train a scale-diverse segmentation neural network. As described above, the scale-diverse segmentation neural network training engine 1204 can train a single-stage and/or multi-stage scale-diverse segmentation neural network utilizing training data generated by the training data manager 1202.

As shown in FIG. 12, the digital object selection system 1110 also includes a digital image manager 1205. The digital image manager 1205 can identify, receive, manage, edit, modify, and provide digital images. For instance, the digital image manager 1205 can identify a digital image (from a client device or image repository), provide the digital image to a scale-diverse segmentation neural network to identify a target object, and modify the digital image based on the identified target object.

Moreover, as illustrated in in FIG. 12, the digital object selection system 1110 also includes a scale-diverse segmentation neural network application engine 1208. The scale-diverse segmentation neural network application engine 1208 can generate, create, and/or provide object selection outputs based on scale. For example, as discussed above, the scale-diverse segmentation neural network application engine 1208 can analyze a digital image and user indicators via a trained scale-diverse segmentation neural network to create, generate, and/or provide one or more object selection outputs based on scale.

Further, as shown in FIG. 12, the digital object selection system 1110 also includes a user input manager 1210. The user input manager 1210 can obtain, identify, receive, monitor, capture, and/or detect user input. For example, in one or more embodiments, the user input manager 1210 identifies one or more user interactions with respect to a user interface. The user input manager 1210 can detect user input of one or more user indicators. In particular, the user input manager 1210 can detect user input of user indicators with regard to one or more pixels in a digital image. For example, in one or more embodiments, the user input manager 1210 detects user input of a point or pixel in a digital image (e.g., a mouse click event or a touch event on a touchscreen). Similarly, in one or more embodiments, the user input manager 1210 detects user input of a stroke (e.g., mouse click, drag, and release events). In one or more embodiments, the user input manager 1210 detects user input of a bounded area (e.g., mouse click, drag, and release events). In addition, in one or more embodiments, the user input manager 1210 detects user input of an edge (e.g., mouse click and/or drag events) or voice input.

As illustrated in FIG. 12, the digital object selection system 1110 also includes a user interface facility 1212. The user interface facility 1212 can generate, create, and/or provide one or more user interfaces with corresponding user interface elements. For example, the user interface facility 1212 can generate the user interfaces 902 and 1002 and corresponding elements (e.g., slider element, timer element, image display elements, and/or segmentation output region).

The digital object selection system 1110 also includes a storage manager 1214. The storage manager 1214 maintains data for the digital object selection system 1110. The storage manager 1214 can maintain data of any type, size, or kind as necessary to perform the functions of the digital object selection system 1110. As illustrated, storage manager 1214 can include digital images 1216, object segmentation outputs 1218, a scale-diverse segmentation neural network 1220, and training data 1222 (e.g., training images portraying training objects, training indicators corresponding to the training objects, training scales, and ground truth segmentations corresponding to the training images and training indicators at different scales).

Each of the components 1202-1214 of digital object selection system 1110 can include software, hardware, or both. For example, the components 1202-1214 can include one or more instructions stored on a computer-readable storage medium and executable by processors of one or more computing devices, such as a client device or server device. When executed by the one or more processors, the computer-executable instructions of digital object selection system 1110 can cause the computing device(s) to perform the feature learning methods described herein. Alternatively, the components 1202-1214 can include hardware, such as a special-purpose processing device to perform a certain function or group of functions. Alternatively, the components 1202-1214 of digital object selection system 1110 can include a combination of computer-executable instructions and hardware.

Furthermore, the components 1202-1214 of digital object selection system 1110 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1202-1214 may be implemented as a stand-alone application, such as a desktop or mobile application. Furthermore, the components 1202-1214 may be implemented as one or more web-based applications hosted on a remote server. The components 1202-1214 may also be implemented in a suite of mobile device applications or "apps." To illustrate, the components 1202-1214 may be implemented in an application, including but not limited to Creative Cloud®, Photoshop®, InDesign®, Lightroom®, Illustrator®, After Effects®, and Adobe® Sensei. "ADOBE," "CREATIVE CLOUD", "PHOTOSHOP", "INDESIGN", "LIGHTROOM", "ILLUSTRATOR", "AFTER EFFECTS," and "SENSEI" are either registered trademarks or trademarks of Adobe Systems Incorporated in the United States and/or other countries.

Figure 13:
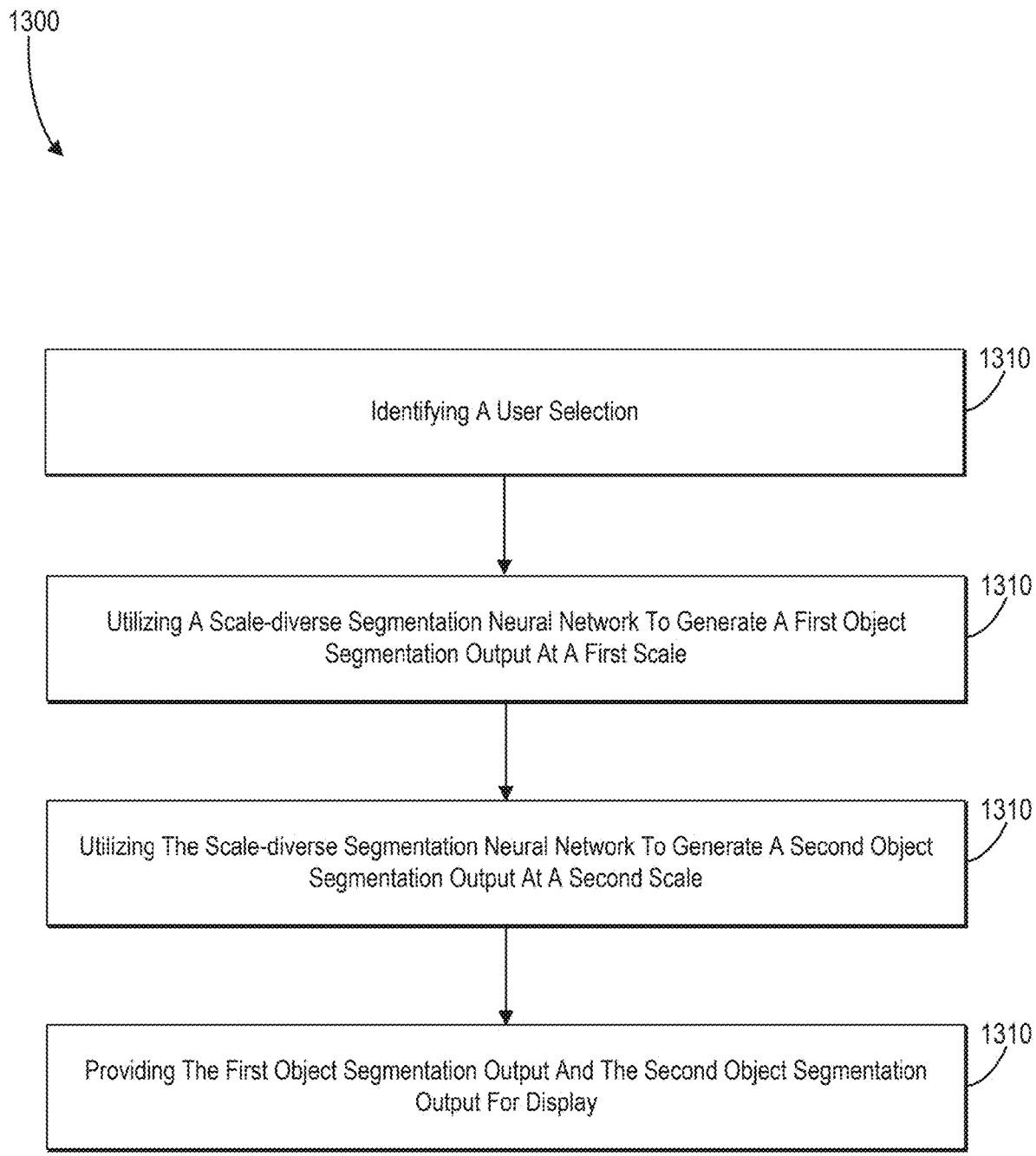
FIG. 13 illustrates a flowchart of a series of acts for utilizing a trained scale-diverse segmentation neural network to generate object segmentation outputs in accordance with one or more embodiments.
Figure 14:
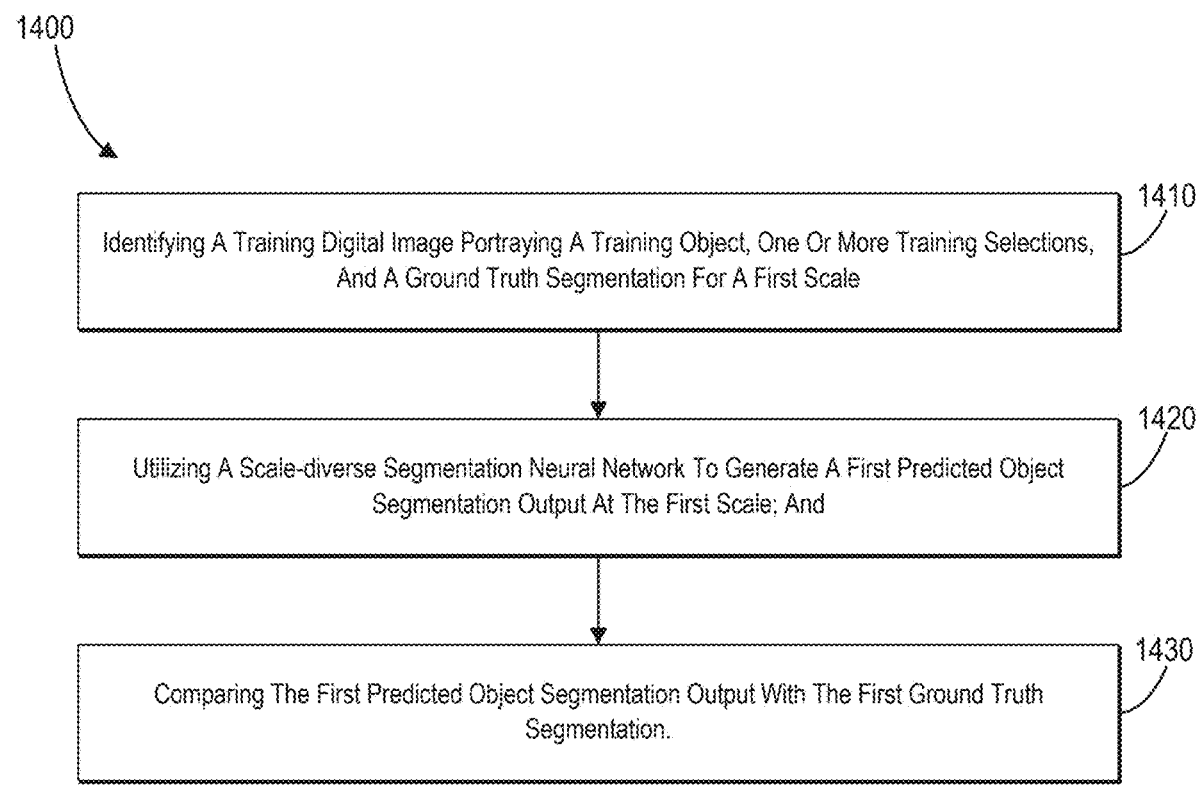
FIG. 14 illustrates a flowchart of a series of acts for training a scale-diverse segmentation neural network to generate object segmentation outputs in accordance with one or more embodiments.

FIGS. 1B-12, the corresponding text, and the examples provide a number of different methods, systems, devices, and non-transitory computer-readable media of the digital object selection system 1110. In addition to the foregoing, one or more embodiments can also be described in terms of flowcharts comprising acts for accomplishing a particular result, as shown in FIGS. 13-14. The series of acts illustrated in FIGS. 13-14 may be performed with more or fewer acts. Further, the acts may be performed in differing orders. Additionally, the acts described may be repeated or performed in parallel with one another or parallel with different instances of the same or similar acts.

FIG. 13 illustrates a flowchart of a series of acts 1300 for utilizing a scale-diverse segmentation neural network to generate object segmentation outputs based on a diversity of scales in accordance with one or more embodiments. While FIG. 13 illustrates acts according to one or more embodiments, alternative embodiments may omit, add to, reorder, and/or modify any of the acts shown in FIG. 13. The acts of FIG. 13 can be performed as part of a method. Alternatively, a non-transitory computer-readable medium can comprise instructions that, when executed by one or more processors, cause a computing device to perform the acts of FIG. 13. In some embodiments, a system can perform the acts of FIG. 13.

As illustrated in FIG. 13, the series of acts 1300 includes an act 1310 of identifying a user indicator. In particular, the act 1310 can include identifying a user indicator comprising one or more pixels of a digital image. The digital image can portray one or more target objects. More particularly, act 1320 can involve identifying one or more of a positive user indicator, a negative user indicator, or a boundary user indicator relative to one or more intended target objects. Further, the act 1310 can also include receiving (or identifying) a digital image and a user indicator comprising one or more pixels of the digital image.

As shown in FIG. 13, the series of acts 1300 also includes an act 1320 of utilizing a scale-diverse segmentation neural network to generate a first object segmentation output. In particular, the act 1320 can include utilizing the scale-diverse segmentation neural network to generate the first object segmentation output at a first scale based the digital image and the user indicator. To illustrate, in one or more embodiments, the scale-diverse segmentation neural network comprises a plurality of output channels corresponding to a plurality of scales. Accordingly, the act 1320 can include utilizing a first output channel corresponding to the first scale to generate the first object segmentation output.

More particularly, act 1320 can involve generating one or more distance maps. Generating the one or more distance maps can comprises generating one or more of a positive distance map, a negative distance map, or a boundary map. Act 1320 can involve generating a positive distance map reflecting a distance of pixels from a positive user indicator. Act 1320 can involve generating a negative distance map reflecting a distance of pixels from a negative user indicator. Act 1320 can also involve generating an edge distance map reflecting a distance of pixels from an edge user indicator.

Act 1320 can also involve generating one or more color maps. For example, generating one or more color maps can comprise generating a red color map reflecting an amount of red corresponding to each pixel, a green color map reflecting an amount of green corresponding to each pixel, and a blue color map reflecting an amount of blue corresponding to each pixel.

Act 1320 can also involve generating one or more feature maps from the one or more color maps and the one or more distance maps. In particular, act 1320 can involve utilizing a neural network encoder to generate the one or more feature maps from the one or more color maps and the one or more distance maps.

The series of acts 1300 can also involve generating a plurality of object segmentation outputs at different scales. In particular, the series of acts 1300 can involve generating a plurality of object segmentation outputs (the first object segmentation output at a first scale, the second object segmentation output at a second scale, etc.) by processing the one or more feature maps using a neural network decoder. In one or more embodiments, the first scale comprises a first size and a first aspect ratio and the second scale comprises a second size and a second aspect ratio.

Thus, as illustrated in FIG. 13, the series of acts 1300 also includes an act 1330 of utilizing the scale-diverse segmentation neural network to generate a second object segmentation output. In particular, the act 1330 can include utilizing the scale-diverse segmentation neural network to generate the second object segmentation output at a second scale based on the digital image and the user indicator. To illustrate, the act 1330 can include utilizing a second output channel corresponding to the second scale to generate the second object segmentation output. Act 1330 can involve the steps described above in relation to act 1320 and can be performed in parallel with act 1320 as described above.

The series of acts 1300 can also involve processing the generated one or more feature maps by an object verification model to generate a plurality of objects scores. For example, the series of acts 1300 can involve generating an object score for each of the plurality of scales by processing the one or more feature maps by a global pooling layer and a fully connected layer.

The series of acts 1300 can also involve selecting object segmentation outputs for display that have high object scores. For example, the series of acts 1300 can involve filtering/removing object segmentation outputs with low object scores so that only object segmentation outputs with high object scores are provided for display. Thus, the series of acts 1300 can involve identifying that the first object segmentation output and the second object segmentation output have high object scores and selecting the first object segmentation output and the second object segmentation output for display based on the high object scores.

Alternatively, act 1320 can involve identifying a first input scale. For example, act 1320 can involve identifying a selection of the first input scale based on user input with a slider. Act 1320 can then involve providing the one or more distance maps, the one or more color maps, and the first input scale (e.g., the first scale) to a scale-diverse segmentation neural network. The scale-diverse segmentation neural network can generate the first object segmentation output at the first scale using the one or more distance maps, the one or more color maps, and the input scale (e.g., the first scale). The series of acts 1300 can then involve identifying a second input scale (for example the user can determine that the first object segmentation output is too small). In such implementations, act 1330 can involve providing the one or more distance maps, the one or more color maps, and the second input scale (e.g., the second scale) to the scale-diverse segmentation neural network. The scale-diverse segmentation neural network can generate the second object segmentation output at the second scale using the one or more distance maps, the one or more color maps, and the second input scale.

Further, as shown in FIG. 13, the series of acts 1300 also includes an act 1340 of providing the first object segmentation output and the second object segmentation output for display (e.g., providing the plurality of object segmentation outputs for display). For example, in one or more embodiments, the act 1340 includes providing a scale slider user interface element for display; in response to identifying user input of a first position corresponding to the first scale via the scale slider user interface element, providing the first object segmentation output for display; and in response to identifying user input of a second position corresponding to the second scale via the scale slider user interface element, providing the second object segmentation output for display.

In one or more embodiments, the first object segmentation output comprises at least one of: a segmentation mask or a segmentation boundary.

In one or more embodiments the series of acts 1300 also includes (at least one of the following) analyzing the digital image and the user indicator utilizing a scale proposal neural network to generate the first scale and the second scale; or determining the first scale based on an amount of time of a user interaction. For instance, the series of acts 1300 can include determine the first scale based on a first amount of time of a user interaction (e.g., an amount of time of a click and hold) and determine the second scale based on a second amount of time of the user interaction (e.g., an additional amount of time until a release event after the click and hold).

Moreover, the series of acts 1300 can also include applying an object verification model of the scale-diverse segmentation neural network to determine an object score corresponding to the first scale; and providing the first object segmentation output for display based on the object score. For example, the series of acts 1300 can include applying an object verification model of the scale-diverse segmentation neural network to determine a first object score corresponding to the first scale and a second object score corresponding to the second scale; and providing the first object segmentation output and the second object segmentation output for display based on the first object score and the second object score. Further, the series of acts 1300 can also include identifying user selection of the first object segmentation output; and selecting pixels of the digital image corresponding to the one or more target objects based on user interaction with the first object segmentation output.

In addition (or in the alternative) to the acts describe above, in some embodiments, the series of acts 1300 include a step for utilizing the scale-diverse segmentation neural network to generate a plurality of object segmentation outputs corresponding to a plurality of scales based on the digital image and the user indicator. In particular, the algorithm and acts described above in relation to FIGS. 2A-2C and 7 can comprise the corresponding acts (or structure) for a step for utilizing the scale-diverse segmentation neural network to generate a plurality of object segmentation outputs corresponding to a plurality of scales based on the digital image and the user indicator.

FIG. 14 illustrates a flowchart of a series of acts 1400 for training a scale-diverse segmentation neural network to generate object segmentation outputs based on a diversity of scales in accordance with one or more embodiments. While FIG. 14 illustrates acts according to one or more embodiments, alternative embodiments may omit, add to, reorder, and/or modify any of the acts shown in FIG. 14. The acts of FIG. 14 can be performed as part of a method. Alternatively, a non-transitory computer-readable medium can comprise instructions that, when executed by one or more processors, cause a computing device to perform the acts of FIG. 14. In some embodiments, a system can perform the acts of FIG. 14.

As illustrated in FIG. 14, the series of acts 1400 includes an act 1410 of identifying a training digital image portraying a training object, one or more training indicators, and a ground truth segmentation for a first scale (e.g., training data stored in at least one non-transitory computer-readable storage medium). For example, the act 1410 can include identifying a training digital image portraying a training object; one or more training indicators corresponding to the training object; and a first ground truth segmentation corresponding to a first scale, the training object, and the one or more training indicators. In one or more embodiments, the act 1410 also includes identifying a second ground truth segmentation corresponding to a second scale, the training object, and the one or more training indicators.

In addition, in one or more embodiments, the training object comprises a first object and a second object and the one or more training indicators comprise an ambiguous training indicator in relation to the training object and the first object. Moreover, the act 1410 can include generating the ambiguous training indicator by: identifying a common foreground for the training object and the first object; and sampling the ambiguous training indicator from the common foreground for the training object and the first object. Furthermore, in some embodiments, the one or more training indicators comprises the ambiguous training indicator and a definitive training indicator. The act 1410 can further include generating the definitive training indicator by sampling a positive definitive training indicator from a region of the digital image corresponding to the first ground truth segmentation. Further, the act 1410 can also include comparing the first ground truth segmentation to a plurality of scales to determine that the first scale corresponds to the first ground truth segmentation.

In addition, as shown in FIG. 14, the series of acts 1400 includes an act 1420 of utilizing a scale-diverse segmentation neural network to generate a first predicted object segmentation output at the first scale. For example, the act 1420 can include analyzing the training digital image and the one or more training indicators at the first scale utilizing the scale-diverse segmentation neural network to generate a first predicted object segmentation output. In one or more embodiments, the scale-diverse segmentation neural network comprises a plurality of output channels corresponding to a plurality of scales. Moreover, the act 1420 can include utilizing a first output channel corresponding to the first scale to generate the first predicted object segmentation output. In addition, the act 1420 can also include analyzing the training digital image and the one or more training indicators at the second scale utilizing the scale-diverse segmentation neural network to generate a second predicted object segmentation output.

Moreover, as illustrated in FIG. 14, the series of acts 1400 includes an act 1430 of comparing the first predicted object segmentation output with the first ground truth segmentation. For example, the act 1430 can include modifying tunable parameters of the scale-diverse segmentation neural network based on a comparison of the first predicted object segmentation output with the first ground truth segmentation corresponding to the first scale, the training object, and the one or more training indicators. In addition, the act 1430 can also include comparing the second predicted object segmentation output with the second ground truth segmentation.

In addition (or in the alternative) to the acts describe above, in some embodiments, the series of acts 1400 include a step for training a scale-diverse segmentation neural network to analyze training indicators corresponding to training digital images and generate object segmentation outputs corresponding to different scales. In particular, the algorithm and acts described above in relation to FIGS. 3 and 7 can comprise the corresponding acts for a step for training a scale-diverse segmentation neural network to analyze training indicators corresponding to training digital images and generate object segmentation outputs corresponding to different scales.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 15:
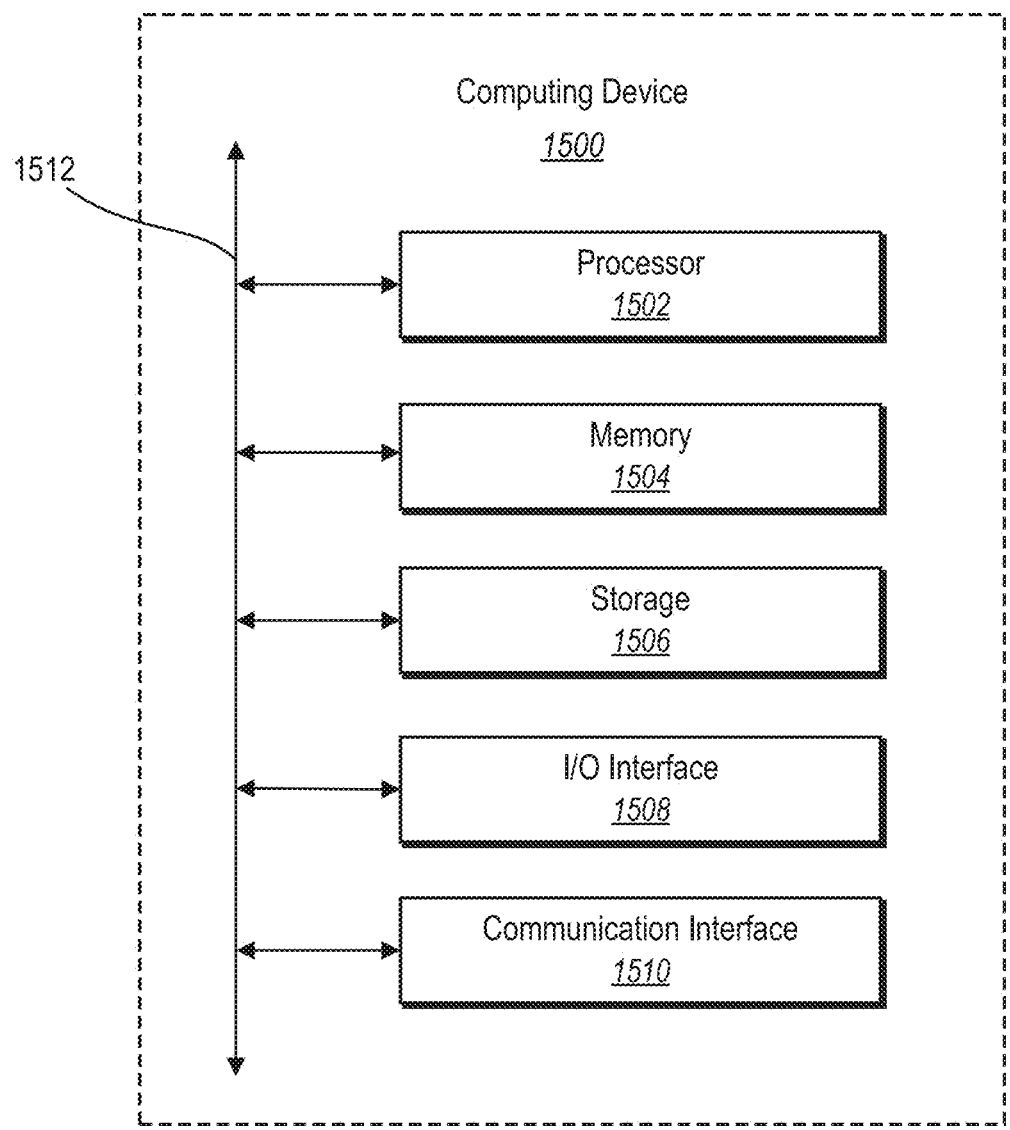
FIG. 15 illustrates a block diagram of an example computing device for implementing one or more embodiments of the present disclosure.

FIG. 15 illustrates a block diagram of an example computing device 1500 that may be configured to perform one or more of the processes described above. One will appreciate that one or more computing devices, such as the computing device 1500 may represent the computing devices described above (e.g., computing device 900, computing device 1000, server device(s) 1102, client devices 1104a-1104n, and/or computing device 1200). In one or more embodiments, the computing device 1500 may be a mobile device (e.g., a mobile telephone, a smartphone, a PDA, a tablet, a laptop, a camera, a tracker, a watch, a wearable device, etc.). In some embodiments, the computing device 1500 may be a non-mobile device (e.g., a desktop computer or another type of client device). Further, the computing device 1500 may be a server device that includes cloud-based processing and storage capabilities.

As shown in FIG. 15, the computing device 1500 can include one or more processor(s) 1502, memory 1504, a storage device 1506, input/output interfaces 1508 (or "I/O interfaces 1508"), and a communication interface 1510, which may be communicatively coupled by way of a communication infrastructure (e.g., bus 1512). While the computing device 1500 is shown in FIG. 15, the components illustrated in FIG. 15 are not intended to be limiting. Additional or alternative components may be used in other embodiments. Furthermore, in certain embodiments, the computing device 1500 includes fewer components than those shown in FIG. 15. Components of the computing device 1500 shown in FIG. 15 will now be described in additional detail.

In particular embodiments, the processor(s) 1502 includes hardware for executing instructions, such as those making up a computer program. As an example, and not by way of limitation, to execute instructions, the processor(s) 1502 may retrieve (or fetch) the instructions from an internal register, an internal cache, memory 1504, or a storage device 1506 and decode and execute them.

The computing device 1500 includes memory 1504, which is coupled to the processor(s) 1502. The memory 1504 may be used for storing data, metadata, and programs for execution by the processor(s). The memory 1504 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1504 may be internal or distributed memory.

The computing device 1500 includes a storage device 1506 includes storage for storing data or instructions. As an example, and not by way of limitation, the storage device 1506 can include a non-transitory storage medium described above. The storage device 1506 may include a hard disk drive (HDD), flash memory, a Universal Serial Bus (USB) drive or a combination these or other storage devices.

As shown, the computing device 1500 includes one or more I/O interfaces 1508, which are provided to allow a user to provide input to (such as user strokes), receive output from, and otherwise transfer data to and from the computing device 1500. These I/O interfaces 1508 may include a mouse, keypad or a keyboard, a touch screen, camera, optical scanner, network interface, modem, other known I/O devices or a combination of such I/O interfaces 1508. The touch screen may be activated with a stylus or a finger.

The I/O interfaces 1508 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1508 are configured to provide graphical data to a display for presentation to a user. The graphical data may be representative of one or more graphical user interfaces and/or any other graphical content as may serve a particular implementation.

The computing device 1500 can further include a communication interface 1510. The communication interface 1510 can include hardware, software, or both. The communication interface 1510 provides one or more interfaces for communication (such as, for example, packet-based communication) between the computing device and one or more other computing devices or one or more networks. As an example, and not by way of limitation, communication interface 1510 may include a network interface controller (NIC) or network adapter for communicating with an Ethernet or other wire-based network or a wireless NIC (WNIC) or wireless adapter for communicating with a wireless network, such as a WI-FI. The computing device 1500 can further include a bus 1512. The bus 1512 can include hardware, software, or both that connects components of computing device 1500 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
segmenting one or more objects in a digital image at a first scale by utilizing a scale-diverse segmentation neural network to generate a first object segmentation output at the first scale utilizing the digital image and a first scale indicator as input;
segmenting the one or more objects in the digital image at a second scale by utilizing the scale-diverse segmentation neural network to generate a second object segmentation output at the second scale utilizing the digital image and a second scale indicator as input;
providing a set of interactive object segmentation outputs representing the first object segmentation output and the second object segmentation output of the scale-diverse segmentation neural network for display at the first scale and the second scale in a graphical user interface of a client device;
receiving, from the client device, a client device interaction selecting the first object segmentation output or the second object segmentation output of the scale-diverse segmentation neural network; and
generating, based on the client device interaction, the first object segmentation output or the second object segmentation output for display within the digital image in the graphical user interface.

2. The method of claim 1, wherein:
segmenting the one or more objects in the digital image at the first scale comprises utilizing a first channel of the scale-diverse segmentation neural network to generate the first object segmentation output; and
segmenting the one or more objects in the digital image at the second scale comprises utilizing a second channel of the scale-diverse segmentation neural network to generate the second object segmentation output.

3. The method of claim 1, further comprising providing the set of interactive object segmentation outputs for display by:
providing, for display, a graphical user interface element comprising a plurality of positions corresponding to a plurality of scales; and
in response to identifying a selection of a first position via the graphical user interface element, providing the first object segmentation output for display.

4. The method of claim 3, wherein:
providing, for display, the graphical user interface element comprises providing a scale slider user interface element comprising the plurality of positions as a slider corresponding to the plurality of scales; and
identifying the selection of the first position via the graphical user interface element comprises determining the first position based on the slider of the scale slider user interface element.

5. The method of claim 1, further comprising:
determining the first scale corresponding to the first object segmentation output based on an amount of time of the client device interaction.

6. The method of claim 1, further comprising:
detecting, via a touchscreen of a client device, the client device interaction in connection with the digital image; and
determining the first scale corresponding to the first object segmentation output based on an amount of pressure of client device interaction.

7. The method of claim 1, further comprising:
determining, utilizing an object verification model of the scale-diverse segmentation neural network, a plurality of object scores corresponding to a plurality of scales; and
providing the first object segmentation output and the second object segmentation output for display based on the plurality of object scores.

8. The method of claim 1, further comprising:
generating, utilizing the scale-diverse segmentation neural network, an object score corresponding to the first scale; and
emphasize the first object segmentation output within a display based on the object score.

9. The method of claim 8, wherein emphasizing the first object segmentation output comprises outlining the first object segmentation output based on a comparison of the object score to an additional object score corresponding to the second object segmentation output.

10. A system comprising:
one or more memory devices comprising a digital image; and
one or more processors configured to cause the system to:
segment one or more objects in the digital image at a first scale by utilizing a scale-diverse segmentation neural network to generate a first object segmentation output at the first scale utilizing the digital image and a first scale indicator as input;
segment the one or more objects in the digital image at a second scale by utilizing the scale-diverse segmentation neural network to generate a second object segmentation output at the second scale utilizing the digital image and a second scale indicator as input;
provide a set of interactive object segmentation outputs representing the first object segmentation output and the second object segmentation output of the scale-diverse segmentation neural network for display at the first scale and the second scale in a graphical user interface of a client device;

receive, from the client device, a client device interaction selecting one of the first object segmentation output or the second object segmentation output of the scale-diverse segmentation neural network; and generate, based on the client device interaction, the first object segmentation output or the second object segmentation output for display within the digital image in the graphical user interface.

11. The system of claim 10, wherein the one or more processors are further configured to cause the system to:

determine, for the digital image, a plurality of user indicators comprising one or more pixels relative to the one or more objects;

generate one or more distance maps based on the digital image and the plurality of user indicators; and segment the one or more objects at a plurality of scales based on the one or more distance maps.

12. The system of claim 11, wherein the one or more processors are further configured to cause the system to:

determine the plurality of user indicators by:

determining a positive indicator corresponding to one or more pixels of a target object of the one or more objects; and determining a negative indicator corresponding to one or more pixels outside the target object of the one or more objects; and generate the one or more distance maps by:

generating a positive distance map based on the positive indicator; and generating a negative distance map based on the negative indicator.

13. The system of claim 10, wherein the one or more processors are further configured to cause the system to provide the set of interactive object segmentation outputs for display by:

providing, for display, a graphical user interface element comprising a plurality of positions corresponding to a plurality of scales; and providing, for display, the first object segmentation output or the second object segmentation output based on a selected position of the plurality of positions.

14. The system of claim 10, wherein the one or more processors are further configured to cause the system to:

determine the second scale comprising a larger size or a larger aspect ratio than the first scale; and wherein segmenting the one or more objects in the digital image at the second scale comprises segmenting at least a portion of the one or more objects corresponding to the first object segmentation output.

15. A non-transitory computer readable storage medium comprising instructions that, when executed by at least one processor, cause the at least one processor to:

segment one or more objects in a digital image at a plurality of scales by utilizing a scale-diverse segmentation neural network to generate a plurality of object segmentation outputs at the plurality of scales utilizing the digital image and a plurality of scale indicators as input;

provide, for display, a scale slider user interface element comprising a plurality of positions for selecting from the plurality of scales corresponding to the plurality of object segmentation outputs; and in response to a user input indicating a position corresponding to an input scale of the plurality of scales via the scale slider user interface element, provide an object segmentation output of the plurality of object segmentation outputs based on a scale corresponding to a position of a slider of the scale slider user interface element for display.

16. The non-transitory computer readable storage medium of claim 15, further comprising instructions that, when executed by the at least one processor, cause the at least one processor to segment the one or more objects in the digital image by:

providing, for display, a plurality of user indicator elements corresponding to different portions of the digital image, the different portions comprising a foreground, a background, and an object edge;

determining an indicator type for a selected pixel of the digital image indicating that the selected pixel belongs to the foreground, the background, or the object edge in response to a selection of a user indicator element of the plurality of user indicator elements; and segmenting the one or more objects based on the indicator type of the selected pixel.

17. The non-transitory computer readable storage medium of claim 15, further comprising instructions that, when executed by the at least one processor, cause the at least one processor to provide, for display, the scale slider user interface element by:

generating a plurality of recommended scales corresponding to a plurality of object segmentation outputs; and plotting the plurality of recommended scales on the scale slider user interface element.

18. The non-transitory computer readable storage medium of claim 15, further comprising instructions that, when executed by the at least one processor, cause the at least one processor to provide the object segmentation output by dynamically providing different object segmentation outputs of the plurality of object segmentation outputs according to movement of the slider along the scale slider user interface element.

19. The non-transitory computer readable storage medium of claim 15, further comprising instructions that, when executed by the at least one processor, cause the at least one processor to segment the one or more objects in the digital image at the plurality of scales by:

determining one or more user indicators corresponding to one or more portions of the digital image;

generating one or more distance maps based on the one or more user indicators; and segmenting the one or more objects at the plurality of scales based on the one or more distance maps.

20. The non-transitory computer readable storage medium of claim 15, further comprising instructions that, when executed by the at least one processor, cause the at least one processor to:

determine, utilizing the scale-diverse segmentation neural network, a plurality of object scores corresponding to the plurality of scales; and provide an object segmentation of the plurality of object segmentation outputs with an outline based on the plurality of object scores.

* * * * *